(12) United States Patent
Chen et al.

(10) Patent No.: US 9,719,883 B2
(45) Date of Patent: *Aug. 1, 2017

(54) DEVICES AND METHODS FOR CHARACTERIZATION OF DISTRIBUTED FIBER BEND AND STRESS

(71) Applicant: General Photonics Corporation, Chino, CA (US)

(72) Inventors: Hongxin Chen, Chino, CA (US); Xiaojun Chen, San Gabriel, CA (US); Xiaotian Steve Yao, Diamond Bar, CA (US)

(73) Assignee: General Photonics Corporation, Chino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/897,221

(22) PCT Filed: Jun. 10, 2014

(86) PCT No.: PCT/US2014/041798
§ 371 (c)(1),
(2) Date: Dec. 9, 2015

(87) PCT Pub. No.: WO2014/201057
PCT Pub. Date: Dec. 18, 2014

(65) Prior Publication Data
US 2016/0123837 A1    May 5, 2016

Related U.S. Application Data

(60) Provisional application No. 61/833,437, filed on Jun. 10, 2013, provisional application No. 61/833,441, filed on Jun. 10, 2013.

(51) Int. Cl.
*G01M 11/00* (2006.01)
*G01M 11/08* (2006.01)

(52) U.S. Cl.
CPC ...... *G01M 11/3181* (2013.01); *G01M 11/088* (2013.01); *G01M 11/3127* (2013.01); *G01M 11/3145* (2013.01); *G01M 11/3172* (2013.01)

(58) Field of Classification Search
CPC .... G01M 11/088; G01M 11/30; G01M 11/31; G01M 11/3109; G01M 11/3118;
(Continued)

(56) References Cited

U.S. PATENT DOCUMENTS

| | | | |
|---|---|---|---|
| 4,685,799 A | 8/1987 | Brininstool | |
| 6,456,370 B1 | 9/2002 | Ingles, Jr. | |

(Continued)

FOREIGN PATENT DOCUMENTS

| | | | | |
|---|---|---|---|---|
| EP | 0 320 255 A2 | * 6/1989 | ............. | G01L 1/242 |
| EP | 2 720 388 A1 | * 4/2014 | ........ | G01M 11/3172 |

(Continued)

OTHER PUBLICATIONS

Corsi, F., et al., "Beat Length Characterization Based on Backscattering Analysis in Randomly Perturbed Single-Mode Fibers," Journal of Lightwave Technology, 17(7):1172-1178, Jul. 1999.

(Continued)

*Primary Examiner* — Gordon J Stock, Jr.
(74) *Attorney, Agent, or Firm* — Perkins Coie LLP

(57) ABSTRACT

The disclosed technology includes, among others, methods and devices for measuring distributed fiber bend or stress related characteristics along an optical path of fiber under test (FUT) uses both a light input unit and a light output unit connected to the FUT at one single end.

15 Claims, 47 Drawing Sheets

(58) Field of Classification Search
CPC ......... G01M 11/3127; G01M 11/3136; G01M 11/3145; G01M 11/3154; G01M 11/3163; G01M 11/3172; G01M 11/3181; G01N 2201/088; G01N 2201/0886; G01L 1/242; G01B 11/16; G01B 11/161; G01B 11/18; H04B 10/071; G01D 5/353; G01D 5/35303; G01D 5/35306; G01D 5/35309; G01D 5/35312; G01D 5/35316; G01D 5/35319; G01D 5/35322; G01D 5/35325; G01D 5/35329; G01D 5/35332; G01D 5/35335; G01D 5/35338; G01D 5/35341; G01D 5/35345; G01D 5/35348; G01D 5/35351; G01D 5/35354; G01D 5/35358; G01D 5/35361; G01D 5/35364; G01D 5/35367; G01D 5/35537; G01D 5/35374; G01D 5/35377; G01D 5/35538; G01D 5/35383; G01D 5/35387; G01D 5/3539; G01D 5/35393; G01D 5/35396
See application file for complete search history.

(56) References Cited

U.S. PATENT DOCUMENTS

| | | | |
|---|---|---|---|
| 6,724,469 B2 | 4/2004 | Leblanc | |
| 6,856,400 B1* | 2/2005 | Froggatt | G01M 11/331 356/477 |
| 7,920,253 B2 | 4/2011 | Cyr et al. | |
| 8,149,419 B2* | 4/2012 | Fan | G01M 11/3172 356/445 |
| 8,164,831 B2 | 4/2012 | Yao et al. | |
| 9,097,615 B2 | 8/2015 | Xia et al. | |
| 2006/0204165 A1* | 9/2006 | Froggatt | G01K 11/32 385/12 |
| 2008/0002187 A1* | 1/2008 | Froggatt | G01M 11/3172 356/73.1 |
| 2008/0007718 A9* | 1/2008 | Froggatt | G01M 11/3172 356/73.1 |
| 2011/0090486 A1 | 4/2011 | Udd | |
| 2011/0320147 A1 | 12/2011 | Brady et al. | |
| 2012/0042696 A1 | 2/2012 | Tanigawa et al. | |
| 2012/0092651 A1 | 4/2012 | Molin et al. | |
| 2014/0146312 A1 | 5/2014 | Perron et al. | |
| 2014/0176937 A1 | 6/2014 | Liu et al. | |
| 2014/0362367 A1 | 12/2014 | Chen et al. | |

FOREIGN PATENT DOCUMENTS

| | | |
|---|---|---|
| WO | 2013/023425 A1 | 2/2013 |
| WO | 2014/201057 A2 | 12/2014 |

OTHER PUBLICATIONS

Cyr, N., "Polarization-Mode Dispersion Measurement: Generalization of the Interferometric Method to Any Coupling Regime," Journal of Lightwave Technology, 22(3):794-805, Mar. 2004.

Cyr, N., et al., "Random-Scrambling Tunable POTDR for Distributed Measurement of Cumulative PMD," Journal of Lightwave Technology, 27(18):4164-4174, Sep. 2009.

Faustini, L., et al., "Bend Loss in Single-Mode Fibers," Journal of Lightwave Technology, 15(4):671-679, Apr. 1997.

Galtarossa, A., et al, "Statistical characterization of fiber random birefringence," Optics Letters, 25(18):1322-1324, Sep. 2000.

Galtarossa, A., et al., "Measurement of Local Beat Length and Differential Group Delay in Installed Single-Mode Fibers," Journal of Lightwave Technology, 18(10):1389-1394, Oct. 2000.

Galtarossa, A., et al., "Single-End Polarization Mode Dispersion Measurement Using Backreflected Spectra Through a Linear Polarizer," Journal of Lightwave Technology, 17(10):1835-1842, Oct. 1999.

Gardner, W.B., "Microbending Loss in Optical Fibers," The Bell System Technical Journal, 54(2):457-465, Feb. 1975.

International Search Report and Written Opinion mailed on Feb. 19, 2015 for International Application No. PCT/US2014/041798, filed Jun. 10, 2014 (9 pages).

JDSU, "Macrobend Detection Using an OTDR," JDS Uniphase Corporation, White Paper, 4 pages, (2007).

Kim, B.Y., et al., "Backscattering measurement of bending-induced birefringence in single mode fibres," Electronics Letters, 17(5):193-194, Mar. 1981.

Li, M.-J., et al., "Ultra-Low Bending Loss Single-Mode Fiber for FTTH," Journal of Lightwave Technology, 27(3)376-382, Feb. 2009.

Palmieri, L., et aL, "Distributed Characterization of Bending-Induced Birefringence in Spun Fibers by means of P-OFDR," Conference on Optical Fiber Communication, collocated National Fiber Optic Engineers Conference (OFC/NFOEC), San Diego, CA, Paper OWS2, pp. 1-3, Mar. 2010.

Poole, C.D., et al., "Polarization-Mode Dispersion Measurements Based on Transmission Spectra Through a Polarizer," Journal of Lightwave Technology, 12(6):917-929, Jun. 1994.

Smith, A.M., "Birefringence induced by bends and twists in single-mode optical fiber," Applied Optics, 19(15)2606-2611, Aug. 1980.

Sunnerud, H., et aL, "Measurement of Polarization Mode Dispersion Accumulation Along Installed Optical Fibers," IEEE Photonics Technology Letters, 11(7):860-862, Jul. 1999.

Sunnerud, H., et al., "Polarization-Mode Dispersion Measurements Along Installed Optical Fibers Using Gated Backscattered Light and a Polarimeter," Journal of Lightwave Technology, 18(7):897-904, Jul. 2000.

Ulrich, R., et al., "Bending-induced birefringence in single-mode fibers," Optics Letters, 5(6):273-275, Jun. 1980.

Wang, Q., et al, "Theoretical and experimental investigations of macro-bend Losses for standard single mode fibers," Optics Express, 13(12):4476-4484, Jun. 2005.

Zendehnam, A., et al., "Investigation of bending loss in a single-mode optical fiber," Pramana—Journal of Physics, 74(4):591-603, Apr. 2010.

* cited by examiner

DEVICES AND METHODS FOR CHARACTERIZATION OF DISTRIBUTED FIBER BEND AND STRESS

CROSS REFERENCE TO RELATED APPLICATIONS

This patent document claims the benefit of priority of U.S. Provisional Patent Application No. 61/833,437 entitled "CHARACTERIZATION OF DISTRIBUTED FIBER BEND AND STRESS BASED ON DISTRIBUTED MEASUREMENT OF BEND AND STRESS INDUCED BIREFRINGENCE FOR DETERMINING FIBER RELIABILITY" and filed on Jun. 10, 2013.

This patent document further claims the benefit of priority of U.S. Provisional Patent Application No. 61/833,441 entitled "DISTRIBUTED FIBER BEND AND STRESS MEASUREMENT FOR DETERMINING OPTICAL FIBER RELIABILITY BY MULTI-WAVELENGTH OPTICAL REFLECTOMETRY" and filed on Jun. 10, 2013.

The entire content of the before-mentioned patent applications is incorporated by reference as part of the disclosure of this document.

TECHNICAL FIELD

This patent document relates to fibers and characterization of fibers in various fiber systems and fiber devices.

BACKGROUND

An optical fiber tends to be subject to bending, forces or stresses in applications. For example, fibers used for an optical network or fiber communication link, such as International Telecommunication Union recommended ITU-T G.652 single-mode optical fiber and cable, would suffer a fiber bend or stress loss which may adversely affect the performance or reliability of the fiber. Such fiber bending or stress could be measured by a commercial multiple-wavelength optical time domain reflectometer (OTDR), e.g. at 1310 nm or 1550 nm, to distinguish a bend loss from other types of losses, e.g. broken, connection loss, etc., uses measured different bend losses information at different wavelengths where usually a bend loss is higher at a short wavelength than that of at a long wavelength.

SUMMARY

This patent document discloses technology for characterization of fibers in various fiber systems and fiber devices, including, among others, methods and apparatus for distributed measuring at least one fiber bend or stress related characteristics along an optical path of fiber under test (FUT) uses both a light input unit and a light output unit connected to the FUT at one single end.

The disclosed technology relates to measuring distributed bend- or stress-dependent characteristics of light paths and can be applicable to the distributed measurement of fiber birefringence induced from a fiber bend or stress, for example, bend or stress radius, bend or stress length, bend or stress strength, fiber reliability, fiber lifetime, etc., at a particular fiber distance (position), at or over a specified wavelength range, of an optical path which comprises mostly optical waveguide, such as an optical fiber link, for example, for an optical fiber used for the fiber to the home (FTTH) or any access optical networks (FTTx) or multi-dwelling unit (MDU).

One aspect of the disclosed technology is the light input unit injects into the FUT at least partially coherent and polarized light having a controlled input state of polarization (I-SOP) by an input polarization controller (I-PC), the output light unit extracts corresponding light from the FUT, analyzes and detects the extracted output light corresponding to at least one transmission axis of an output polarization controller (O-PC) or an output polarization analyzer by an analyzed output state of polarization (O-SOP), and processes the corresponding electrical signal to obtain transmitted coherent optical power for at each group consisting of at least two distances of the FUT, wherein the short-distance ($z_S$) and long-distance ($z_L$) said distances in each said group of distances being closely-spaced and the each said group having at least one pair of detected signals, having two or more pairs of detected signals, a processing unit then computes at least one difference in a measured optical parameter corresponding to each distance in each group of distance pair, the measured optical parameter being proportional to the power of the said analyzed and subsequently detected light, thereby defining a set of at least one measured optical parameter differences; computes the root mean-square or absolute mean value of said set of differences; and calculating the at least one polarization and or fiber birefringence and or bend or stress related FUT characteristics, for example fiber birefringence, bend or stress radius, bend or stress strength, bend or stress length, as at least one predetermined function of said root mean-square or absolute mean value, the predetermined function being dependent upon the small fiber distance difference between the distances corresponding to the said each at least said two pairs of closely-spaced distances, and a processing unit further computes at least one bend or stress related fiber characteristics, for example, a fiber mechanical reliability and or an expect lifetime and or a failure rate statistics and or a bend or stress induced loss of bended or stressed fiber for the optical fiber cable being used for a access optical network, for example fiber to the home (FTTH) or multi-dwelling unit (MDU) scenarios, as at least one predetermined function of said the at least one polarization and or fiber birefringence and or bend or stress related FUT characteristics along an optical fiber path.

Another aspect includes a polarization-sensitive optical frequency domain reflectometer device for measuring a distributed fiber bend or stress in a fiber under test based on optical polarization sensing. This device includes a light source that produces probe light that is at least partially coherent; an optical unit that couples the probe light into a fiber link under test in an input state of polarization (I-SOP) and receives reflected probe light from the fiber link under test in an output state of polarization (O-SOP) to produce first and second optical signals in two different optical polarizations from the reflected probe light; an optical coupler that couples a portion of the probe light as an optical local oscillator light; an optical detection unit coupled to receive the optical local oscillator light and the first and second optical signals and configured to mix the optical local oscillator light with the first and second optical signals to perform coherent detection of the first and second optical signals; and a signal processor that processes information from the coherent detection of the first and second optical signals to compute a difference in measurements of an optical parameter in reflected probe light from two different locations in the fiber under test and compute a polarization-dependent property of a fiber bend or stress from the computed difference at different positions along a fiber path in the fiber link under test to provide an assessment of the fiber bend or stress in the fiber link under test.

In yet another aspect, a method is provided for using optical time domain reflectometer (OTDR) to measure a fiber link under test and includes operating a light source to produce probe light at different optical wavelengths; directing the probe light into a fiber link under test; directing reflected probe light from the fiber link under test into an optical detector to produce a detector signal; and processing information from the detector signal to determine a fiber bend or stress present in the fiber link under test. The processing includes computing a first optical power difference in reflected optical signals from two different locations in the fiber under test at each of two or more different optical wavelengths; computing a second optical power difference in reflected optical signals from each of the two different locations in the fiber under test at the two different optical wavelengths; using the information on the first and second optical power differences to obtain optical loss caused by a fiber bend or stress present in the fiber link under test; and using the optical loss caused by a fiber bend or stress present in the fiber link under test to determine a parameter of the fiber bend or stress.

Those and other aspects and their implementations are described in greater detail in the drawings, the description and the claims.

DETAILED DESCRIPTION

Figure 1:
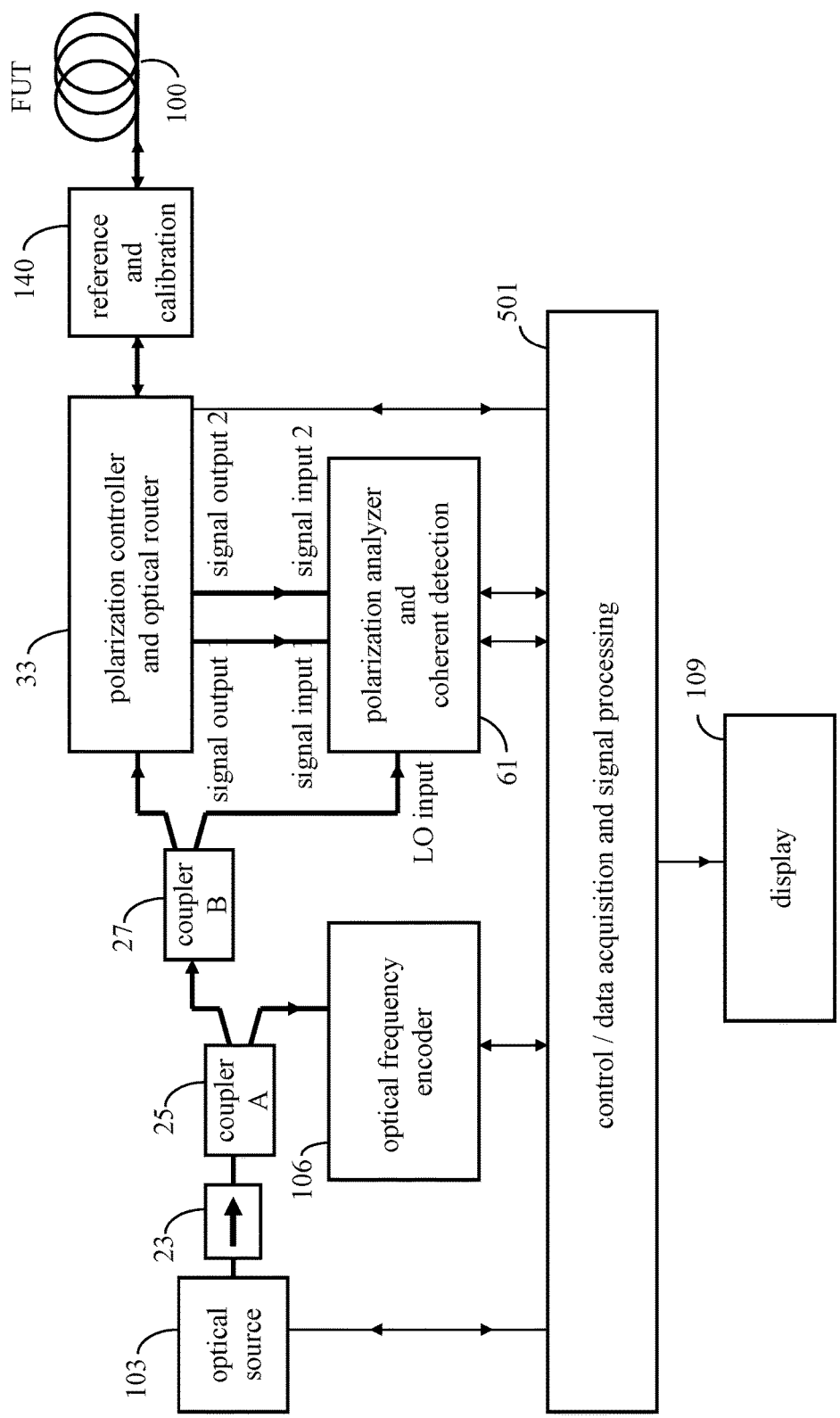
FIG. 1 is a block diagram of a polarization-sensitive optical frequency domain reflectometer (POFDR) embodying these aspects of the disclosed technology.

The following sections describe the technology in U.S. Provisional Patent Application No. 61/833,437 entitled "CHARACTERIZATION OF DISTRIBUTED FIBER BEND AND STRESS BASED ON DISTRIBUTED MEASUREMENT OF BEND AND STRESS INDUCED BIREFRINGENCE FOR DETERMINING FIBER RELIABILITY" and filed on Jun. 10, 2013

Some commercial fibers used for access optical networks (FTTx) or multi-dwelling unit (MDU), e.g., recently developed new bend insensitive optical fiber such as the International Telecommunication Union's recommendation G.657 (Characteristics of a bending-loss insensitive single-mode optical fibre and cable for the access network), can be subject to significantly bending without exhibiting any noticeable optical loss due to fiber bending or under stress. In such fibers, it would be difficult for using currently commercial available OTDR to measure this type of fiber bend or stress using a conventional technique mentioned above, but it is still important even more critical to measure a fiber bend or stress characteristics for an estimation of a fiber reliability or a fiber lifetime or a fiber failure statistics for a fiber network, e.g., for the FTTx, FTTH, MDU, etc., quality analysis and lifetime estimation.

Thus, there is a need for a new method for characterizing such bend- or stress-related fiber characteristics as a function of distance along a fiber link, for example, from a single-end of the FUT, that can be used for the field test and measurement and monitoring for the optical networks, for example, FTTH, FTTx, MDU, etc.

One potential test method to measure fiber bend or stress is to measure a bend induced birefringence. The birefringence is defined as the local absolute value of the difference between the propagation constants of two orthogonal polarization modes in optical fibers used for optical communications systems that can be expressed as $$\Delta\beta = \frac{2\pi v}{c}\Delta n,$$

where c is the speed of the light in vacuum, $\Delta n$ is the refractive index difference, and v is the light frequency. The birefringence in the fiber can be generated by many factors, for example from environment or fiber installation situation, for example, from bend, twist, anisotropic stress on an optical fiber, and such factors may also be varied with ambient conditions such as temperature. For example, the birefringence $\Delta\beta$ can be induced by the fiber bend or stress during the fiber installation and is proportional to $1/R^2$, where R is the bend radius [R. Ulrich, S. C. Rashleish, W. Eickhott, "Bending-induced birefringence in single-mode fibers", Optics Letters, Vol. 5(6), pp. 273-275 (1980)]. Highly bent or stressed fiber can induce significantly fiber birefringence that may also reduce the fiber lifetime or even to cause a fiber broken later. This is particularly problematical for the highly bent installed optical fiber at home for the FTTH application, for example, the fiber could be "clappered" or "bended" by a cover of fiber distribution box during installation. Thus, it is desirable to be able to obtain the local birefringence values or local bend or stress properties to know fiber bend or stress characteristics, for example, bend or stress radius, bend or stress strength and their length, etc., along the optical fiber so as to reduce or remove the bended or stressed fibers at an early stage. If the actual local birefringence values or local bend or stress characteristics of a communications optical fiber link (e.g. G.652, G.657) can be determined, it is possible to accurately estimate the installed fiber reliability or quality or even fiber lifetime.

Depending on the application, it is desirable to measure the birefringence for estimating the bend-related properties [A. M. Simith, "Birefringence induced by bends and twists in single-mode optical fiber", Applied Optics, Vol. 19(15), pp. 2606-2611 (1980)] at a given distance. However, in many practical cases, it is not possible to measure the fiber birefringence at a given precision position by a commercial available OTDR. This is because such bend or stress often occurs in a very short distance, for example of 1 to 50 mm, and a commercial OTDR has a limited spatial resolution as such as large as 500 mm for commonly designed test wavelengths, for example 1310 nm and 1550 nm. However, the fiber birefringence may be induced by a small bend radius, such as of 1-50 mm as mentioned above, or there may be no or negligible loss from the bended or stressed fiber, especially for these recently new developed bend insensitive fiber, and hence it is not possible to obtain a reliable determination of the bend or stress properties of an installed optical fiber.

There is a number of approaches are known in the art for the measurement of the local birefringence along a fiber length.

Kim, et al, described the local distributed measurement of the birefringence in a very low birefringence single mode fiber by analyzing the backscattered light, where bending-induced birefringence measurements for various bending radii were reported in good agreement with those calculated (Electronics Letters, 5 Mar. 1981, Vol. 17, No. 5, pp. 193-194). However such method has several disadvantages as of a very poor spatial resolution of 1 meter when using a 10 ns OTDR pulse, unreliable results because there is no any polarization controller for the launched light and the analysis light and as well it would be very sensitive to the environment, e.g. fiber moving. Galtarossa, et al, reported spatially-resolved distributed measurements of fiber birefringence for single-mode fibers (Galtarossa et al, "Statistical characterization of fiber random birefringence", Optics Letters, Vol. 25, No. 18 pp. 1322-1324 (2000)) but its spatial resolution is limited to 0.5 m due to a 5 ns OTDR pulse being used. Palmieri, et al, reported spatially-resolved distributed measurements of bending-induced birefringence for single-mode spun fibers by using a polarization-sensitive optical frequency domain reflectometer (POFDR) (OFC/NFOEC, 21-25 Mar. 2010, Page OWS2), where the combined effect of spin rotation and bending birefringence is presented. However, such measurement cannot provide reliable measurement for the fiber birefringence or bend proprieties, such as bend radius, bend length, and bend strength, due to sensitive to the environment, e.g. fiber moving, thus it may not be practical to be developed for the field test and measurement application.

In using OTDR to measure the local birefringence along an optical fiber, a linear polarizer can be inserted at the light in and output port for measurements such as in a polarization sensitive OTDR (POTDR). Such POTDR basically measures local birefringence (1/beat-length) as a function of distance z along the fiber, or, in other words, distributed birefringence. Referring to the simple example of a retardation waveplate, the birefringence is the retardation (phase difference) per unit length between the "slow" and "fast" axes. Therefore, the retardation can be determined by the product of the birefringence and the thickness of the waveplate. Indeed it is suitable for measuring major commercial optical fibers, e.g. SMF-28, that typically have a beating length of ~5 m up to ~100 m. However, it is not possible or rather difficult to measure small bend length in mm scale, for example, for the FTTH application, because of its limited spatial resolution, e.g. a smallest spatial resolution of 500-1000 mm. Also although it is possible to use very narrow light pulse for an OTDR to obtain a high spatial resolved OTDR trace, it would require an expensive laser and a high bandwidth electronics. For example, in known techniques require the use of short pulses; "short" meaning shorter than the beat length of any interested event length of the FUT, e.g. a few to tens mm scale for a potential "human" induced bending. In order for them to measure birefringence in fibers properly, without being limited to fibers of short beat length, one must use very short OTDR optical pulse width, e.g. typically of ~10 to 100 ps, and such OTDR also requires a very wide electronic bandwidth, e.g. of over several GHz. On the other hand, if a long light pulse is used, only fibers having long beat lengths can be measured. Hence, although it might be possible, using known techniques and meeting the above-mentioned requirements, to make a reasonably successful and reliable field measurements of mm to cm scale birefringence from a bend during the fiber installation, e.g. FTTH, at present their scope of application and performance would be insufficient for a commercially-viable, stand-alone instrument.

It should be noted that a conventional polarization sensitive OTDR with a linear polarizer inserted before the output and input port could measure the fiber birefringence via beating length measurement for the standard optical fiber, however, such method is difficult to measure the local birefringence for a small distance of few mm to few cm that is not only limited by a conventional OTDR spatial resolution, e.g. of 50 to 100 cm, but also such measurement would not be reliable because of only a single input SOP is used.

It is also known that to use a polarimeter could measure the local birefringence along the test fiber path. However, again it would also provide a problematic measurement result due to fiber moving or vibration, etc. to induce an instability of the light SOP that is travelled inside the FUT during the measurement period or an instrument may be designed very expensively.

It should be noted distributed PMD can be measured by the fixed analyzer or equivalently wavelength scanning method, as described by H. Sunnerud, et al (H. Sunnerud, B.-E. Olsson, M. Karlsson, P. A. Andrekson, "Measurement of Polarization Mode Dispersion Accumulation Along Installed Optical Fibers", IEEE Photonics Technology Letters, Vol. 11 No. 7, Jul. 1999, pp. 860-862) that was suffered significantly long measurement with reliability problem of fiber polarization fluctuation during the testing. A first successful commercial test and measurement instrument (FTB-5600, EXFO Inc.) for the field distributed PMD measurement was using random-scrambling technique, where many uncorrelated measurements are performed for many "closely-spaced optical frequency pairs" over a large wavelength to estimate a distributed cumulative PMD along the fiber so as to significantly reduce the measurement sensitivity to moving of the test fiber (N. Cyr, H. Chen, U.S. Pat. No. 7,920,253, "Polarization optical time domain reflectometer and method of determining PMD"; N. Cyr, H. Chen, G. W. Schinn, "Random-Scrambling Tunable POTDR for Distributed Measurement of Cumulative PMD", Journal of Lightwave Technology, vol. 27(18), pp. 4164-4174 (2009)). However, such measurement technique could not provide high spatial-resolved distributed birefringence measurement neither fiber bend information, especially this instrument is limited to have a best spatial resolution of 5-10 m.

In summary, there is a need for a new method for characterizing such high spatial resolved polarization-dependent and or birefringence-dependent and or bend- or stress-dependent characteristics as a function of distance along a fiber link from a single-end of the FUT that is inherently robust to fiber movements and perturbations found in field conditions with high spatial resolution and does not require expensive laser, polarization optics, and electronics.

The disclosed technology in this patent document can be implemented in certain ways to eliminate, or at least mitigate, the disadvantages or limitations discussed above. The disclosed methods or devices can be used to provide more effective or alternative fiber characterization.

According to a first aspect of the disclosed technology, there is provided a method of measuring at least one polarization-dependent and or birefringence-dependent bend- or stress-related characteristics of an optical path using light input means and light output means connected to the optical path at adjacent end, the light input means comprising light source means for supplying at least partially polarized light and means for controlling the input of the state of polarization (I-SOP) by an input polarization controller (I-PC) or an input polarization generator (I-PSG) of the at least partially polarized light and injecting the light into the FUT, and the output light means comprising means for extracting corresponding light from the FUT, detection and analyzing means for analyzing the output state of polarization (O-SOP) of extracted light from an output polarization controller (O-PC) or an output analyzer corresponding to the at least one transmission axis of the analyzer means to provide transmitted coherent optical power at each distance of an optical path in each of at least one group of a pair of distances, wherein the short-distance ($z_S$) and long-distance ($z_L$) said distances in each said group of distances being closely-spaced; and wherein the source and detection means are at the same end of the FUT and the light source comprises either CW lights or temporal pulses; and wherein the said group comprises a distance pair, said pair in each group corresponding to a small fiber distance (i.e. length) difference, and wherein the I-SOP and O-SOP are substantially constant for each said distance in each said group, and wherein at least one of the I-SOP and O-SOP is different between the respective said groups, the method including the steps of:
i. Computing the at least one difference in a measured optical parameter corresponding to each distance in said distance pair for each of the said at least one group, said measured optical parameter being proportional to the intensity of the said analyzed and subsequently detected light, thereby defining a set of at least one measured optical parameter difference;
ii. Computing the mean-square (or root-mean-square) or absolute value of said set of difference(s) as a function of the fiber distance;
iii. Calculating the at least one polarization-dependent or birefringence-dependent bend- or stress-related FUT characteristics as at least one predetermined function of said mean-square or absolute value, the predetermined function being dependent upon the small fiber distance or length difference between the distances corresponding to the each at least said one pair of closely-spaced fiber positions or locations;
iv. Computing the value of the at least one polarization and or fiber birefringence dependent bend- or stress-related FUT characteristics along an optical fiber path; and
v. Outputting the value of said at least one bend or stress related fiber characteristics, for example, a mechanical reliability or an expected lifetime or a failure rate statistics for bended or stressed fiber for the access optical networks, for example fiber to the home (FTTH) or multi-dwelling unit (MDU) scenarios, etc. (not limited), as at least one predetermined function of said at least one polarization-dependent or birefringence-dependent bend- or stress-related FUT characteristics along an optical fiber path.

In implementations, for measurement of birefringence, NO, at a specified distance z for each group includes distance pair having substantially said prescribed center distance, and the the at least one polarization-related FUT characteristics is the root-mean-square (RMS) or absolute mean value at the said center distance.

The measured optical parameter may be the computed normalized power, T(z, ω), and said predetermined function can be expressed for two uncorrelated the I-SOP and O-SOP, i.e. to use two uncorrelated polarization controllers, for a small fiber distance/length differences (Δz), according to the following differential formula, $$\Delta\beta(z,\omega) = \alpha_s \cdot \frac{\sqrt{\langle\Delta T^2(z,\omega)\rangle_{SOP}}}{\Delta z}$$

where the $\langle\ \rangle_{SOP}$ is averaged over at least one or more, or all I-SOPs and O-SOPs, the constant $\alpha_s = 3\sqrt{2}$, $\omega = 2\pi\nu$ ($\nu$ is the optical frequency), and z is the optical fiber distance corresponding to the said center distance. Alternatively the said measured optical parameter may be the computed normalized power T (z, ω), and said predetermined function can be expressed for correlated the I-SOP and O-SOP, i.e. if a common (same) state of polarization controller is used as both the I-SOP and O-SOP, for small distance differences (Δz), according to the said above differential formula with the constant $\alpha_s = \sqrt{15}$.

The measured optical parameter may also be the computed normalized power, T(z, ω), and the predetermined function can be expressed for two uncorrelated the I-SOP and O-SOP, i.e. to use two uncorrelated polarization controller, for small fiber distance/length differences (δz), according to the following differential formula, $$\Delta\beta(z,\omega) = \alpha_s \cdot \frac{\sqrt{\langle\Delta T^2(z,\omega)\rangle_{SOP,\omega}}}{\Delta z}$$

where the $\alpha_s = 3\sqrt{2}$, the $\langle\ \rangle_{SOP,\omega}$ is averaged over both I/O-SOPs, and optical frequency range. Alternatively the said measured optical parameter may be the computed normalized power, T(z, ω), and said predetermined function can be expressed for correlated the I-SOP and O-SOP, i.e. if a common (same) state of polarization controller is used as both the I-SOP and O-SOP, for small distance differences (δz), according to the differential formula with the constant $\alpha_s = \sqrt{15}$ and z is the optical fiber distance corresponding to the center distance.

It should be noted that the measured birefringence at a specified distance z, Δβ(z, ω)), is the roundtrip birefringence value, and the forward fiber birefringence value (instead of the roundtrip birefringence value) may be calculated so as to estimate the fiber quality or lifetime or pass/fail situation, thus the forward distributed local birefringence may be computed from the measured roundtrip birefringence value by multiplying by a roundtrip factor as, $$\Delta\beta(z,\omega) = \eta \cdot \Delta\beta(z,\omega)$$

and $$\langle\Delta\beta(z)\rangle = \eta \cdot \langle\Delta\beta(z)\rangle$$

where η=0.5 or η≈0.61. It should be noted that a linear component of a forward (one way) local birefringence could be calculated by using η=0.5 for applying two independent I-PC and O-PC. An overall forward (one way) local birefringence could be calculated by using η≈0.61 or $$\eta = \sqrt{\frac{3}{8}}.$$

The first bend or stress parameter may be the computed by the bend induced birefringence parameter Δβ(z, ω) or <Δβ(z)> and said predetermined function according to the following differential formula, $$R = \frac{C}{\sqrt{\Delta\beta(z, \omega)}}$$

or $$R = \frac{C}{\sqrt{\langle\Delta\beta(z)\rangle}}$$

where the R is the bend or stress radius or bend or stress strength and the C is the constant that depends on the optical frequency and fiber properties, e.g. fiber cladding, refraction index, etc.

The second bend or stress parameter may be a bend length that is calculated from the said measured bend induced birefringence length. The bend induced birefringence length may be extracted from measured OFDR or OTDR trace that may be obtained after one or averaging over part of or all I/O-SOPs and center wavelengths.

In some implementations, for measurement of at least one the bend or stress related fiber characteristics, for example, a mechanical reliability and or an expect lifetime and or a failure rate statistics for bending of fiber, is calculated as one predetermined function of said the at least one bend related FUT characteristics along an optical fiber path.

Advantageously a high spatial resolution optical reflectometry may be applied for the said bend or stress related fiber characteristics measurement, for example OFDR, photo-counting OTDR, or high spatial resolved OTDR.

A polarization sensitive OFDR (POFDR) may be used to achieve a high spatial resolution for the said at least one birefringence-dependent bend or stress related fiber characterization, where an optical frequency encoder may be used by detecting these "zero-crossings" from a "sine" or "cosine" type interference signals from a reference or clock interferometer for the clock trigger signal generation for the data sampling.

Alternatively a POFDR may be used to achieve a high spatial resolution for the said at least one birefringence-dependent bend or stress related fiber characterization, where an optical frequency encoder may be used by detecting these "zero-crossings" from the "sine/cosine type" interference signals with a 90 degree phase difference from a reference or clock interferometer and or their squared sine (or squared cosine) for the clock trigger signal generation for the data sampling, and such 90 degree phase different "sine/cosine type" (two) interference signals may be obtained by using two interferometers, either dependently or independently, with the approximately the same or similar interferometer characteristics but with a phase difference of about 90 degree, for example achieved by a phase shifter.

Alternatively a POFDR may be used to achieve a high spatial resolution for the said at least one birefringence-dependent bend or stress related fiber characterization, where an optical frequency encoder may be used by detecting these "zero-crossings" from three correlated interference signals with 120 degree phase difference from a reference or clock interferometer, for example by using an approximately symmetric 3×3 coupler, for the clock trigger signal generation for the data sampling.

A sampling clock signal may be generated from each "zero-crossing" of the said interference signal at a same or approximately closed time of "zero-crossing" by a revenant electronic circuit.

A POFDR may be used to achieve a high spatial resolution for the said at least one birefringence-dependent bend or stress related fiber characterization, where the said optical parameter may be measured by at least one coherent detection for measuring at least one polarization component with or without polarization analyzer, for example a linear polarizer or a polarization beam splitter.

In some implementations, a POFDR for measuring the said at least one birefringence-dependent bend or stress related fiber characteristics uses at least one balanced detector.

Alternatively a POFDR for measuring the said at least one birefringence-dependent bend or stress related fiber characteristics uses at least one conventional detector, i.e. non balanced detector.

Advantageously for the POFDR a reference reflector and a reference length may be used to provide these references for the light reflectivity and intensity. Also by performing at least two measurements for with and without an added additional fibre length on the FUT and or or with and without local oscillation lights would provide additional measurement information to remove those "ghost" events in the measurement.

Alternatively a high spatial resolved polarization sensitive OTDR (POTDR) may be used to measure the said at least one birefringence-dependent bend or stress related fiber characteristics.

Alternatively a high spatial resolved polarization sensitive photon counting OTDR may be used to measure the said at least one birefringence-dependent bend or stress related fiber characteristics.

In some implementations, the POFDR or POTDR may use a coherent noise detection to obtain a coherent noise level so that a coherent noise super-positioned on the FUT optical parameter measurement could be estimated and thereby it could be subtracted from the said measured optical parameter.

Advantageously the said POFDR or POTDR may use an internal reflectivity detection so that reflectivities from a FUT could be estimated accurately.

In some implementations, the POFDR may use an internal length reference to calibrate a FUT distance after the FTT for an acquired OFDR data.

In some implementations, the POFDR may use an additional fiber length to do at least two data acquisitions, at least one acquisition without any additional fiber length and at least one with an additional fiber length, to probe and remove these "ghost events". Such the said additional fiber length may be inserted at any position that could extend or short a test fiber length, for example between an instrument and a FUT, or at any location that could extend or short a local oscillation light length, for example via a 2×2 optical switch.

The POFDR or POTDR polarization analyzer may be measuring at least one polarization component, for example using either a line polarizer or polarization beam splitter, with and without any I-PC or O-PC, or a polarimeter.

The measured optical parameter computation may further include a relative variance calculation to compensate any depolarization and or even any DC offset value. Alternatively such DC offset value could/might be removed by any other methods, for example AC coupler, filtering, etc.

The measured optical parameter may be measured repeatedly for at least two times with the same I/O-SOP controller by the said I/O-PCs.

The mean-square (or root-mean-square) value may be computed by using said repeated measured optical parameters so as to reduce the noises, for example electronic noise, laser intensity or variation noise, laser phase noise, etc.

Alternatively the said mean-square (or root-mean-square) value may be calculated from one single (non-repeated) measured optical parameter "trace", wherein at least two "noise-uncorrelated" but "signal-correlated" data may be extracted from a small distance (or time) shifted the said measured optical parameter "trace".

The said at least one I-SOP and or at least one O-SOP may be controlled by at least one I-SOP or at least one O-SOP randomly or uniformly regarding the Poincare sphere.

According to a second aspect of the disclosed technology, there is provided measurement instrumentation, for measuring at least one polarization-dependent and or or birefringence-dependent bend- or stress related characteristics of an optical path (FUT), comprising: input light means and output light means for connection to the optical path at one end of the FUT for launching incident light, extracting, detecting, and analyzing light that has traveled at least part of the FUT and providing corresponding electrical signals, and processing means for processing the electrical signals from the output light means to determine said at least one polarization-dependent bend- or stress-related characteristics;
  i. Computing the at least one difference in a measured optical parameter corresponding to each distance in said distance pair for each of the said at least one group, said measured power parameter being proportional to the power of the said analyzed and subsequently detected light, thereby defining a set of at least one measured power parameter difference;
  ii. Computing the mean-square or absolute value of said set of differences as a function of fiber distance; and
  iii. Calculating the at least one polarization-dependent and or birefringence-dependent bend- or stress-related FUT characteristics as at least one predetermined function of said mean-square or absolute value, said predetermined function being dependent upon the said small fiber distance or length difference between the distance corresponding to the said each at least said one pair of closely-spaced fiber positions or locations;
  iv. Computing the value of said at least one polarization-dependent and or birefringence-dependent bend- or stress-related FUT characteristics along an optical fiber path; and
  v. Outputting the value of said at least one bend or stress related fiber characteristics, for example, a mechanical reliability and or an expect lifetime and or a failure rate statistics for bended or stressed fiber for the fiber to the home (FTTH) or multi-dwelling unit (MDU) scenarios, as at least one predetermined function of said at least one polarization or fiber birefringence dependent bend- or stress-related FUT characteristics along an optical fiber path.

Specific examples are provided below for operation and data acquisition, data processing and computational methods of "Uniformly or Randomly Scrambled Input/Output SOP Analysis Method for Distributed Birefringence Measurement" and its applications to measure a distributed birefringence-dependent fiber bend or stress by only accessing single end of FUT, for example using high spatially resolved polarization-sensitive optical frequency domain reflectometer (POFDR) or polarization-sensitive optical time domain reflectometer (POTDR) or polarization-sensitive photon counting OTDR.

(A) Embodiments of Uniformly or Randomly Scrambled Input/Output SOP Analysis for Distributed Fiber Bend Induced Birefringence Measurement The various aspects of the disclosed technology, and their respective implementations, are predicated upon the same or similar underlying theory for measuring the same birefringence-dependent bend- or stress-related proprieties of the installed optical fiber link. Embodiments of these aspects can be advantageously used for a single-ended measurement for an optical fiber access network, for example for the FTTx test, measurement and monitoring applications.

In each of the examples of POFDR, there will usually be six main parts as shown in FIG. 1, namely an optical source 103, an optical frequency encoder unit 106, a reference and calibration unit 140, polarization controller and optical router 33, polarization analyzer and coherent detection unit 61, a control and data acquisition, analogue and digital signal processing unit 501, and together with a display unit 109, where all of the components of the measuring instrument are at the same end of the FUT.

Although each instrument in the described examples will have the above-described parts or sections, there will be many detailed differences in configurations for these six units according to the different birefringence-dependent fiber bend or stress measurement methods, namely fiber birefringence measurement based fiber bend or stress determination method.

Figure 4A:
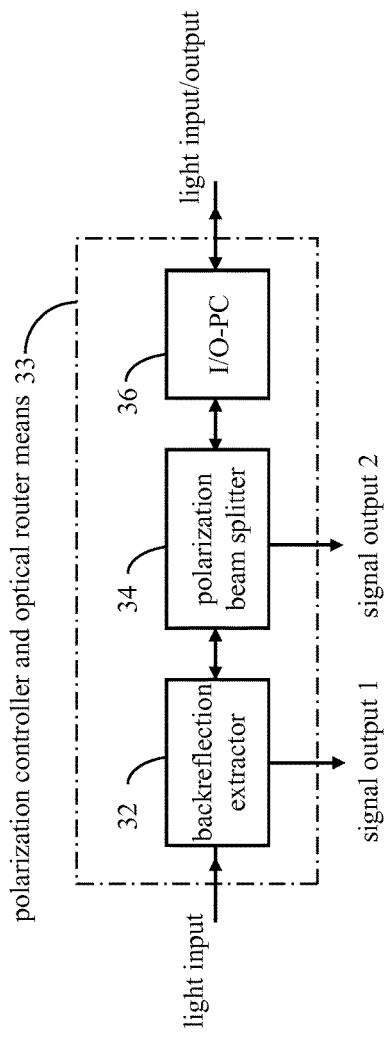
FIG. 4A is a schematic diagram of an aspect of a polarization controller and optical router means embodying in the disclosed technology for the POFDR or OFDR where a single-mode fiber (SMF) may be used.

Thus, for the fiber birefringence measurement based fiber bend determination method it comprises the input optical source controller 103 that will have an at least partially polarized light source, for example a tunable narrow linewidth laser with a linewidth of 1-1000 kHz for a POFDR, see FIG. 1, an input SOP (I-SOP) polarization controller (I-PC) 36 for controlling the SOP of lights from the light source 103 before it is injected into the FUT 100 (FIGS. 4A, 4B, 4C, 4D and 4E), a polarization determination means, either a polarization beam splitter (FIGS. 4A and 4B) or a linear polarizer (FIGS. 4C, 4D and 4E), and an optical router means (i.e. backreflection extractor) (FIGS. 4A, 4B, 4C, 4D and 4E) that could be either an optic circulator or a fiber coupler (or a beam splitter). The fiber pigtails could be either a single-mode fiber (SMF) or a polarization-maintaining fiber (PMF). The polarization controller and optical router means 33 described in FIGS. 4A, 4B, 4C, 4D and 4E uses a common polarization controller for the I/O-SOP polarization controller (I/O-PC), but such I/O-PC could be separated such as in FIG. 4J, where no any polarization determination means, either a polarization beam splitter or a linear polarizer, may be used in the polarization controller and optical router means 33 but it might be used in the polarization analyzer and coherent detection means 61 (FIGS. 5A and 5B). Alternatively different embodiments for the I-SOP and O-SOP controller may be as these configurations shown in FIGS. 4F, 4G, 4H and 4I, where a I/O-SOP could be controlled as either randomly or uniformly regarding to the Poincare sphere, e.g. by a polarization scrambler, or as several know uniform polarization states, e.g. by a polarization state generator (PSG) or input PSG (I-PSG). For the embodiments in FIGS. 4A, 4B, 4C, 4D and 4E with a polarization determination means, either a polarization beam splitter (FIGS. 4A and 4B) or a linear polarizer (FIGS. 4C, 4D and 4E), the polarization analyzer and coherent detection means 61 may use the embodiments in FIGS. 5C, 5D, 5F, 5G and 5H. It should be noted that an O-PC in a POFDR configuration could also be applied to adjust polarization of a LO light as shown in FIG. 5E to analyze the O-SOP.

The polarization analyzer and coherent detection unit 61 (FIGS. 5C, 5F, and 5G) may comprise local oscillation (LO) lights to measure the both signal inputs 1 and 2 by the coherent detections, e.g. each using two detectors A1 and A2 and detectors B1 and B2 (FIGS. 5F and 5G) to have two detection outputs A and B.

Figure 4C:
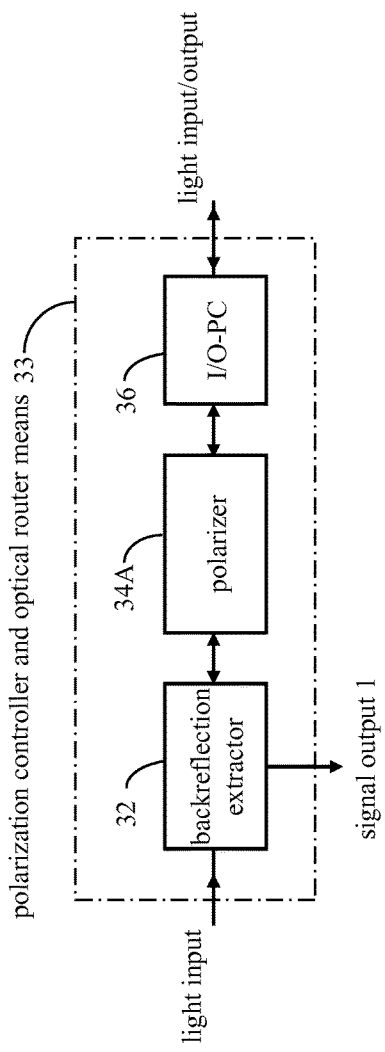
FIG. 4C is a schematic diagram of another aspect of a polarization controller and optical router means embodying in the disclosed technology for the POFDR or OFDR where a SMF may be used.
Figure 4D:
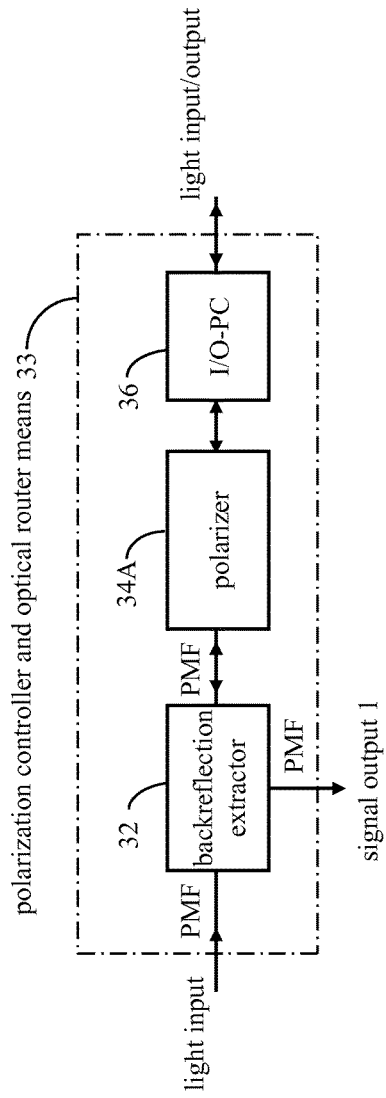
FIG. 4D is a schematic diagram of another aspect of a polarization controller and optical router means embodying in the disclosed technology for the POFDR or OFDR where a PMF may be used for same places.
Figure 4E:
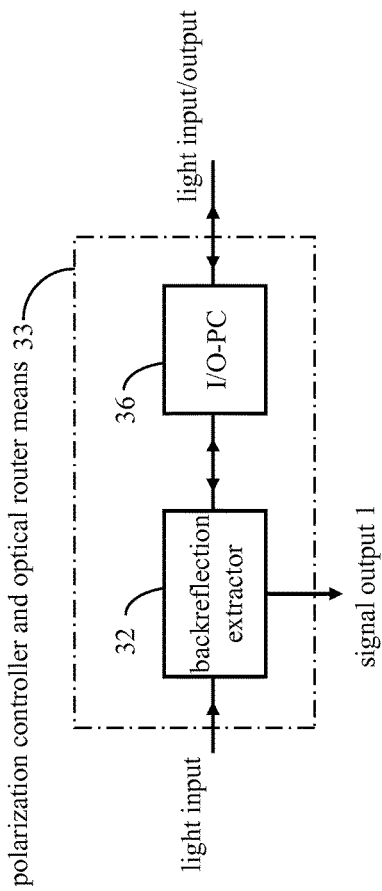
FIG. 4E is a schematic diagram of an aspect of a polarization controller and optical router means embodying in the disclosed technology for the POFDR or OFDR.
Figure 4F:
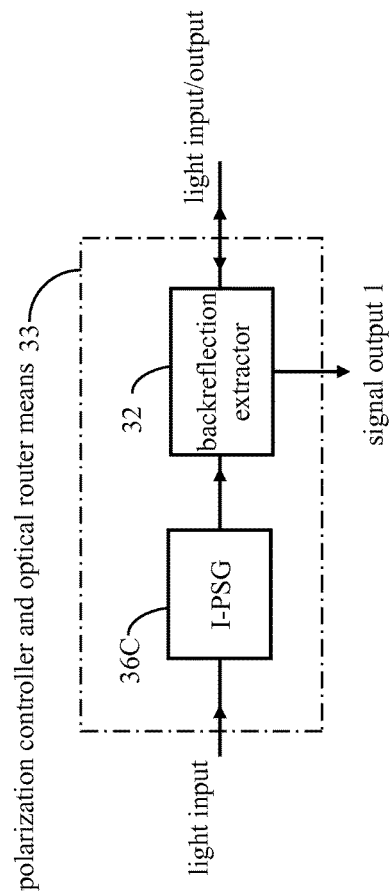
FIG. 4F is a schematic diagram of an aspect of a polarization controller and optical router means embodying in the disclosed technology for the POFDR or OFDR.
Figure 4G:
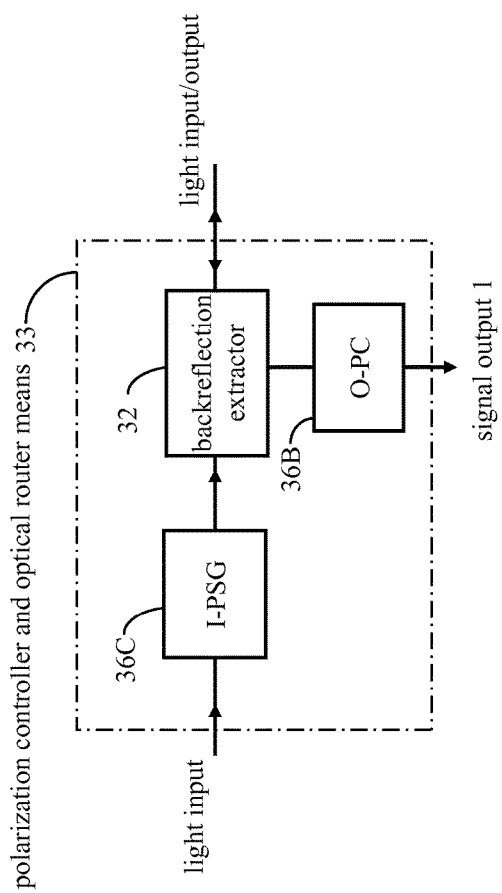
FIG. 4G is a schematic diagram of another aspect of a polarization controller and optical router means embodying in the disclosed technology for the POFDR or OFDR.
Figure 4H:
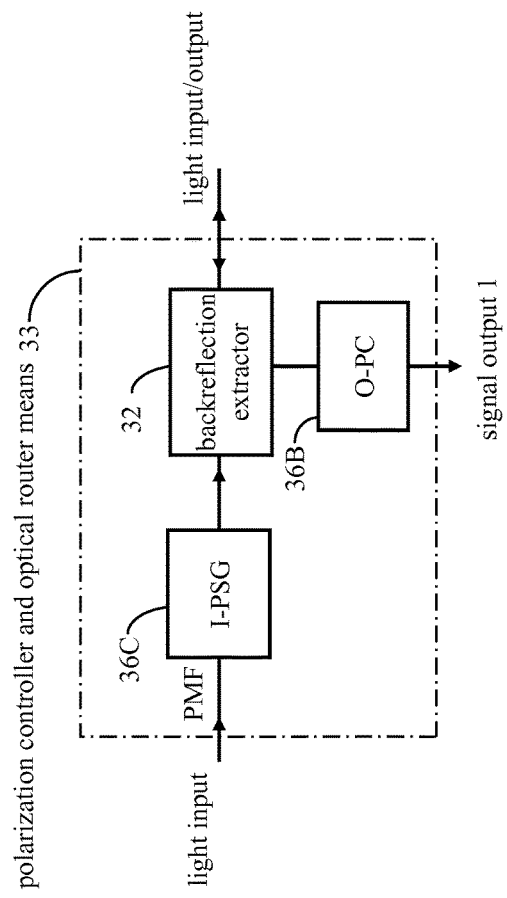
FIG. 4H is a schematic diagram of another aspect of a polarization controller and optical router means embodying in the disclosed technology for the POFDR or OFDR.
Figure 4I:
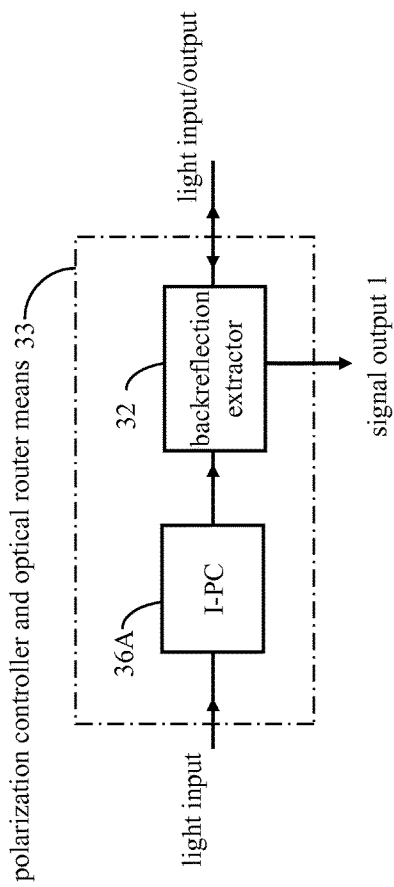
FIG. 4I is a schematic diagram of an aspect of a polarization controller and optical router means embodying in the disclosed technology for the POFDR or OFDR.
Figure 4J:
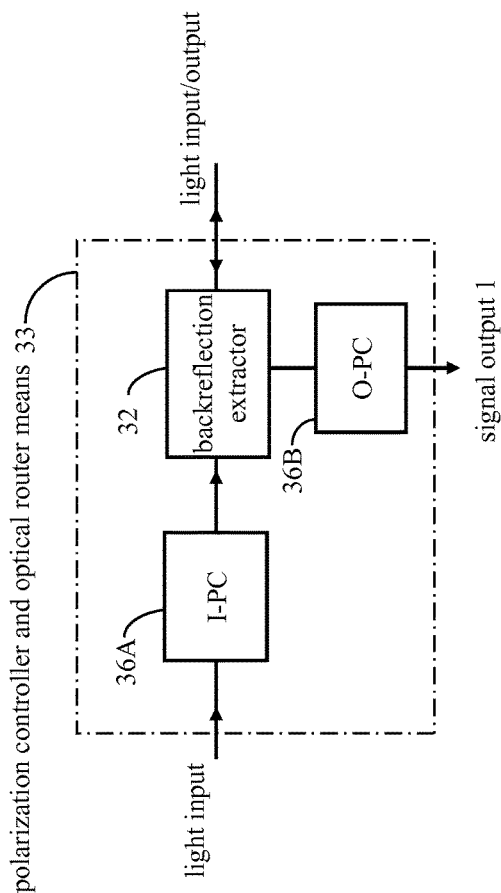
FIG. 4J is also a schematic diagram of an aspect of a polarization controller and optical router means embodying in the disclosed technology for the POFDR or OFDR.
Figure 5A:
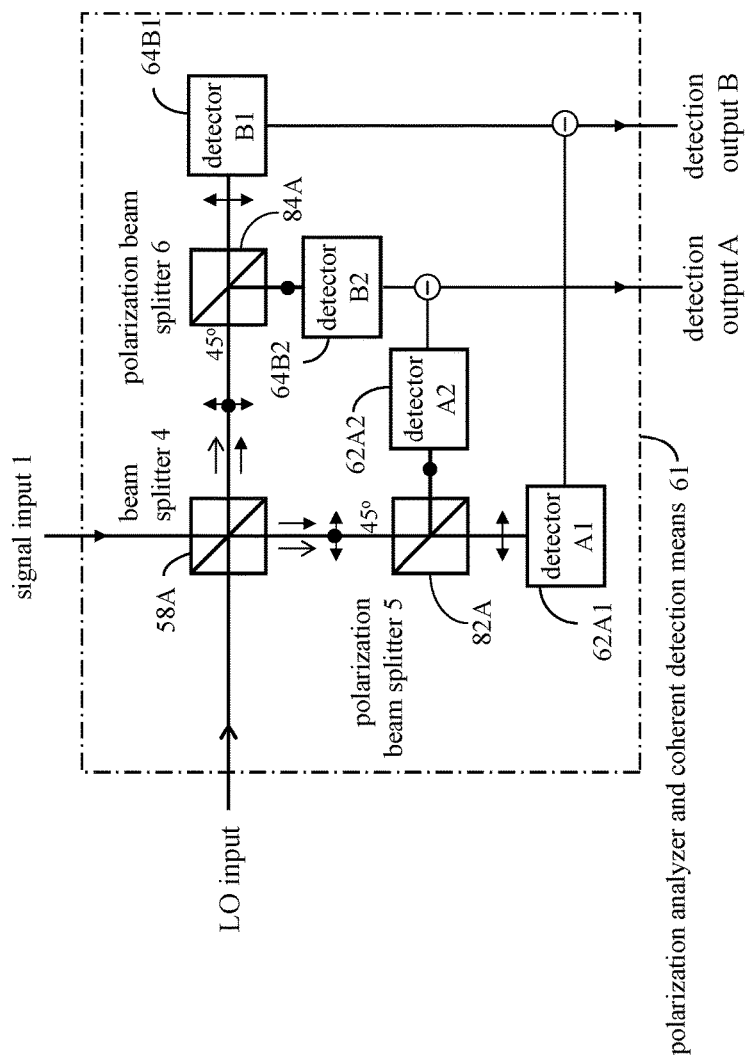
FIG. 5A is a schematic diagram of an aspect of a polarization analyzer and coherent detection means embodying in the disclosed technology for the POFDR or OFDR.
Figure 5B:
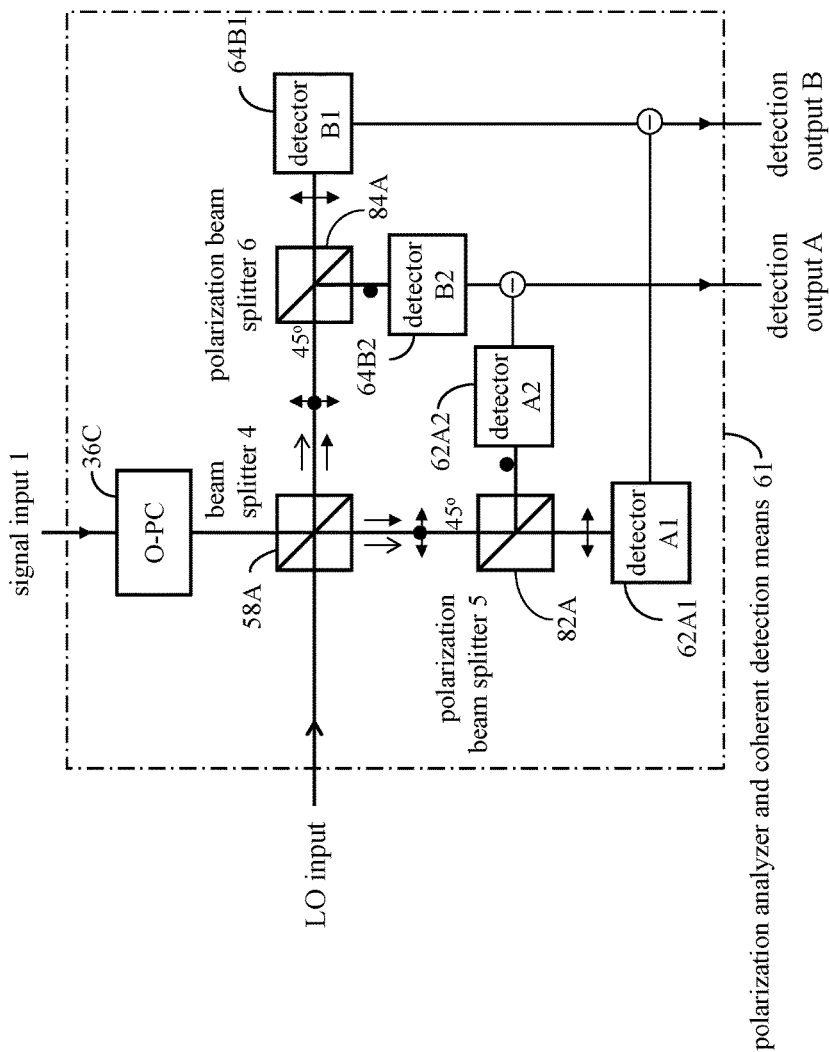
FIG. 5B is a schematic diagram of an aspect of a polarization analyzer and coherent detection means embodying in the disclosed technology for the POFDR or OFDR.
Figure 5C:
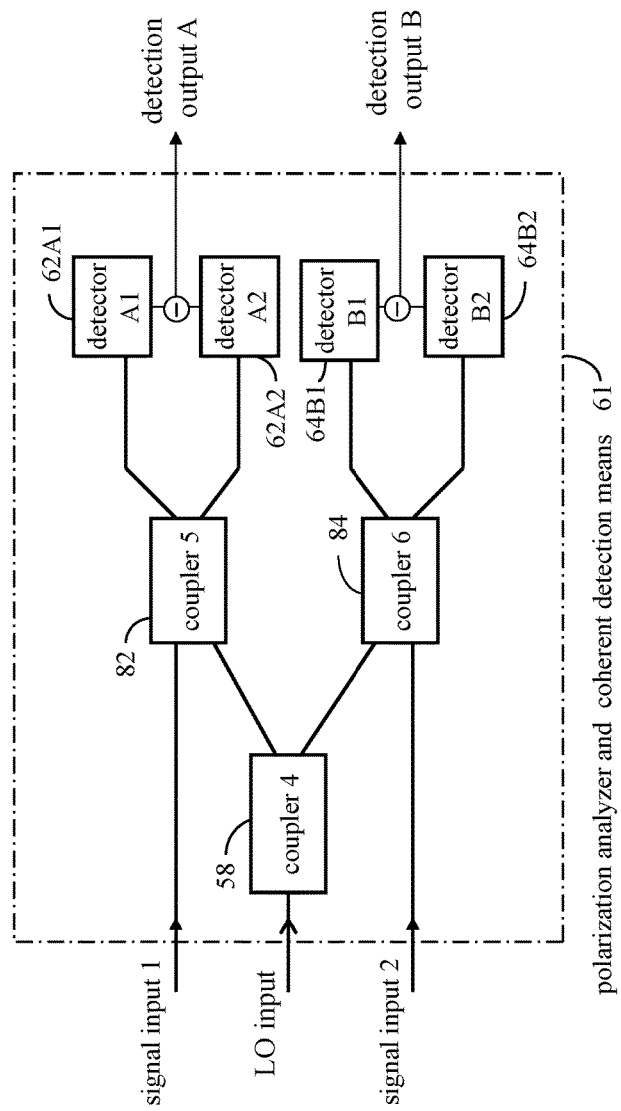
FIG. 5C is a schematic diagram of another aspect of a polarization analyzer and coherent detection means embodying in the disclosed technology for the POFDR or OFDR.
Figure 5D:
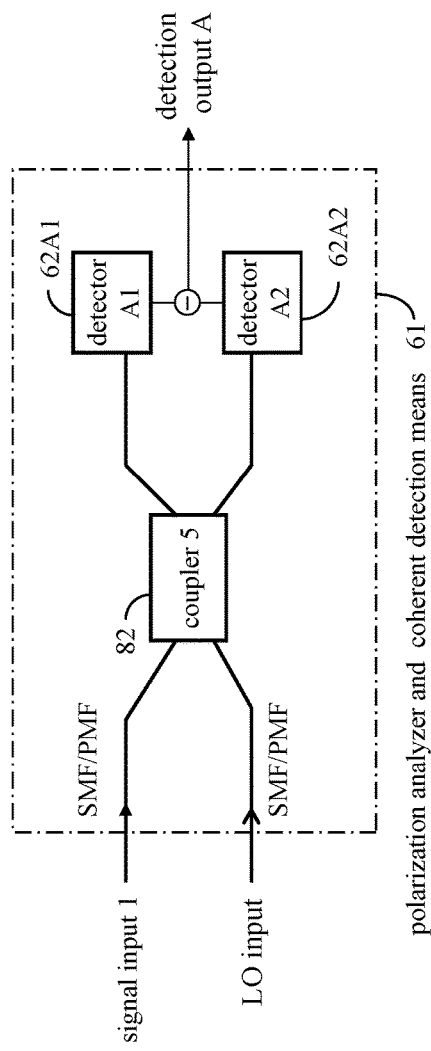
FIG. 5D is a schematic diagram of another aspect of a polarization analyzer and coherent detection means embodying in the disclosed technology for the POFDR or OFDR.
Figure 5E:
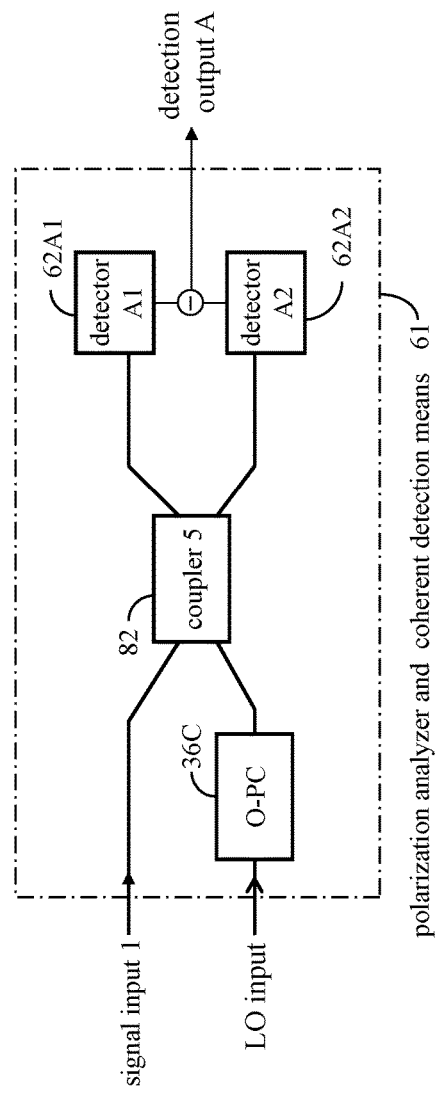
FIG. 5E is a schematic diagram of an aspect of a polarization analyzer and coherent detection means embodying in the disclosed technology for the POFDR or OFDR.

The polarization analyzer and coherent detection unit 61 (FIGS. 5A and 5B) may comprise, in addition to an output SOP (O-SOP) polarization controller (O-PC) 36C (FIG. 5B) or without any O-PC (FIG. 5A), a beam splitter 58A, two polarization beam splitter 82A and 84A and for detectors 62A1, 62A2, 64B1 and 64B2, respectively, to perform coherent detection for first two detectors 62A2 and 64B2, and second two detectors 62A1 and 64B1, or a polarizer 34A (FIGS. 4C and 4D) or even without any polarizer 34A (FIG. 4E) or an input polarization generator (I-PSG) 36C (FIG. 4F), or to use an I-PC 36C and O-PC (FIGS. 4G and 4H), or I-PSG 36C and O-PC (FIGS. 4G and 4H), or an I-PC 36A and O-PC 36B (FIG. 4J), or even an I-PC 36A only (FIG. 4I), where either a SMF or PMF may be used for different embodiments for the light input, the light connection between a backreflection extractor 32 and a polarizer 34A or a polarization beam splitter (PBS) 34 and or signal outputs 1 and 2, and two detectors (FIGS. 5D and 5E). A backreflection extractor 32 could be an optical circulator, a fiber coupler (or a beam splitter), for example 3 dB coupler.

It should be noted that the coherent detection as shown in FIGS. 5A-5G could use only one detector, for example either a detector 62A1, or 62A2, 62B1, or 62B2.

Figure 2A:
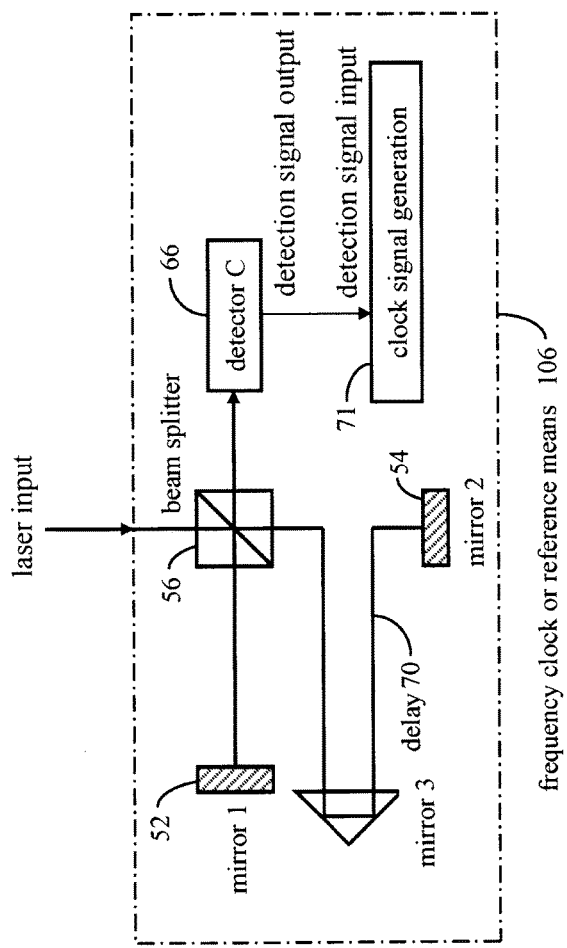
FIG. 2A is a schematic diagram of an aspect of an optical frequency encoder embodying in the disclosed technology for the POFDR or OFDR.
Figure 2B:
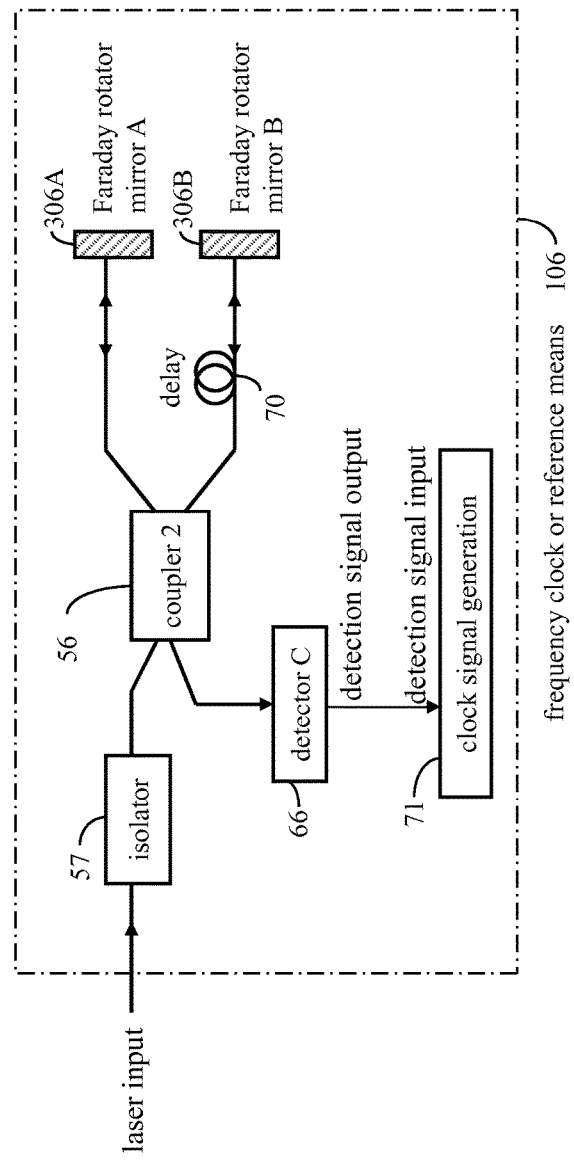
FIG. 2B is a schematic diagram of another aspect of an optical frequency encoder embodying in the disclosed technology for the POFDR or OFDR.
Figure 2C:
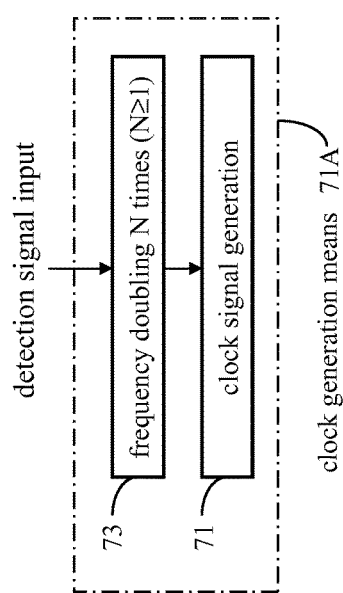
FIG. 2C is a schematic diagram of an aspect of a clock generation embodying in the disclosed technology for the POFDR or OFDR.
Figure 2D:
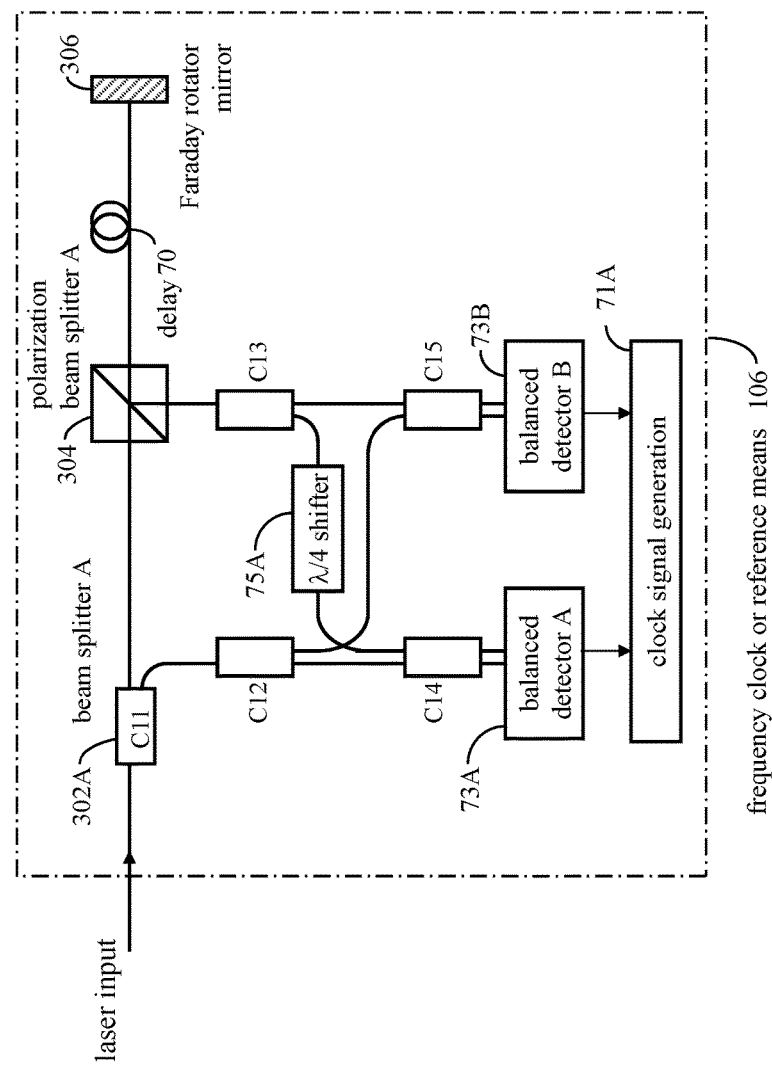
FIG. 2D is a schematic diagram of an aspect of an optical frequency encoder for the clock generation embodying in the disclosed technology for the POFDR or OFDR.
Figure 2E:
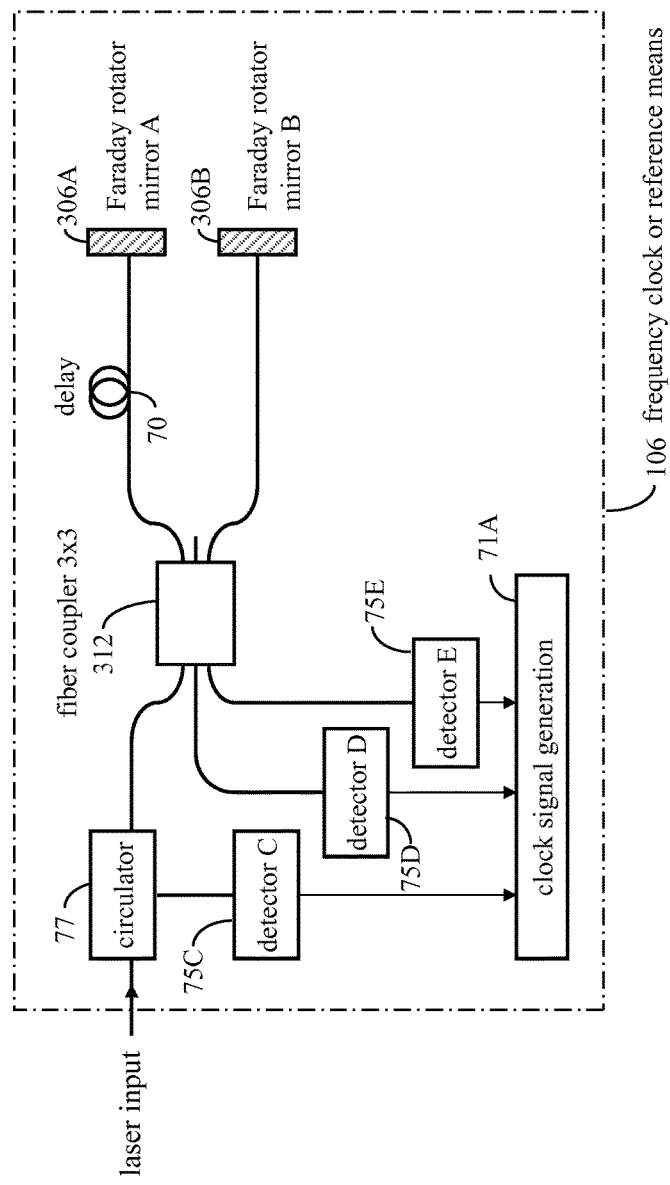
FIG. 2E is a schematic diagram of another aspect of an optical frequency encoder for the clock generation embodying in the disclosed technology for the POFDR or OFDR.

An optical frequency encoder unit 106 (also called as a frequency clock or reference means) that is used to provide a clock trigger for sampling may comprise these optical components for an interferometer that may include an input optical isolator 57 that receives an input laser beam, a beam splitter 56 that splits the input laser beam into two different laser beams for the interferometer operation, a delay line 70, optical reflectors 52 and 54 in FIG. 2A that could be Faraday rotator mirrors 306A and 306B as shown in FIG. 2B or fiber pigtailed fiber mirrors or any type mirror as long as they could reflect or rout the input light returning back to coupler 56 to produce an interference detection on the detector C 66. In order to produce more clock trigger signals, a frequency doubling technique (e.g. for N times, N≥1) may be used by first doubling the frequency more than one time in step 73 and then performing the clock signal generation in step 71 in a clock generation unit 71A as shown in FIG. 2C. The clock signal may be generated from a clock signal generation unit 71 by detecting those "zero-crossings" from the measured interference signals for the interferometer. To further increase the number of sampling clock triggers a sine/cosine method is used to double the clock triggers where the interference signals from the "sine/cosine" method to have a 90 degree phase difference. As shown by the example in FIG. 2D, two balanced detectors 73A and 73B can be coupled to direct their outputs to the clock signal generation unit 71A where the laser input beam is split by a beam splitter 302A into two different laser beams along two different paths: a first path having optical couplers C12 and C14 to the balanced detector 73A and a second path having a polarization beam splitter 304, an optical delay 70, a Faraday rotator mirror 306 that reflects the light back to the polarization beam splitter 304 which directs the reflected light through optical couplers C13 and C15 into the balanced detector 73B. In FIG. 2D, an optical cross path is formed between the optical coupler C13 and the optical coupler C14 and includes a quarter-wave phase shifter 75A and another optical cross path is formed between the optical coupler C12 and the optical coupler C15. Another method is to use an approximately symmetric 3×3 coupler to produce three interference signals each with a phase difference of 120 degree (FIG. 2E) so as to provide three time more clock triggers, e.g. from "zero-crossing" detection. FIG. 2E specifically shows an example where an optical circulator 77 is used to receive the laser input beam and to direct the received laser input beam into a 3×3 fiber coupler 312 to split the received laser beam into two optical beams into along two different optical paths to Faraday rotator mirrors 306A and 306B and the reflected light from the two Faraday rotator mirrors 306A and 306B is combined by the 3×3 fiber coupler 312 and the combined light is split into three reflected beams: a first reflected beam to the circulator 77 which directs it into optical detector 75C, a second reflected beam to optical detector 75D and a third reflected beam into optical detector 75E. The clock signal generation unit 71A is used to receive the three optical detector output signals from the optical detectors 75C, 75D and 75E.

The input light source is a tunable narrow linewidth source. The analogue and digital signal processing unit may comprise a control, a data acquisition unit, a sampling and averaging unit and a data processor unit, analog-to-digital conversion being carried out in the sampling and averaging unit.

Figure 3:
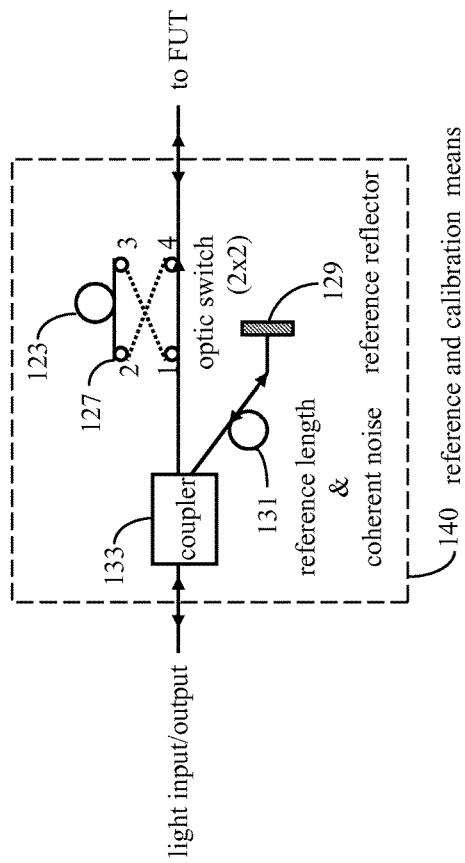
FIG. 3 is a schematic diagram of an aspect of a reference and calibration means for the instrument embodying in the disclosed technology for the POFDR or OFDR in which an optical coupler 133 is provided to split input light into reference light along a reference path to a reference reflector 129 and an optical switch path to the fiber under test (FUT)
Figure 5F:
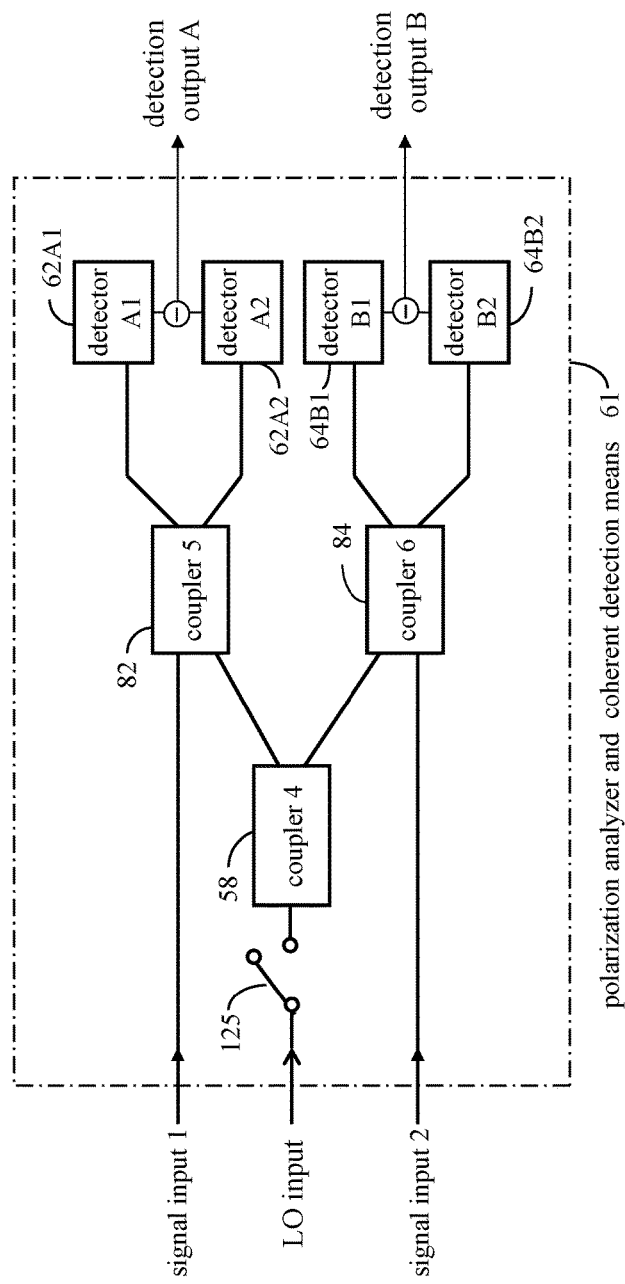
FIG. 5F is a schematic diagram of an aspect of a polarization analyzer and coherent detection means embodying in the disclosed technology for the POFDR or OFDR where an optical switch is used for the local oscillation (LO) lights.
Figure 5G:
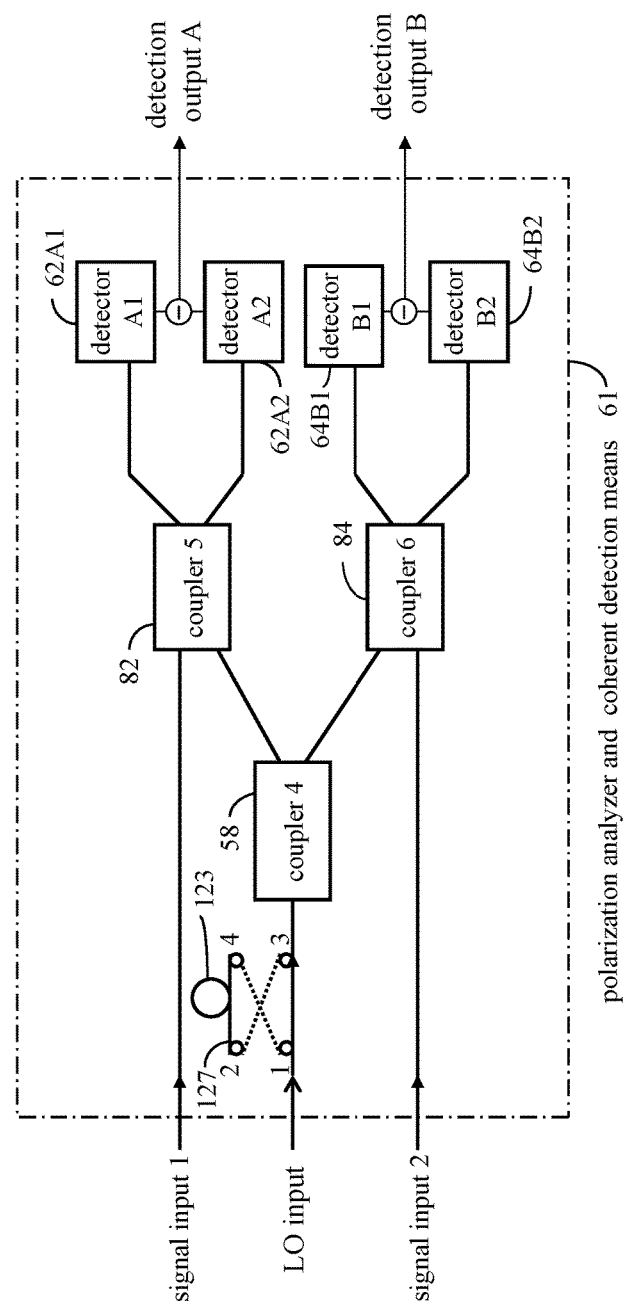
FIG. 5G is a schematic diagram of another aspect of a polarization analyzer and coherent detection means embodying in the disclosed technology for the POFDR or OFDR where another optical switch is used to add an additional fiber length for the local oscillation (LO) lights.
Figure 5H:
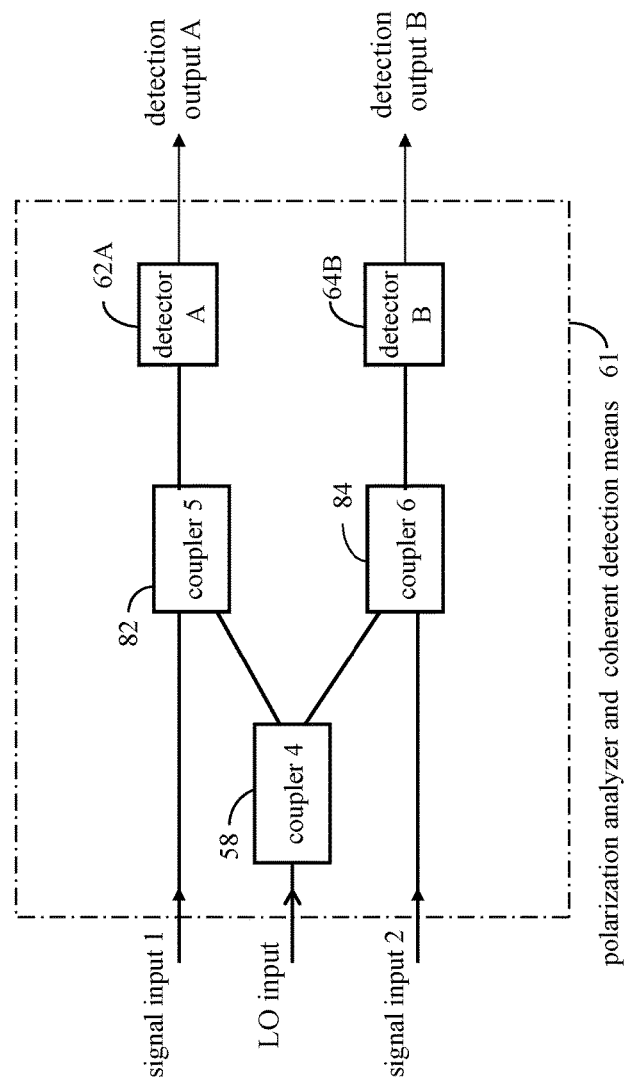
FIG. 5H is a schematic diagram as FIG. 5C but using conventional detectors (i.e. not balanced detectors) in the disclosed technology for the POFDR or OFDR.

A reference and calibration means 140 includes the fiber length reference, for example 1 to over 10 meter for a short range POFDR with a measurable length of 100-2000 m and 10 to over 100 meter for a middle or long range POFDR with a measurable length of 2 to 100 km, and coherent noise detection 131, light reflectivity reference 129, as well to probe these "ghost" events by using an added additional length 123 on the FUT 100 by using a 2×2 optical switch 127 (FIG. 3). A similar purpose could be achieved by an 1×1 optical switch 125 to result an OFDR measurement with and without local oscillation lights (FIG. 5F), or to add an additional fiber length 123 with a 2×2 optical switch 127 (FIG. 5G).

Figure 6:
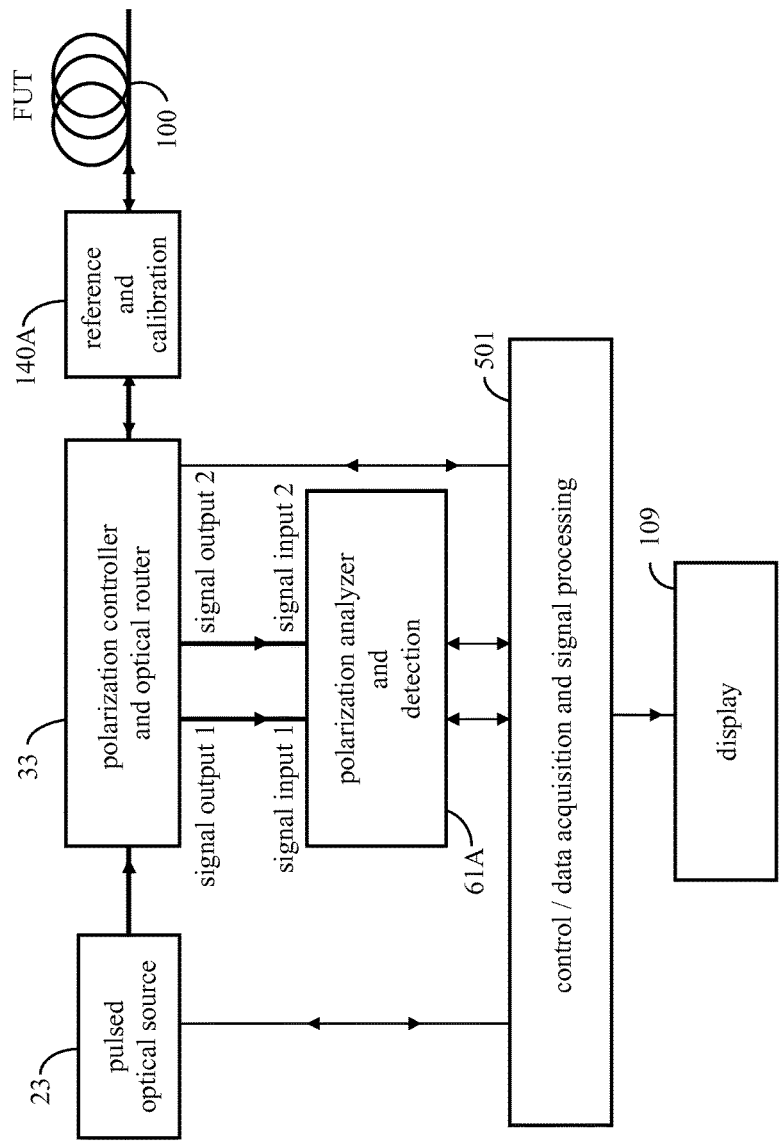
FIG. 6 is a block diagram of a polarization-sensitive optical time domain reflectometer (POTDR) embodying these aspects of the disclosed technology.
Figure 7:
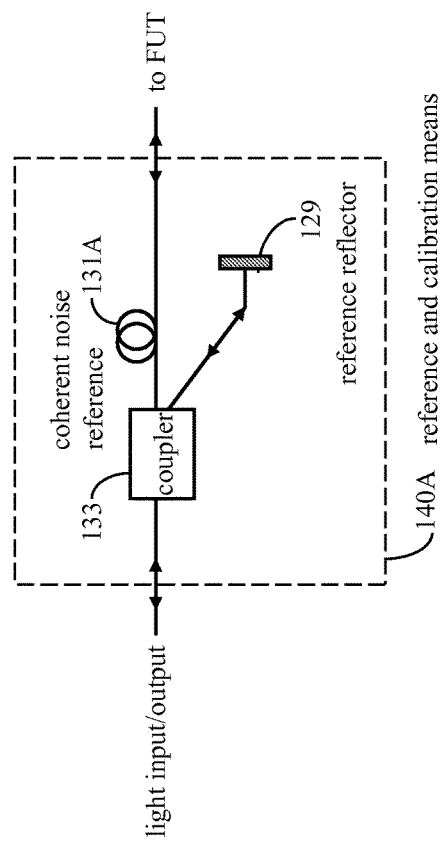
FIG. 7 is a schematic diagram of an aspect of a reference and calibration means embodying in the disclosed technology for the POTDR where an optical coupler 133 is provided to split input light into reference light along a reference path to a reference reflector 129 and an optical path to the fiber under test (FUT) and the coherent noise may also be estimated from an additional fiber in the path to the FUT that is related to the laser linewidth, etc.
Figure 8A:
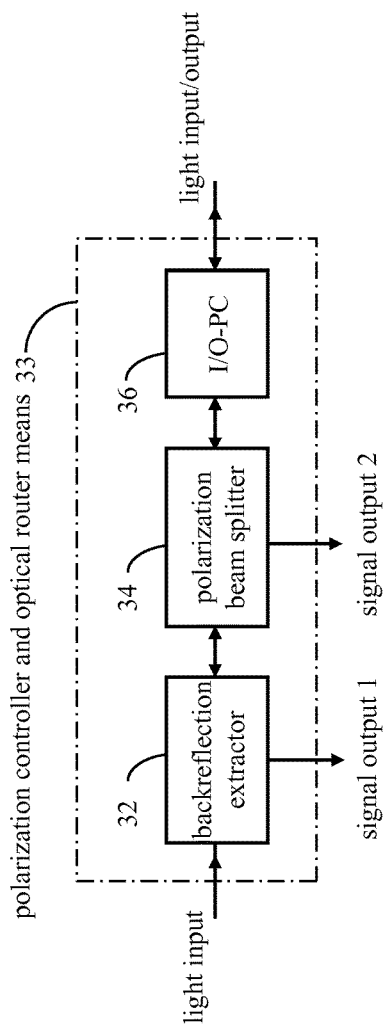
FIG. 8A is a schematic diagram of an aspect of a polarization controller and optical router means embodying in the disclosed technology for the POTDR.
Figure 8B:
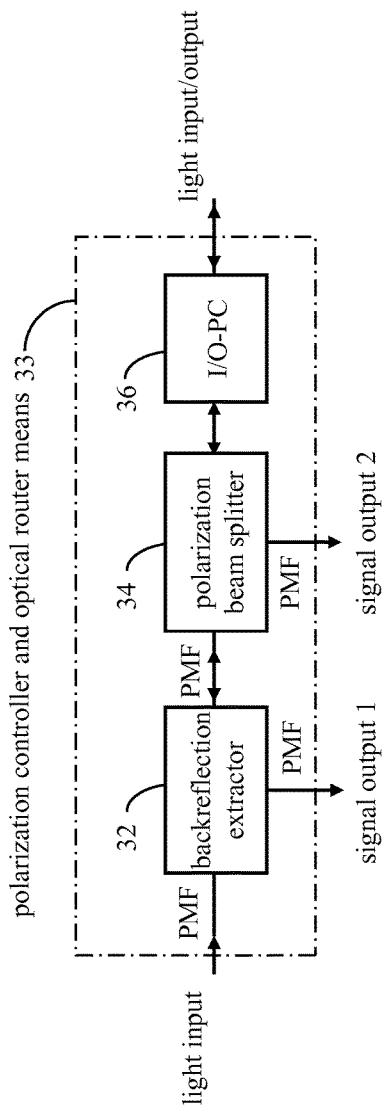
FIG. 8B is a schematic diagram of an aspect of a polarization controller and optical router means embodying in the disclosed technology for the POTDR where the PMF used for some places for connections between components or modules.
Figure 8C:
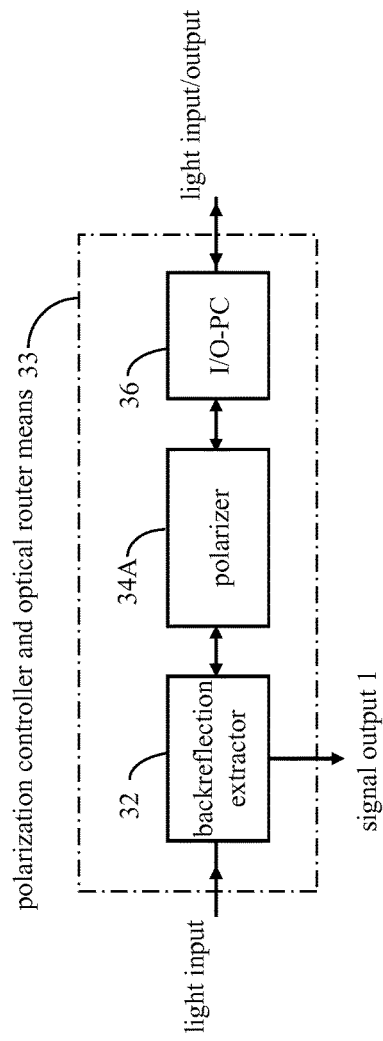
FIG. 8C is a schematic diagram of an aspect of a polarization controller and optical router means embodying in the disclosed technology for the POTDR.
Figure 8D:
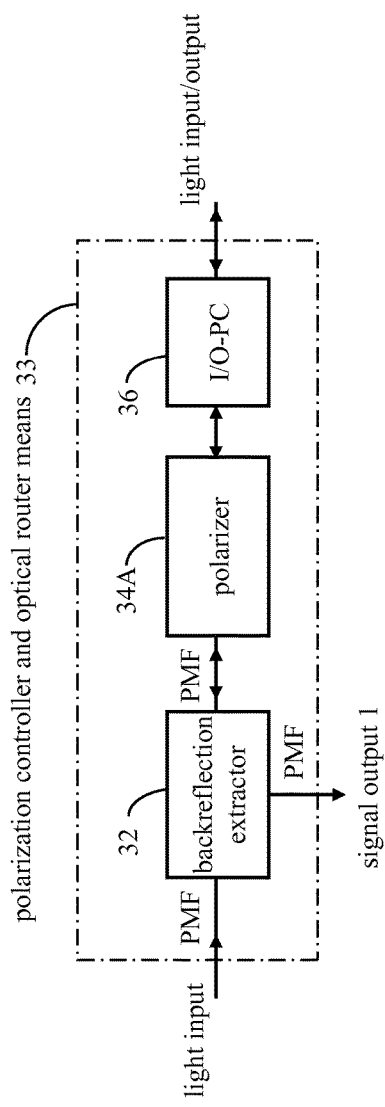
FIG. 8D is a schematic diagram of another aspect of a polarization controller and optical router means embodying in the disclosed technology for the POTDR.
Figure 8E:
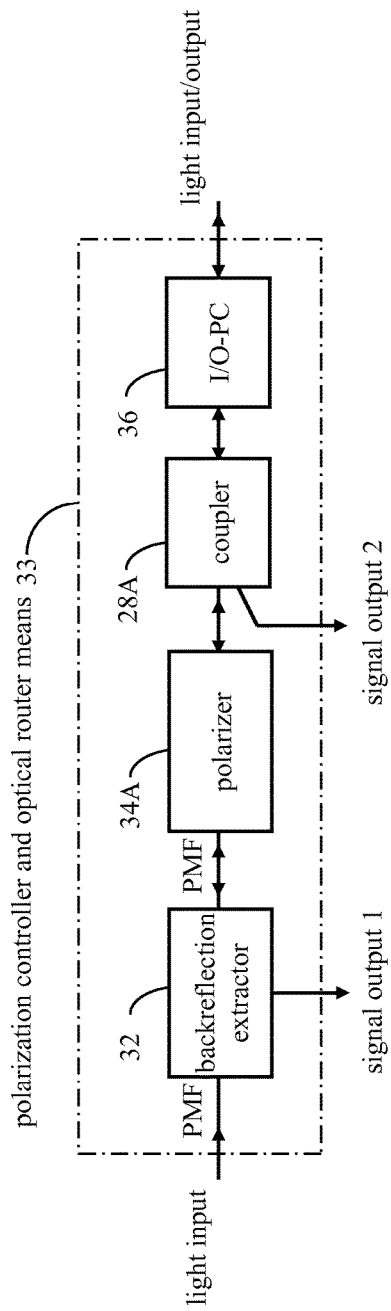
FIG. 8E is a schematic diagram of an aspect of a polarization controller and optical router means embodying in the disclosed technology for the POTDR.
Figure 8F:
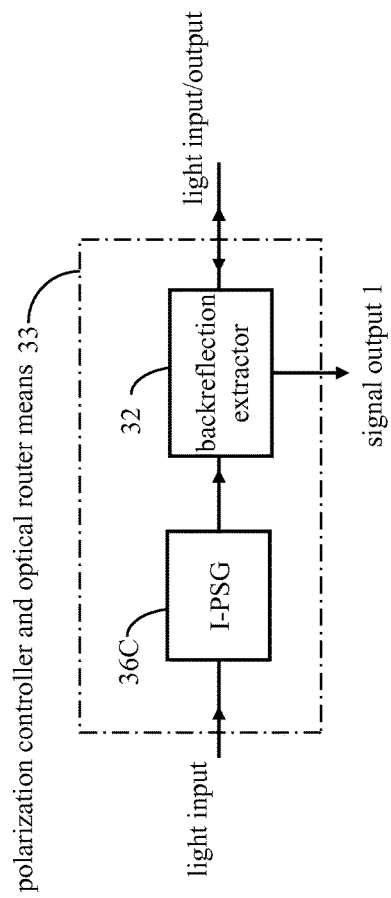
FIG. 8F is a schematic diagram of another aspect of a polarization controller and optical router means embodying in the disclosed technology for the POTDR.

In each of the examples of POTDR described herein, there will usually be five main parts as shown in FIG. 6, namely a pulse optical source 23, a reference and calibration unit 140, polarization controller and optical router 33, polarization analyzer and detection unit 61, and a control and data acquisition, analogue and digital signal processing unit 501, and together with a display unit 109, where all of the components of the measuring instrument are at the same end of the FUT. Thus, for the fiber birefringence measurement based fiber bend determination method the input optical source controller will comprise an at least partially polarized pulsed laser source 23, an input SOP (I-SOP) polarization controller (I-PC) 36 for controlling the SOP of light from the pulsed light source 23 before it is injected into the FUT 100 (FIGS. 8A, 8B, 8C, 8D, and 8E). The polarization analyzer an detection unit 61A is either having two photo-detectors A and B, 62A and 64A, respectively (FIGS. 9A and 9C), or having one photo-detector 62A (FIGS. 9B and 9D), o even having three or four or more detectors as such for a polarimeter design (FIG. 9E). If there may be no any no any polarization determination means used for the polarization controller and optical router means 33 (FIG. 6) described in FIGS. 8F, 8G, 8H and 8I), a polarization analyzer an detection unit 61A should have such polarization determination means, either a polarization beam splitter 34B or a linear polarizer 34A, as FIGS. 9C, 9D and 9E.

It is worthy to be noted that either a SMF or a PMF may be used for above described different embodiments, however, a PMF may be used where the light polarizations for both or either a light input from an optical source 103 or pulsed optical source 23 or signal input 1 or signal inputs 1 and 2 for the polarization analyzer and coherent detection 61 or polarization analyzer and detection 61A can be arranged to the PMF axis, e.g. usually in its slow axis.

Figure 8G:
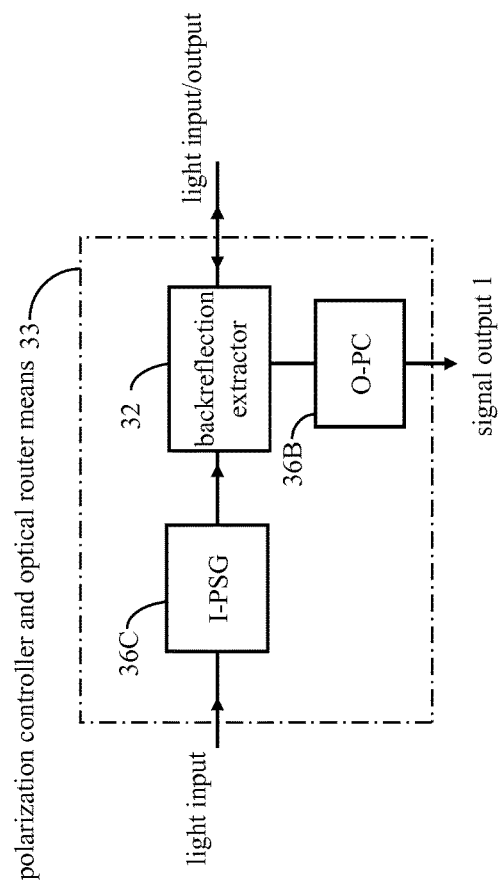
FIG. 8G is a schematic diagram of another aspect of a polarization controller and optical router means embodying in the disclosed technology for the POTDR.
Figure 8H:
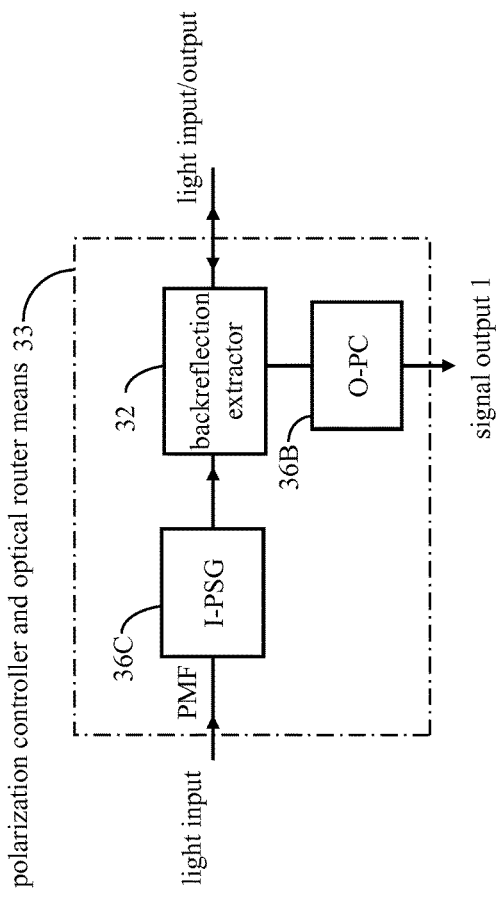
FIG. 8H is a schematic diagram of an aspect of a polarization controller and optical router means embodying in the disclosed technology for the POTDR.
Figure 8I:
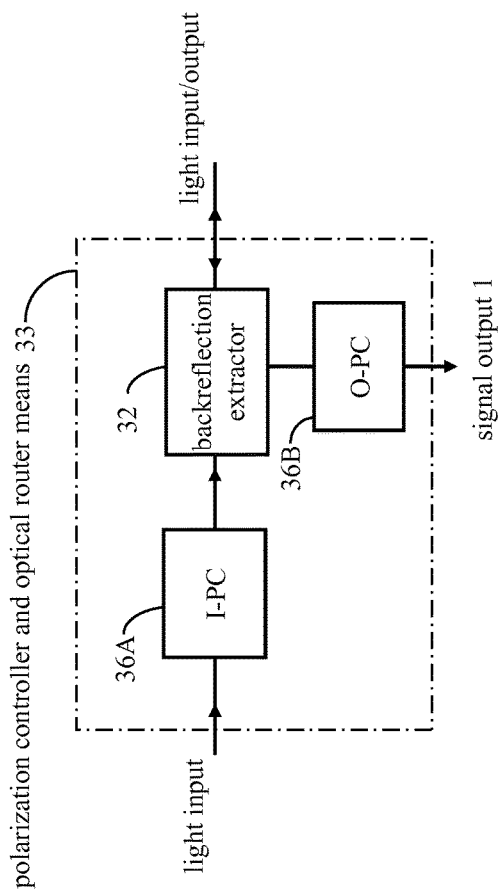
FIG. 8I is a schematic diagram of another aspect of a polarization controller and optical router means embodying in the disclosed technology for the POTDR.
Figure 9A:
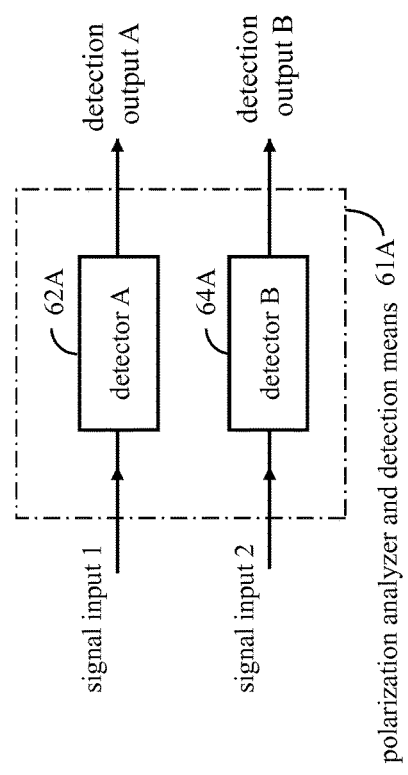
FIG. 9A is a schematic diagram of an aspect of a polarization analyzer and detection means embodying in the disclosed technology for the POTDR.
Figure 9B:
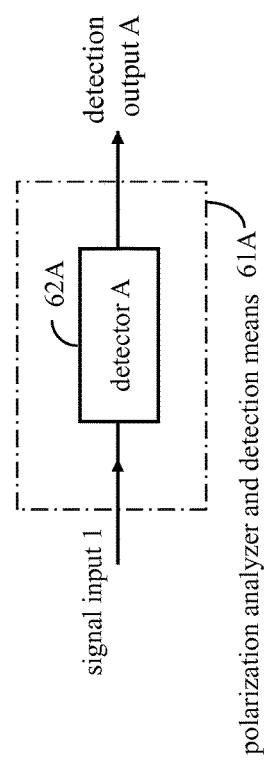
FIG. 9B is a schematic diagram of an aspect of a polarization analyzer and detection means embodying in the disclosed technology for the POTDR.
Figure 9C:
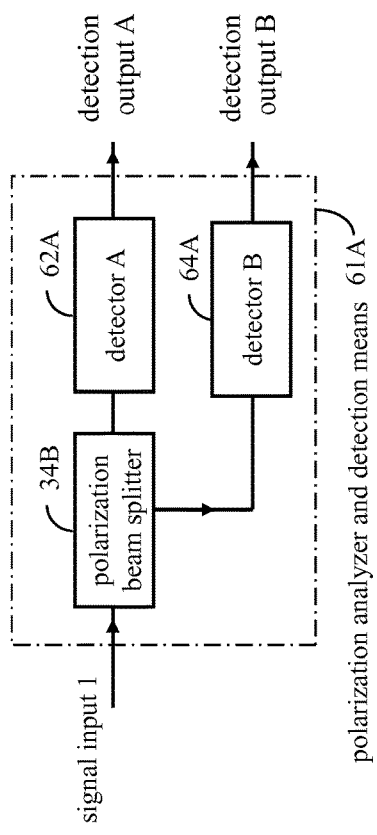
FIG. 9C is a schematic diagram of another aspect of a polarization analyzer and detection means embodying in the disclosed technology for the POTDR.
Figure 9D:
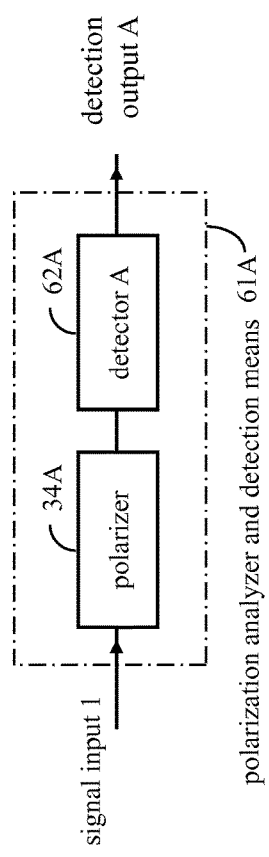
FIG. 9D is a schematic diagram of an aspect of a polarization analyzer and detection means embodying in the disclosed technology for the POTDR.
Figure 9E:
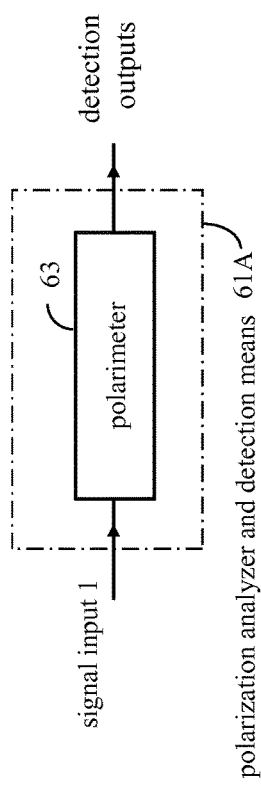
FIG. 9E is a schematic diagram of another aspect of a polarization analyzer and detection means embodying in the disclosed technology for the POTDR.

The polarization controller and optical router unit may comprises an I/O-PC 36, a PBS 34, and a backreflection extractor 32 (FIGS. 8A and 8B), or an I/O-PC 36, a polarizer 34A, and a backreflection extractor 32 (FIGS. 8C and 8D), or an I/O-PC 36, a polarizer 34A, coupler 28A, and a backreflection extractor 32 (FIG. E), or an I-PSG 36C and a backreflection extractor 32 (FIG. 8F), or an I-PSG 36C, and O-PC 36B and a backreflection extractor 32 (FIG. 8G), or an I-PSG 36C, and O-PC 36B and a backreflection extractor 32 (FIGS. 8G, 8H), or an I-PC 36A, and O-PC 36B and a backreflection extractor 32 (FIG. 8G).

The polarization analyzer and detection unit 61A unit may comprises two detectors A and B 62A and 64A to measure the signal inputs 1 and 2, respectively (FIG. 9A), or one detector A 62A only to measure the signal input 1 (FIG. 9B), or one PBS 34B, two detectors A and B 62A and 64A to measure the signal inputs 1 and 2, respectively (FIG. 9C), or a polarizer 34A, a detector A to measure the signal inputs 1 (FIG. 9D), or to use an polarimeter 63 (FIG. 9E).

A reference and calibration means 140A includes the fiber length reference and coherent noise detection 131A, for example 1 to over 100 meter, and light reflectivity reference 129.

It is worthy to be noted that above described different units or main parts may be combined differently according to embodiments in FIGS. 1 and 6 for the POFDR and POTDR, respectively. Also note that when a photon-counting OTDR may be used, all these POTDR embodiments should be applied.

For the single-end fiber bend or stress measurement method a distributed fiber birefringence can be extracted by analyzing backreflected light from Rayleigh backscattering or from the localized reflection so that the fiber bend or stress characteristics can be extracted and predicated. Note that fiber bend induced local birefringence is typical with a small length, for example 1 mm to 50 mm, and is typical higher that of inherently from a standard single-mode optical fiber, e.g. SMF-28. Thus a bend or stress induced local birefringence on a standard single-mode fiber could be measured by a high spatial resolved reflectometry, such as an OFDR, thus local bend or stress on the fiber could be estimated. For the birefringence based fiber bend or stress measurement method described, averaging over a certain wavelength range may be used to remove the wavelength related fluctuation, for example coherent noise. To use the single-end measurement method to measure distributed local fiber bend or stress, polarization sensitive OFDR (POFDR) or polarization sensitive OTDR (POTDR) traces as a function of fiber length must be analyzed and its SOP characterization at each fiber location or distance should be accurately measured or approximately estimated in a high spatial resolution, so it may be use a widely tunable narrow linewidth laser (CW) to obtain high spatial-resolved POFDR traces, for example having a tunable range 0.01 nm to 100 nm and a linewidth of 300 Hz to 10 MHz, or to use a very short pulse, for example 0.01 ns to 100 ns, in order to obtain a highly spatial resolved POTDR traces that does not suffer a problem of poor spatial resolution.

Some examples of the main fiber bend or stress measurement instrument configurations for a single-end distributed fiber bend or stress measurement according to the disclosed technology, and modifications, alternatives and substitutions thereto, will now be described with reference to FIGS. 1 to 9.

In the high spatial-resolved polarization-sensitive optical frequency domain reflectometer (POFDR) illustrated in FIG. 1 a unable CW narrow light source means 103 is coupled to a polarization maintaining fiber (PMF) for producing light source for launching into a fiber-under-test (FUT) 100 from connector port, which also receives corresponding backreflected light from the FUT 100 via connector 40, and an optical frequency encoder unit 106 consisting of fiber based Michelson interferometer having light beam splitter and combiner 56 (coupler 2), delay 70, reflectors means of mirrors 52 and 54 and detection means detector C 66 (FIG. 2B).

Figure 4B:
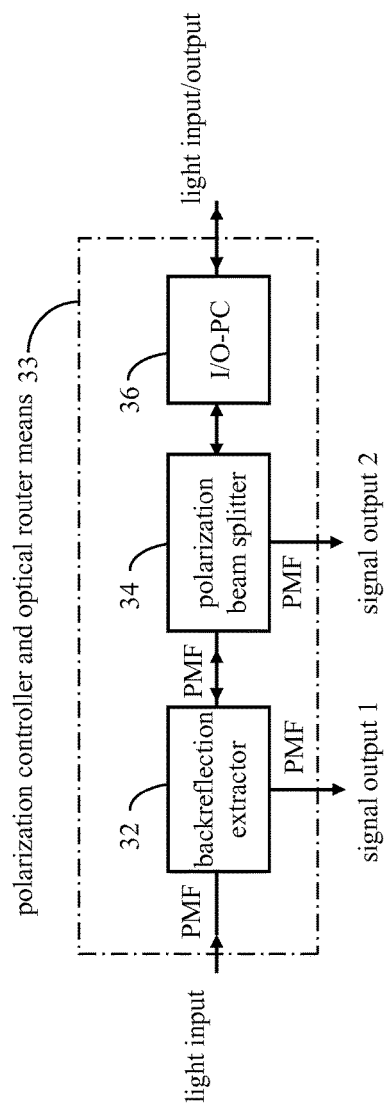
FIG. 4B is a schematic diagram of an aspect of a polarization controller and optical router means embodying in the disclosed technology for the POFDR or OFDR where a PMF may be used for some places.

The input light, polarization controller and optical router means 33, and polarization analyzer and coherent detection means 61 may comprise a polarization-maintaining circulator or coupler 32 in FIGS. 4B and 5C or polarization-maintaining coupler, a polarization beam splitter (PBS) 34, and a input and output polarization controller (polarization controller or scrambler) 36. The circulator 32 is coupled to the input of PBS 34 by a second PM fiber (polarization-maintaining fiber) so that the optical path from the tunable light source 103 to the PBS 34 is polarization-maintaining. A single-mode fiber can be used to couple the PBS 34 to the I/O-PC controller 36. However, a SM fiber may still be used (FIG. 4A).

The alignment of PMF is fixed in the factory in such a manner that substantially all of the optical power from the tunable CW narrow linewidth optical light source 103 is maintained in one of the two axes of the fiber 29, conventionally at the "slow" axis. Since the circulator 32 is polarization-maintaining, this alignment is maintained until the point between PBS 34 and I/O-PC 36. During attachment of each end of the PMFs to the components concerned, the azimuthal orientation of the PMF is adjusted to ensure maximum transmission of the optical lights towards the FUT 100.

In the polarization analyzer and coherent detection means 61 such as PMF may be used for the LO input that should be arranged to have 45 degree regarding to the PBS 84A and 82A axis so as to equally divide the light power in to two output ports for the coherent detections. The SM fiber may still be used, then a polarizer whose axis has a 45 degree regarding to the PBS axis may be used before the LO light incident into beam splitter 58A, in such case the LO light polarization may be arranged to have sufficiently lights, e.g. >0.01%, for the coherent detection. Otherwise a fiber based coherent detection configuration (FIGS. 5C-5G) may be used for the polarization controller and optical router 33 shown in FIGS. 4A-4J.

Backreflected light caused by Rayleigh scattering and, in some cases, discrete (Fresnel) reflections, from the FUT 100 enters the I/O-PC 36 in the reverse direction. Its SOP is transformed by the SOP controller or scrambler 36, following which the light is decomposed by the PBS 34 into two components having orthogonal SOPs, typically linear SOPs at 0 and 90 degree relative orientations. The first detector 64A or 64B1 and 64B2 (FIGS. 5C-5G) is connected to one of the two outputs of the PBS 34 to receive one of these orthogonal components and the circulator 32 (or coupler) is connected to the other output (with respect to backreflected light from the FUT 100). The second detector 62A or 62B1 and 62B2 (FIGS. 5C-5G) is in turn connected to that output port of the circulator 32 (or coupler) that transmits light from the PBS 34, so as to receive the other orthogonal component.

It should be noted, for the POFDR it requires to a local oscillation lights for the detection. Thus, before the any orthogonal components from PBS 34 being sent to detectors, a light splitter (coupler) provides a small portion of lights from the tunable CW narrow linewidth light source 103 as local oscillation lights for the coherent detection, where two local oscillation lights are obtained by light splitter 58 (coupler 4) and then combined by coupler 5 82 and coupler 84, respectively, to coherently measure the two orthogonal light components from PBS 36 that is originated from FUT 100 (FIGS. 5C, 5F and 5G). It should be worthy to mention here that such detection schemes in fact is as an interferometer, i.e. a light is split by coupler 27 and then they are combined together again by coupler 5 or 6 to form an interferometer, where typically the light is delayed after its "round-trip" time through the FUT 100. Note that the suitable calibration may be carried out for any related two detections for their relative detection efficiencies, wavelength dependence, overall optical components loss, etc., as will be described hereinafter, the sum of the detected powers from detection output A and B is proportional to the total backreflected power from the FUT 100.

Under the control of control unit 501, which also controls the tunable laser source 103, the sampling and averaging circuit, in known manner, uses an internal analog-to-digital converter to sample the corresponding electrical signals from the detectors 62A and 64A (for a POTDR) or 62A1, 62A2, 64B1, and 64B2 (for a POFDR) as a function of time to obtain the corresponding electrical signals, then signal processing, for example by fast Fourier transform (FFT) for an OFDR, averages the processed electronic signals to produce an OFDR trace that has the measured fiber loss (or attenuation) as a function of the FUT 100 distance.

It is appreciated to be noted that such signal processing, e.g. FFT, averaging, filtering, etc., in 92 and 94 may be processed by either a low-level FPGA or a high-level software of any computer, for example a person PC computer, PC tablet, etc. The resulting OFDR traces for different I/O-SOPs are used by a data processor 501 to derive the distributed local birefringence curve so as to estimate fiber bend properties, for example bend or stress strength, bend radius, bend or stress length, fiber reliability/quality and or lifetime, as a function of the distance z along the FUT 100 from a single the same end of the FUT 100. It will be appreciated that the usual conversions will be applied to convert time delay which is calculated from a beating frequency after the FFT, where the beating frequency is proportional to both round-trip time of the light and tunable laser frequency speed, to distance according to refractive index of the FUT 100.

In addition to controlling the sampling in unit 501, the control unit controls the wavelength of the tunable laser source 103 or 23 and the I-SOP and O-SOP adjusted by I/O-PC 36. More specifically, for each setting k of the I/O-PC 36, the control unit 90 causes the backreflected power to be measured for at least one pair of distances $z_S^{(k)}$ and $z_L^{(k)}$, respectively, that are closely-spaced relative to each other. The center distance of the pair is defined as the average of two actual distances, i.e., $z_k = (z_S^{(k)} + z_L^{(k)})/2$. (The labels S and L refer, for convenience and ease of understanding, to "short" and "long" with respect to the center distance $z_k$.

It should be appreciated for the embodiments with the OFDR as in FIG. 1 that measures the beating frequency signals between the local oscillation (LO) light, e.g. from the beam splitter 27 (coupler B), and the reflected light signals from the FUT 100 in the time domain and then the measured signals are transferred into the frequency by the FFT, the first step of the data processing is to perform the FFT for the acquired the data from the detectors A and B, 62A1-62A2 and 64B1-B2, respectively, and then it may require a calibration or reference procedure to obtain an OFDR trace that is as a function of the distance.

If for the OTDR the above described procedure is not required, i.e. directly to obtain the OTDR curve as a function of the time and then of the distance after considering the light speed at the given FUT.

Since an OFDR tunable coherent optical source may be sensitive to the back-reflected lights, an optical isolator 23 may be sued as shown in FIG. 1.

It should also be appreciated for the embodiments with the OFDR as in FIG. 1 an optical frequency encoder unit 106, for example an interferometer either in fiber or free space, may be used, as shown in FIGS. 2A and 2B. In FIG. 2A, a free-space interferometer is used to obtain frequency reference signal, where the clock signal generation 71 may be as to produce the clock trigger signals from the cross-zeroing detection of the interference signal of the interferometer that is detected by the detector C. The FIG. 2B is similar as FIG. 2A but fiber components are used. In order to increase the clock trigger signals data sampling or to reduce the length of the delay line 70, further improved techniques may be required, for example to use the interference signal frequency mixing 73 after removing the DC level (FIG. 2C) so as to increase the cross-zeroing number. This interference signal frequency mixing 73 may be performed N times (N≥1) to obtain $2^{(N+1)}$ zero-crossing so as to produce clock trigger signals $2^{(N+1)}$ for the sampling, e.g. by ADC. The other method to increase the clock signals may be using sine and cosine encoder as shown in FIG. 2D where the clock signal could be extracted by calculating the "phase" in the phase diagram, for example evenly divided, or comparing their levels and "sign" to obtain even trigger signals. Moreover, simply the number of "zero-crossing" is simply doubled from the sine/cosine interference signals, and further these "zero-crossing" from the squared sine or squared cosine could be also be used for the clock trigger signal generation for the sampling. Such method may also be applied in the symmetric 3×3 coupler (FIG. 2E) where three sine function interference signals with different phase of 0 and +/−120 degree could be measured by detector C, detector D and detector E so as to increase the number of "zero-crossing" for three times if comparing a single interference (sine function) signal, for example for an interferometer.

It should be appreciated that, where the group may comprise more than one closely-spaced pair of distances, the center distance as defined above in fact differs for each pair in the group. The I/O-PC polarization controller 36 sets the different I-SOP and O-SOP in a well-defined known uniform or a random manner, such that the points conventionally representing SOPs corresponding to each member are uniformly distributed over the surface of the Poincaré sphere, whether the distribution is in the uniform grid or random of points.

For the OFDR in order to remove or reduce the laser frequency sweeping nonlinearity, there may be an optical frequency encoder unit 106 that consists of a fiber based Michelson interferometer with delay 70, Faraday rotation mirrors 52 and 54, and detector C 66 as shown in FIG. 2B. The frequency clock or reference means 106 may provide signals from the interferometer for sampling the measurement signals by sampling and averaging unit 501 or alternatively providing signal for re-sampling of the measurement signals from the FUT 100.

Note the lights used for the said optical frequency encoder 106 may be obtained by a beam splitter or fiber coupler A 25 (FIG. 1), where an optical isolator 23 should be used to protect any lights returning back to the optical laser source 103.

Advantageously the balanced detection may be applied for the POFDR measurement, however a detection using one detector is also practical. The balanced detection may be constructed by the free-space optics as FIG. 5A or 5B or using fiber optic components as shown in FIGS. 5C-5G. It should be noted such balanced detection could be used for the examples of POFDR described in this document.

For the high spatial-resolved polarization-sensitive optical time domain reflectometer (POTDR) as illustrated in FIG. 6 comprises pulsed light source means 23, bidirectional polarization controller means 36 (conveniently referred to as an I/O PC controller means, sampling and averaging unit and data processor means 501, all controlled by a control unit 501, and detection means comprising first and second detectors A and B, 62A and 64A, respectively. The pulsed light source means 23 is coupled to a polarization maintaining fiber (PMF) 26 for producing light source for launching into a fiber-under-test (FUT) 100 from connector 40 via the I/O state of polarization (I/O-SOP) polarization controller (I/O-PC) means 36, which also receives corresponding backreflected light from the FUT 100, for example via an input and out port or connector. For the embodiments using the POTDR as illustrated in FIG. 6, etc. it may necessary to use a narrow light pulse width, for example 0.1 ns to 100 ns and a high detection bandwidth, e.g. up 10 MHz to 10 GHz, for the detectors A and B, 62A and 64A, respectively and a high sampling rate for the ADC. It is appreciated to be understood that the relative low sampling rate ADC may be used if the time shifting sampling technique, for example for the 1 ns light pulse the ADC may have sampling rate of 100 MSPS under sampling an operation of 10 shifted time with a step of 1 ns, may be applied in the embodiments for the sake of the low-cost instrument design.

The disclosed technology encompasses various modifications to the embodiments shown in FIGS. 1-9. For example, the PMF may be replaced by a polarization controller connected by non-polarization-maintaining fiber.

If the optical path between the output of tunable light source means 103 or 23 and the input of the polarization beam splitter 34 is polarization-maintaining, the polarization-maintaining circulator 32 could be replaced by a polarization-maintaining coupler (e.g., a 50/50 coupler). The circulator can be used and it gives about 3 dB more dynamic range than a 50/50 coupler.

If the optical path between the output of the tunable laser source 103 or 23 and the input of the polarization beam 34 is not polarization maintaining, the coupler or circulator 32 need not be polarization-maintaining.

Although these modifications may be applied separately, the embodiment of the disclosed technology illustrated in FIGS. 1 and 6 includes several such modifications.

Instead of PBS 34 in the FIGS. 4A, 4B and 8A, 8B, the polarization beam splitter 34 may comprise a polarizer 34A, at the expense of another polarization component of the test light. The detector is connected to one of the arms of the backreflection extractor 32, i.e. signal output 2, for example at an optic circulator or a coupler so as to detect a fraction of the backreflected light for processing to deduce the total backreflected power of the lights. Indeed when a polarization beam splitter 34 may be used as shown in FIGS. 4A, 4B and 8A, 8B the two signal outputs 1 and 2 are obtained for the coherent (POFDR) or non coherent detection (POTDR).

Alternatively for the embodiment of FIG. 4D, the polarizer 34A is removed, as shown in FIG. 1E. In such configuration, the detector 62 is still connected to one of the arms of the backreflection extractor 32, for example at an optic circulator or a coupler so as to detect a fraction of the backreflected light for processing to deduce the total backreflected power of the lights. Indeed in the embodiment of FIG. 1E only one of the two orthogonal light polarization components is detected due to the polarization sensitive coherent detection by detectors 62.

In the POFDR of FIG. 1 and the POTDR of FIG. 6 could then be carried out, although not required as stated above, to calibrate the relative sensitivities of the detectors including the losses induced by the intervening circulator or coupler, etc.

Alternatively for the embodiment, for example of FIGS. 4G, 4H and 8G, 8I, two separate and uncorrelated I-PC controller 36A or I-PSG 36C and O-PC controller 36B may be used. In the such embodiments, e.g. of FIGS. 4G, 4H and 8G, 8I, the same basic theory may be applied as such for the FIGS. 4A, 4B, 4C, 4D, 4E, 8A, 8B, 8C, 8D and 8E but having different theoretical constant as such described herein. The FIG. 4F or 8F is a simple configuration where the O-PC 36B is removed from FIG. 4G or 8G.

It should be appreciated that, in the embodiments involved with at least two detectors, calibration of the mean relative gain is not required; the measured total power is independent of SOP, and there is no need for an "absolute" calibration to directly measure absolute transmission values; they can be obtained to within an unknown constant factor. The subsequent normalization over the mean traces averaged over part or all SOPs, as described hereinbefore, eliminates the unknown factor.

It is envisaged that the detection means might comprise a single detector and normalized OFDR or OTDR traces be obtained by computing an average of all of the OFDR or OTDR traces, and dividing each of the OFDR or OTDR traces by the said average OFDR or OTDR trace, point by point, to obtain normalized OFDR or OTDR traces, as described in detail hereinbefore.

FIGS. 1 and 6 illustrates a POFDR or a POTDR suitable for obtaining the fiber bend or stress induced birefringence using normalized OFDR or OTDR traces obtained in this way. The data processor 501 will simply use the different normalization equations given in the sections of "Theory and Signal Processing of Uniformly or Randomly Scrambled Input/Output SOP Analysis Method for Distributed Birefringence Measurement" provided hereinbefore.

In the above-described embodiments, the operation of the I/O-PC polarization controller 36 is such that, for a given SOP of the light (which can be any SOP on the Poincare Sphere) received at its input, the SOP of the light leaving its output will be any one of a number of substantially uniformly distributed SOPs on the Poincare Sphere, whether the distribution is of deterministic or random nature. Typically, the number of I-SOPs and O-SOPs is each about 3-100 for normal acquisition mode while for 100-1000 for high quality acquisition mode, but it could be any practical number. It is noted that for the I/O-SOP random controlling mode the distribution of each of the I-SOPs and O-SOPs need not, and generally will not, be truly random; so pseudo-random might be a more appropriate term in the case where a random distribution is indeed used for convenience because it is easier and less expensive to implement than a uniform grid of I-SOPs and O-SOPs.

Although two detectors or two balanced detectors may be used to obtain two orthogonal polarization components simultaneously and advantageously a total power can be acquired for an accurate normalization for each I/O-SOP, it is envisaged that the two detectors or two balanced detectors descried in these embodiments could be replaced by one detector plus one optical switch.

A normalized OFDR trace would be obtained by dividing at least one of the OFDR or OTDR traces corresponding to the two detected different polarization components by the sum of the OFDR or OTDR traces corresponding to the two detected different polarization components. This alternative may be used regardless of whether the analyzer and detector unit comprises a PBS or a coupler. Any modification to the normalization and processing is expected to be minor and within the common general knowledge of a person skilled in this art.

It is also envisaged that a rotating polarization adjuster, whether it is with a polarizer or a PBS, may be used to sequentially acquire two orthogonal components for example via rotating the polarization by 90° to switch from detecting Px to detecting Py, or from detecting Py to detecting Px. The detector means 62, whether a single detector or two detectors, and the sampling and averaging unit 92, may be as used in standard commercial OTDRs that are known to a person skilled in this art.

It is also envisaged that an I/O-PC polarization controller or two separated I-PC controller and O-PC controller as illustrated in the embodiments as illustrated in FIGS. 1 and 6 may be used to sequentially acquire several "uniform" polarization states regarding Poincare sphere, for example linear vertical polarization state (LVP), linear +45 degree polarization state (L+45), right circular polarization sate (RCP), and as well with their orthogonal polarizations as linear horizontal polarization state (LHP), linear −45 degree polarization state (L-45), left circular polarization sate (LCP).

In the embodiment FIGS. 4F, 4H, 4G, 8F, 8G, and 8H, a input polarization state generator I-PSG 36C is employed to produce several "uniform" polarization states regarding Poincare sphere.

It should be noted that the polarization analyzer and detection means 61 could be designed as the light polarization analyzer, for example such polarization analyzer could be a polarimeter (FIG. 9E), a polarization scrambler with a linear polarizer or a polarization beam splitter.

The control unit 501 may advantageously be a separate computer. However, it is noted that a single computer could perform the functions of the signal processing, for example the FFT, averaging, filtering, etc. as for the sampling, signal processing and averaging unit 501, as well for the data processor and the control.

Various other modifications to the above-described embodiments may be made in implementations. For instance the tunable laser source 103 or 23 and I/O-SOP controller 36 could be replaced by some other means of providing the different polarization states of the laser lights entering the FUT 100 and analyzing the resulting backreflected signal caused by Rayleigh scattering and/or discrete reflections leaving the FUT 100.

Thus, a polarimeter may be used (splitters with three or more analyzers and photodetectors in parallel), which measures more than one polarization component of the backreflected signal simultaneously, or some other configuration, for example one after another, so that the power that reaches the photodetectors is dependent on the state of polarization (SOP) of the backreflected light.

It should be noted that each group is not limited to one pair of fiber distance. Indeed it may be advantageous to acquire an entire POFDR or POTDR trace for the FUT 100 with sufficiently spatial and sampling resolutions, and then to select the different distance steps for the signal (data) processing regarding to the bend radius, bend or stress strength, bend or stress length, etc.

It should also be noted that the above-described embodiment may have the change of the center wavelength for each I/O-SOP and the fiber bend or stress induced birefringence and bend or stress characteristics may be computed by averaging over an entire wavelength range.

It should be noted that the optical frequency encoder unit 106 may further consists of a oscillation signal (e.g. sine waveform) frequency doubling 73 to generate 2, 4, . . . , 2N times oscillation frequency to provide an accurately laser frequency determination by using a short delay 70 as illustrated in FIG. 3A. The optical frequency encoder unit 106 may have a further step to produce a clock signal from a clock signal generation 71 to trigger a AD converter to sample the measurement signals from detectors A and B, 62A and 64A, respectively.

In order to measure the FUT length beyond the laser coherent length, a frequency shifter and several different delay line may be used. Advantageously such arrangement could significantly increase an OFDR measurement distance for the FUT 100 without losing a spatial resolution of the instrument and its measurable distance is dependent on the number of delay lines.

(B) Method of Operation

The method of operation of the POFDR or POTDR for measuring distributed fiber bend or stress induced birefringence or fiber bend or stress as function of FUT distance will now be described with reference to the flowchart shown in FIGS. 1 and 6. In step 10.1, the user starts the test and measure to cause the system to initialize the POFDR or POTDR, specifically initializing the tunable CW laser 103 or pulsed light source 23, the input/output polarization controller (I/O-PC) 36 and the OFDR or OTDR detection and processing section. Decision step 10.2 prompts the user to select either manual parameter setting or automatic parameter setting. Assuming that the user selects manual parameter setting, the program proceeds to the manual parameter setting step 10.3 and prompts the user as follows:

(1) To set the wavelength range $\Delta\lambda$ and the number (K) of center-wavelengths $\lambda c$ for the tunable CW laser source for POFDR, or one central wavelength only for the POTDR.

(2) To set I/O-SOP selected by the I/O-PC polarization controller 36 for each POFDR trace or each pair of POTDR traces.

(3) To set distance step $\Delta z$ for the signal processing.

(4) To specify the FUT length, normally the full effective optical length of the FUT. If, in decision step 10.3, the user selects automatic parameter setting, the program proceeds to step 5.5 to selects certain default measurement parameters as:

To set the wavelength range $\Delta\lambda$ and the number (K) of center-wavelengths $\kappa c$ for the tunable CW laser source for POFDR, or a central wavelength for the POTDR.

To set I/O-SOP selected by the I/O-PC polarization controller 36 for each POFDR or each pair of POTDR traces.

To set the distance step $\Delta z$ for the signal processing.

To specify the FUT length, normally the full effective optical length of the FUT.

Once the measurement parameters have been entered, whether manually or automatically, the program proceeds to step 10.6 and all the acquisition parameters are stored in the header of the data file 10.13.

With the group number register initialized to i=0, decision step 10.7 determines whether the total number of groups of traces have been acquired; if not, the program proceeds to step 10.8 to acquire the group i of OFDR or OTDR traces.

FIG. 6 shows in more detail the trace acquisition and data processing.

Figure 10A:
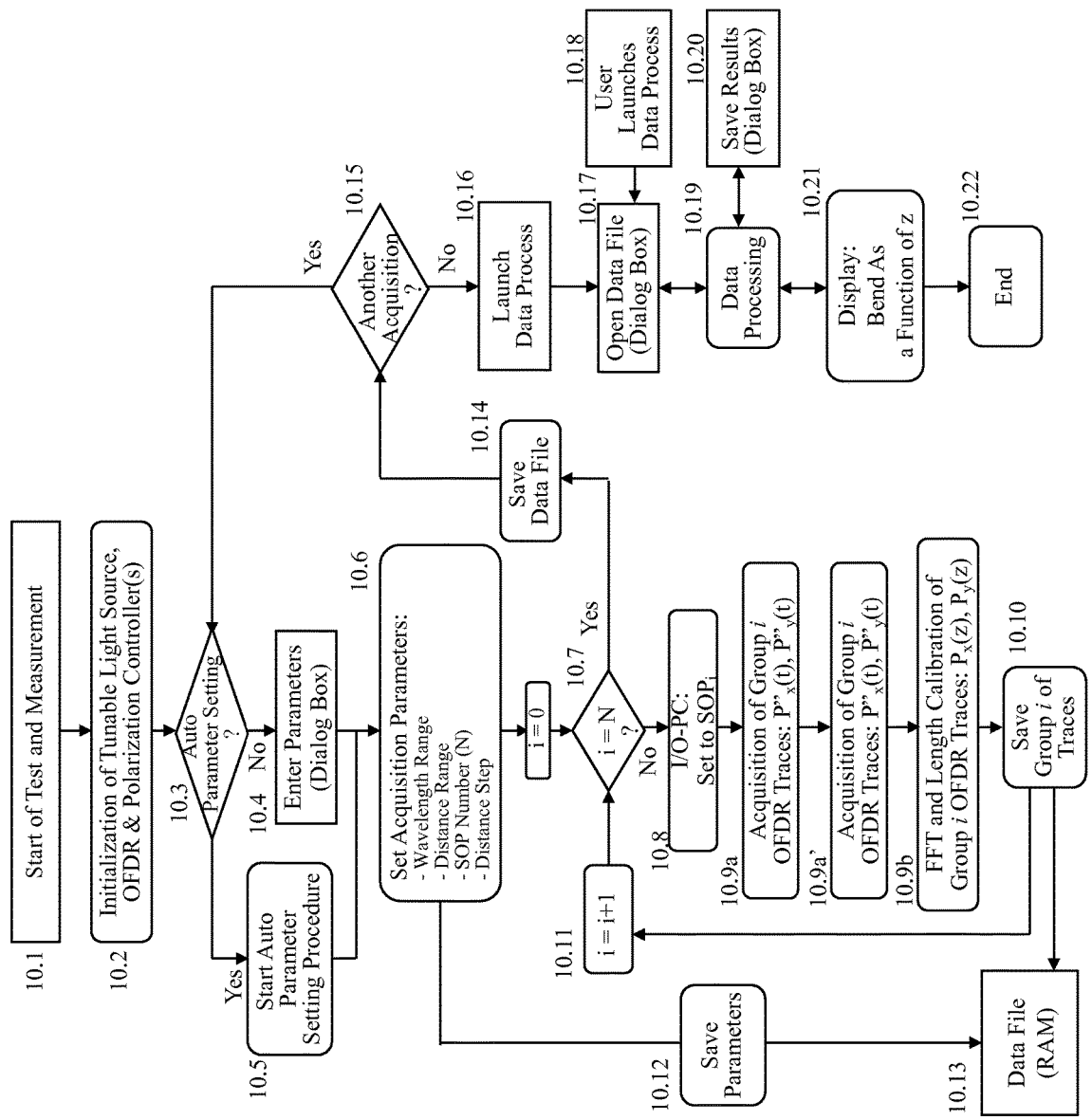
FIG. 10A is a flowchart illustrating operation of the POFDR measurement of FIGS. 1, 2, 3, 4, and 5.
Figure 10B:
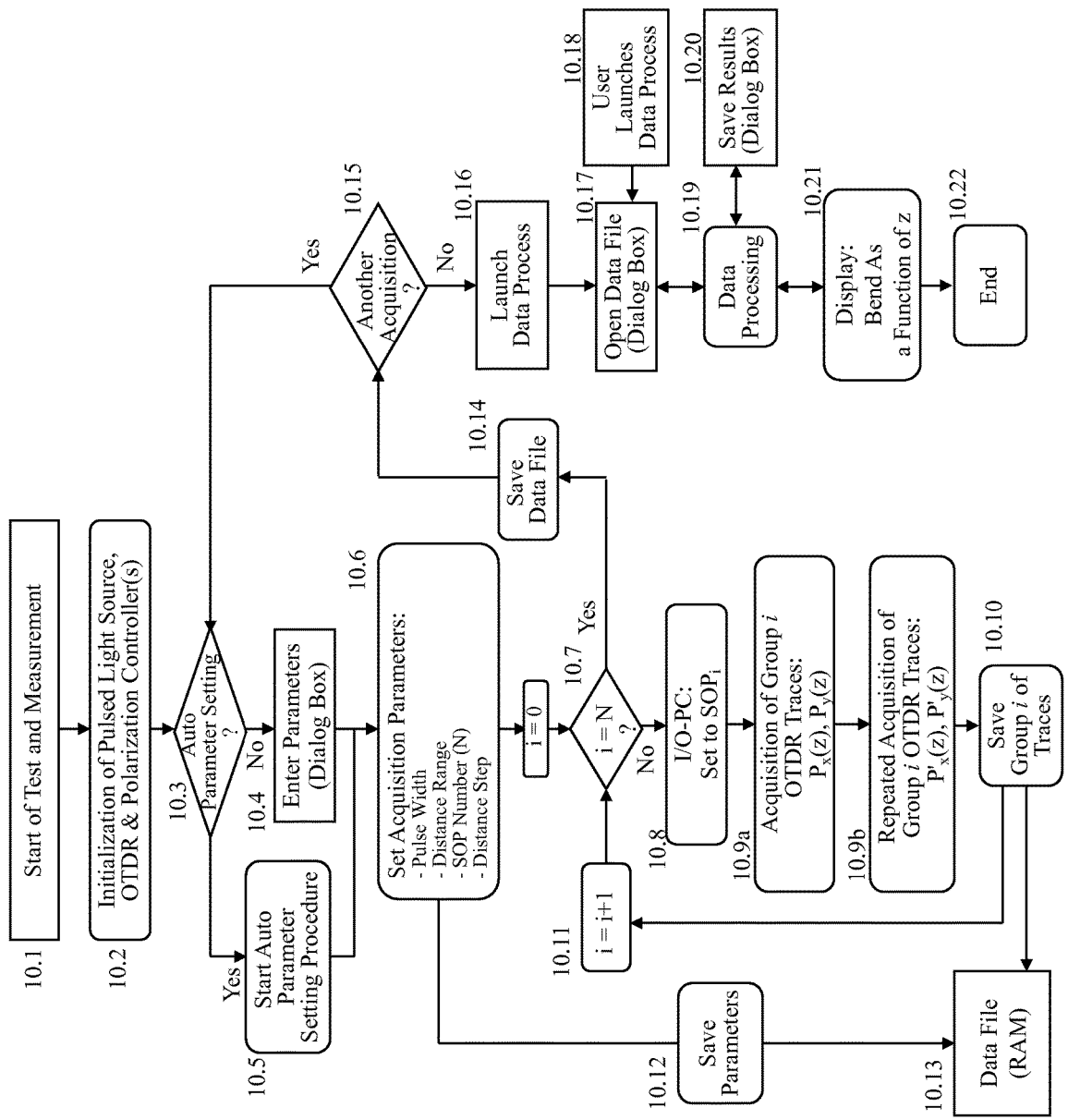
FIG. 10B is a flowchart illustrating operation of the POTDR measurement of FIGS. 6, 7, 8 and 9.

Once the ith OFDR or OTDR traces have been acquired as described above, in step 10.9 (see FIGS. 10A and 10B) the group is saved into the data file. In FIGS. 10A and 10B, if there is no automatic parameter setting, step 10.4 and step 10.6 are performed to allow the parameters to be entered, e.g., pulse width, distance range, SOP number and distance step; and if there is automatic parameter setting, step 10.5 and step 10.6 are performed to automatically enter the parameters. The parameters are then saved into a data file 10.13 by step 10.12. Step 10.15 represents an option for the user on whether or not to perform another data acquisition. It should be noted that for the OFDR step 10.9b is a FFT processing and length calibration to calculate the OFDR trace, i.e. to obtain loss as a function of FUT distance, but for the OTDR step 10.9b may be an optional step that may simple repeat the data acquisition of step 10.9a so as to remove those un-correlated noises in the mean square (MS) or root-mean square (RMS) computation, for example, to average away the electronic noise, polarization noise, in the MS or RMS optical signal (transmission) computation.

Step 10.10 and Step 10.11 represent saving OTDR traces and then increases the data number to iteratively acquire OTDR traces.

For the OFDR acquisition as for the embodiment in FIG. 1, after step 10.8, steps 10.9a and 10.9b will be repeated for K different center-wavelengths but the same I/O-SOP$_i$ selected by the I/O-PC controller 36 and until 2·M·K OFDR traces have been acquired after for M different I/O-SOPs and the acquired data are stored in the data file. Alternatively for the OFDR acquisition as for the embodiment in FIG. 10A, steps 10.9a and 10.9a' will be repeated for the same center-wavelengths and the same I/O-SOP$_i$ selected by the I/O-PC 36 for at least twice where a pair of OFDR traces has been acquired after step 10.9b and then stored in the data file, and then such steps of 10.9a and 10.9a' are repeated for M different I/O-SOPs. For the OTDR acquisition as for the embodiment in FIG. 10B, steps 10.9a and 10.9b will also be repeated for the same center-wavelengths and the same I/O-SOP$_i$ selected by the I/O-PC 36 for at least twice where a pair of OTDR traces has been acquired and stored in the data file, and then such steps of 10.9a and 10.9b are repeated for M different I/O-SOPs.

At this stage, the measurement parameters and all groups of OFDR or OTDR traces have been saved in the same data file.

If processing is initiated, step 10.14 allows the user to select the data file to be processed in a conventional "open file" dialog box at steps 10.17 and 10.18, whereupon, in step 10.16, the data processor accesses the pre-saved acquisition data and associated measurement parameters from the data file, and uses the data to compute fiber bend or stress induced birefringence or bend or stress characteristics as a function of distance (z) along the FUT. Step 10.20 allows the user to save the computed fiber bend or stress information and step 10.21 allows the computed fiber bend or stress information to be displayed. The process is terminated at step 10.22.

The manner in which the data processing step 10.19 in FIGS. 10A and 10B is processed following the below section (D) of "Theory and Signal Processing of Uniformly or Randomly Scrambled Input/Output SOP Analysis Method for Distributed Birefringence Measurement" and as well other procedures described herein.

(C) Data Acquisition, Structure and Calibration

Time Domain Data Structure

Each group OFDR traces obtained for K center wavelength for one set input and output state-of-polarization (I/O-SOP) for the single-end POFDR based distributed fiber birefringence and bend analysis constitutes the elementary data points. Each OFDR acquisition consists of two OFDR traces and each such trace has N power values corresponding to N values $t_n$ of the time t, with n=0 . . . (N−1).

The data unit consists of two OFDR traces as such for FIGS. 4A and 4B where two OFDR traces are obtained simultaneously from photodetectors with their coherent detections (or alternatively sequentially in the case where an optical switch is used with one detector), all obtained with a given I/O-SOP as set by I/O-PC 36 and a swept wavelength range for a set central wavelength. Note it may be necessary to repeat such data acquisition for several different set central wavelengths, e.g. K, with the same I/O-SOP, especially for a 'narrow' swept wavelength range may be used, for example of 2.5-125 GHz in C or L bands. Otherwise there is no required for many such 'repeated' measurements for the central wavelengths if a wide swept wavelength may be used, for example >125 GHz in C or L bands or any telecom wavelength. (It is also necessary to be understood that too wide wavelength range, e.g. 20 nm in C-band, may not be necessary to bring significantly advantages but it may disadvantageously provide un-reliable measurement results in some case if there may be significantly depolarization from fiber PMD.) The two traces forming group k have been obtained in the following sequence (time flowing from left to right), where the labels x and y refer to the traces obtained simultaneously from photodetectors PDx and PDy corresponding to the detection output A and detection output B, respectively, for example as shown in FIG. 5C, $\Delta\lambda = \lambda_L^{(k)} - \lambda_S^{(k)}$ (L, S mean Long and Short, respectively) equals to the tunable laser source swept wavelength range, the central wavelength is defined as $\lambda_k = (\lambda_S^{(k)} + \lambda_L^{(k)})/2$.

The overall data for the data processing (or stored in the data file after acquisition) is depicted as a below matrix (A) below, to which we will refer in all that follows. The matrix comprises K groups pair of OFDR traces (x and y) as a function of time (t), each consisting of N points corresponding to N values of time $t_n$ for K different laser central wavelengths that has a wavelength tuning range of $\Delta\lambda$, where n=0 . . . (N−1), for totally M different I/O-SOPs:

(A)

| | $\lambda_0$ | | | ... ... | $\lambda_{K-1}$ | | |
|---|---|---|---|---|---|---|---|
| I/O-SOP$_0$ ($\Delta\lambda$) | $P_{x,0}^0(t_0)$  $P_{y,0}^0(t_0)$ | ... ... | $P_{x,0}^0(t_{N-1})$  $P_{y,0}^0(t_{N-1})$ | ... ... | $P_{x,0}^{K-1}(t_0)$  $P_{y,0}^{K-1}(t_0)$ | ... ... | $P_{x,0}^{K-1}(t_{N-1})$  $P_{y,0}^{K-1}(t_{N-1})$ |
| I/O-SOP$_1$ ($\Delta\lambda$) | $P_{x,1}^0(t_0)$  $P_{y,1}^0(t_0)$ | ... ... | $P_{x,1}^0(t_{N-1})$  $P_{y,1}^0(t_{N-1})$ | ... ... | $P_{x,1}^{K-1}(t_0)$  $P_{y,1}^{K-1}(t_0)$ | ... ... | $P_{x,1}^{K-1}(t_{N-1})$  $P_{y,1}^{K-1}(t_{N-1})$ |
| : | : | : | : | : | : | : | : |
| I/O-SOP$_m$ ($\Delta\lambda$) | $P_{x,m}^0(t_0)$  $P_{y,m}^0(t_0)$ | ... ... | $P_{x,m}^0(t_{N-1})$  $P_{y,m}^0(t_{N-1})$ | ... ... | $P_{x,m}^{K-1}(t_0)$  $P_{y,m}^{K-1}(t_0)$ | ... ... | $P_{x,m}^{K-1}(t_{N-1})$  $P_{y,m}^{K-1}(t_{N-1})$ |
| : | : | : | : | : | : | : | : |
| I/O-SOP$_{M-1}$ ($\Delta\lambda$) | $P_{x,M}^0(t_0)$  $P_{y,M}^0(t_0)$ | ... ... | $P_{x,M}^0(t_{N-1})$  $P_{y,M}^0(t_{N-1})$ | ... ... | $P_{x,M}^{K-1}(t_0)$  $P_{y,M}^{K-1}(t_0)$ | ... ... | $P_{x,M}^{K-1}(t_{N-1})$  $P_{y,M}^{K-1}(t_{N-1})$ |

As shown in the data structure (D1), the data is the OFDR power as a function of time (t) (instead of power as a function of distance (z) as discussed in next section).

Also the data groups in the bold squares are considered these basic OFDR group traces, where the group traces from different I/O-SOPs must be processed independently, i.e. they can be considered un-correlated, but the group traces from the same I/O-SOP should be processed together before to extract the fiber birefringence and bend or stress information in order to achieve a best instrument performance.

It should emphasis again that if a wide wavelength range is used, for example >125 GHz along 1550 nm, then K can be set 1, i.e. only one single central wavelength is used. Otherwise, K may be set as 2 to 20 or any practical number if a wavelength range may be small, for example of 5-10 GHz, where it is important to require that every central wavelength must be different from each other.

Fast Fourier Transform (FFT)

Next step is the FFT computation for each acquired time domain OFDR RAW data in the Data matrix (A). The frequency domain data group can be obtained as described in following section.

Frequency Domain Data Structure

After the FFT a new matrix data structure (B) is obtained that comprises K groups pair of OFDR traces (x and y) as a function of frequency (v)—beating frequency between local oscillation lights and backreflected lights, each consisting of N' points corresponding to N' values of frequency $v_{n'}$ for K different laser central wavelengths that has the wavelength tuning range of $\Delta\lambda$, where n'=0 ... (N'-1), for totally M different I/O-SOPs:

(B)

| | $\lambda_0$ | | | ... ... | $\lambda_{K-1}$ | | |
|---|---|---|---|---|---|---|---|
| I/O-SOP$_0$ ($\Delta\lambda$) | $P_{x,0}^0(v_0)$  $P_{y,0}^0(v_0)$ | ... ... | $P_{x,0}^0(v_{N'-1})$  $P_{y,0}^0(v_{N'-1})$ | ... ... | $P_{x,0}^{K-1}(v_0)$  $P_{y,0}^{K-1}(v_0)$ | ... ... | $P_{x,0}^{K-1}(v_{N'-1})$  $P_{y,0}^{K-1}(v_{N'-1})$ |
| I/O-SOP$_1$ ($\Delta\lambda$) | $P_{x,1}^0(v_0)$  $P_{y,1}^0(v_0)$ | ... ... | $P_{x,1}^0(v_{N'-1})$  $P_{y,1}^0(v_{N'-1})$ | ... ... | $P_{x,1}^{K-1}(v_0)$  $P_{y,1}^{K-1}(v_0)$ | ... ... | $P_{x,1}^{K-1}(v_{N'-1})$  $P_{y,1}^{K-1}(v_{N'-1})$ |
| : | : | : | : | : | : | : | : |
| I/O-SOP$_m$ ($\Delta\lambda$) | $P_{x,m}^0(v_0)$  $P_{y,m}^0(v_0)$ | ... ... | $P_{x,m}^0(v_{N'-1})$  $P_{y,m}^0(v_{N'-1})$ | ... ... | $P_{x,m}^{K-1}(v_0)$  $P_{y,m}^{K-1}(v_0)$ | ... ... | $P_{x,m}^{K-1}(v_{N'-1})$  $P_{y,m}^{K-1}(v_{N'-1})$ |
| : | : | : | : | : | : | : | : |
| I/O-SOP$_{M-1}$ ($\Delta\lambda$) | $P_{x,M}^0(v_0)$  $P_{y,M}^0(v_0)$ | ... ... | $P_{x,M}^0(v_{N'-1})$  $P_{y,M}^0(v_{N'-1})$ | ... ... | $P_{x,M}^{K-1}(v_0)$  $P_{y,M}^{K-1}(v_0)$ | ... ... | $P_{x,M}^{K-1}(v_{N'-1})$  $P_{y,M}^{K-1}(v_{N'-1})$ |

As shown in the data structure (B), the data after the FFT is the OFDR power as a function of frequency or beating frequency (v).

Fiber Length Automatic Calibration Procedure Using Internal Reference Fiber

The measured light beating frequencies correspond the round-trip times of lights travelling for different locations/distances of the FUT and a laser frequency tuning speed so that it is also dependent on the fiber index, laser frequency tuning speed, etc. Here we propose an automatic fiber length calibration procedure by using a known length of the internal reference fiber to automatically calibrate the instrument so as to provide a fair accurate (but simple and robust) absolute FUT length if knowing the fiber type of the FUT is the same or similar as the internal reference fiber. Otherwise, if the fiber type is very different, then different ROIs (reflective of index) would provide a highly uncertainty for the measured fiber length. However, such uncertainty can be reduced to allow user to input a known ROI for the FUT. Indeed it is true for the most of fibers in the field, especially for the access network for the FTTH application, the standard optical fibers are used, e.g. G.652, G.657, with very similar ROIs.

The fiber length automatically calibration is to use an internal reference reflector that has a well known factory calibrated length and then every measurements in the field will compute the FUT length according to the reference length by simply to calculate the ratio between the measured FUT lengths and internal reference length. Although such length reference may not have a very high degree absolutely length accuracy, it can still provide fairly reliable and robust length measurement accuracy, e.g. with an uncertainty of <1 mm, especially helpful for the field T&M application. After the fiber length automatically calibration procedure, the spatial domain OFDR traces are ready for further computation and display (e.g. display of the distributed fiber loss, events, and optical return loss).

It is appreciated to be noted that above such length calibration procedure may not be necessary and such fiber length or distance could be obtained from other manner, such as a theoretical computation based on a laser frequency speed, a fiber ROI, etc. or any other method.

Spatial Domain Data Structure

After above several steps, i.e. the FFT, length calibration procedures, etc., a new matrix data structure (C) is obtained that comprises K groups pair of OFDR traces (x and y) as a function of distance (z), each consisting of N" points corresponding to N" values of distance $z_{n''}$ for K different laser central wavelengths that has the wavelength tuning range of $\Delta\lambda$, where n"=0 . . . (N"–1), for totally M different I/O-SOPs:

|  | $\lambda_0$ | | | | $\lambda_{K-1}$ | | (C) |
|---|---|---|---|---|---|---|---|
| I/O-SOP$_0$ | $P_{x,0}^0(z_0)$ | ... | $P_{x,0}^0(z_{N''-1})$ | ... ... | $P_{x,0}^{K-1}(z_0)$ | ... | $P_{x,0}^{K-1}(z_{N''-1})$ |
| ($\Delta\lambda$) | $P_{y,0}^0(z_0)$ | ... | $P_{y,0}^0(z_{N''-1})$ | ... ... | $P_{y,0}^{K-1}(z_0)$ | ... | $P_{y,0}^{K-1}(z_{N''-1})$ |
| I/O-SOP$_1$ | $P_{x,1}^0(z_0)$ | ... | $P_{x,1}^0(z_{N''-1})$ | ... ... | $P_{x,1}^{K-1}(z_0)$ | ... | $P_{x,1}^{K-1}(z_{N''-1})$ |
| ($\Delta\lambda$) | $P_{y,1}^0(z_0)$ | ... | $P_{y,1}^0(v_{N''-1})$ | ... ... | $P_{y,1}^{K-1}(z_0)$ | ... | $P_{y,1}^{K-1}(z_{N''-1})$ |
| : | : | : | : | : | : | : | : |
| I/O-SOP$_m$ | $P_{x,m}^0(z_0)$ | ... | $P_{x,m}^0(z_{N''-1})$ | ... ... | $P_{x,m}^{K-1}(z_0)$ | ... | $P_{x,m}^{K-1}(z_{N''-1})$ |
| ($\Delta\lambda$) | $P_{y,m}^0(z_0)$ | ... | $P_{y,m}^0(z_{N''-1})$ | ... ... | $P_{y,m}^{K-1}(z_0)$ | ... | $P_{y,m}^{K-1}(z_{N''-1})$ |
| : | : | : | : | : | : | : | : |
| I/O-SOP$_{M-1}$ | $P_{x,M}^0(z_0)$ | ... | $P_{x,M}^0(z_{N''-1})$ | ... ... | $P_{x,M}^{K-1}(z_0)$ | ... | $P_{x,M}^{K-1}(z_{N''-1})$ |
| ($\Delta\lambda$) | $P_{y,M}^0(z_0)$ | ... | $P_{y,M}^0(z_{N''-1})$ | ... ... | $P_{y,M}^{K-1}(z_0)$ | ... | $P_{y,M}^{K-1}(z_{N''-1})$ |

As shown in the data structure (C), the data after the FFT and internal reference length calibration or other method the OFDR power as a function of FUT distance (z) is ready for further bend analysis data processing, where the OFDR traces are similar as standard OTDR traces that is obtained in time domain acquisition using a pulsed light source.

It should be noted that for the POTDR configurations as described in embodiments FIGS. 6, 8A, 8B and 9A, the data structure (C) could be directly acquired after many averaging and above other steps are not required. However, the data structure for the POTDR should be as no repeated center wavelength required but require to do repeated measurements for at least twice for each Px and Py acquisition with the same I/O-SOP, etc. but acquired only from different time. Indeed such acquisition could advantageously reduce the noise after overall averaging of acquired data for many different I/O-SOPs, where a mean square calculation may be performed by using acquired POTDR data from different times.

Note in the instrument design for the distances between PBS 34 and two photodetectors (PDx and PDy) 62A and 64A must be set the same or very close.

Auto Calibration of the Relative Gain and Optical Insertion Loss

As shown in the embodiment FIG. 1A where two photodetectors are used for the OFDR acquisitions, thus it is necessary to perform the below described calibration procedure of the relative gain (including optical loss) for the two detectors PDx and PDy, respectively, before proceeding with any further computation. It should be noted the below described auto calibration includes for both electronic detection gain and optical insertion loss. Also this calibration is 'relatively', however, as we will describe in below data processing for the fiber birefringence and bend computation, there does not require for an absolute power measurement because of the normalization and equalization procedures could work with relative signal power or intensity although an absolute power calibration providing absolute light power value can also work for the signal processing, e.g. for the normalization and equalization procedures, etc.

The calibration principle is predicated upon the fact that, when an I/O-SOP polarization controller or scrambler is used to generate a sufficiently large number of SOPs so as to substantially cover the Poincaré Sphere, in uniformly or random manner, the average power of the backreflected lights, high backreflections, e.g. from connection, etc., and Rayleigh backscattering (RBS) over any segments along the FUT will exit from the two ports of the PBS 34 with a 2:1 ratio, the higher power corresponding to the port to which detector A PDx is connected and the lower power corresponding to the port to which detector B PDy is connected. Hence, any observed deviation from this 2:1 ratio for the observed detector powers can be quantified and taken into account, as follows.

After the data acquisition, FTT and length calibration procedures are completed, 2K·M groups of pair (two) OFDR traces obtained from both photodetectors (PDx detection output A and PDy detection output B, respectively) have been obtained and may be further stored, i.e., a total number of J=2K·M traces from detector PDx and also J=2K·M traces from detector PDy, as depicted in data matrix (c). The $j^{th}$ traces (j=0, 1 . . . (J−1)) from PDx and PDy are referred to below as $P^k_{x,m}(z)_j$ and $P^k_{y,m}(z)_j$, respectively, where k=0, 1 . . . (K−1) and m=0, 1 . . . (M−1).

If the overall losses in the two arms from the PBS 34 two detectors A and B, i.e. two optical paths from PBS 34 to detector A and detector B, respectively, were identical and the gains of both photodetectors and associated electronics were also equal, the ratio of the traces Px and Py after averaging over all J and over all the N values of z, for example using a known internal reference fiber length inside instrument or other fiber or device connected to instrument, would be $$\frac{\langle P_x \rangle}{\langle P_y \rangle} \equiv \frac{\sum_k \sum_j \sum_n P^k_x(z_n)_j}{\sum_k \sum_j \sum_n P^k_y(z_n)_j} = 2 \quad (1)$$

In practice, the ratio obtained from the average of the measured traces does not equal 2 because of different optical losses from the two arms of the PBS and different 'effective' gains of the photodetectors, which includes the photodiode responsivity as well as the overall gains of the following electronics, amplifiers, and sampling circuit, etc. Note that it is not necessary to determine the individual gains or loss separately although it may still be an approach if a calibration procedure may be performed in such way. Therefore, before proceeding with the rest of the computations below, all the J traces obtained from photodetector PDy, i.e. all the $P_y(z)_j$, are multiplied as follows:

$$P_y(z)_j \equiv g \cdot P_y(z_n)_j \quad (2)$$

where $$g = \frac{1}{2} \frac{\langle P_x \rangle}{\langle P_y \rangle} = \frac{\sum_k \sum_j \sum_n P^k_x(z_n)_j}{\sum_k \sum_j \sum_n P^k_y(z_n)_j} \quad (3)$$

In practice, for the central wavelengths that are relatively closed to a narrow wavelength range, e.g. <5-20 nm, as the case for our fiber bend analyzer instrument, the relative wavelength dependence of the components, detectors, etc., may be negligible and this calibration process need only be carried out once per POFDR measurement sequence. Otherwise, this calibration may need to be carried out at every central wavelength, thereby increasing the overall calibration time, however this is still feasible because this calibration may not be required very often, for example at factory before the instrument being shipped out to costumers. However, if the instrument calibration is invalid due to environment changes then the user could still perform a calibration procedure according to his own environment situation. In another side for a case if an environment condition may be varied but it could be known, for example for a temperature issue that could be measured by using an internal temperature sensor, then a factory calibration data could still be used if such calibration data obtained in the factory are stored.

As a result of the calibration, i.e. after all $P_y$ traces have been multiplied by the measured relative gain as described above, the data processor now can compute the normalized OFDR traces. More precisely, the normalized traces in the case for the PBS embodiments are obtained by dividing either the sampled signal $P_x$ from detector PDx and signal $P_y$ from detector PDy by their sum $(P_x+P_y)$ of the sampled signals from both of the detectors PDx and PDy which represents the total backreflected power before incident on the PBS, i.e., without selection of a particular polarization component.

It should be appreciated to be noted that this gain/loss calibration procedure can also be done by other different calibration method, for example by incident scrambled lights in the instrument via connector 40.

(D) Theory and Signal Processing of Uniformly or Randomly Scrambled Input/Output SOP Analysis Method for Distributed Birefringence Measurement If a tunable laser and a polarization controller are used to launch and control the input light incident at an one end of FUT and a polarization state analyzer and power detectors (PDx and PDy) are used to measure the powers from the FUT from the same end of FUT 100, at two closely spaced fiber distances, $z_S$ and $z_L$, around a given center distance, $z_c$, for a large number M of input/output state of polarizations, i.e., I/O-SOP$_m$, where m=1,2, . . . , M, each referring to both the input-SOP (I-SOP) and the output-SOP (O-SOP) that sees the analyzer axis by the received light. Both the I-SOP and the O-SOP should be chosen in a well uniformly or random distributed manner, such that the points conventionally representing SOPs on the Poincaré sphere are uniformly-distributed over the surface of sphere, whether the distribution is uniform or random grid of points. It has been observed that, on average over a sufficiently large, uniformly distributed number K (≥3-100) of I/O-SOPs, the mean-square difference between normalized powers measured at a distance pair of $z_S$ and $z_L$ is related to the local birefringence, $\Delta\beta(z, \omega)$, at a given center distance, $z_c$, where $z_c=(z_S+z_L)/2$, by a simple known relationship, valid in all cases for any type of practical FUTs, $$\Delta\beta(z, \omega)_{RT} = \alpha_s \cdot \frac{\sqrt{\langle \Delta T^2(z, \omega) \rangle_{SOP}}}{\Delta z} \quad (4)$$

where $< >_{SOP}$ represents an average over the M I/O-SOPs, $\Delta z = z_L - z_S$ is the distance step, $\omega = 2\pi c/\lambda$. The equation (4)

can be valid for the correlated I/O-SOP setting as the set-up embodiment in FIG. 1A where one polarization controller or scrambler 36 is used, and in such POFDR configuration $\alpha_s=\sqrt{15}$. $\Delta T(z, \omega)$ is a transmission difference between the two analyzed transmissions (i.e. normalized powers) measured at $z_S$ and $z_L$, respectively, and its mean-square transmission difference is, $$\langle \Delta T(z,\omega)^2 \rangle_{SOP} = \left\{ \left( T_{L,x}\left(\omega, z+\frac{1}{2}\Delta z\right) - T_{S,x}\left(\omega, z-\frac{1}{2}\Delta z\right) \right)^2 + \left( T_{L,x}\left(\omega, z+\frac{1}{2}\Delta z\right) - T_{S,x}\left(\omega, z-\frac{1}{2}\Delta z\right) \right)^2 \right\}_{SOP} \quad (5)$$

$$= \frac{1}{M} \sum_{m=0}^{M-1} \left( \left( T_{L,x,m}^{(k)}\left(w, z+\frac{1}{2}\Delta z\right) - T_{S,x,m}^{(k)}\left(\omega, z-\frac{1}{2}\Delta z\right) \right)^2 + \left( T_{L,y,m}^{(k)}\left(\omega, z+\frac{1}{2}\Delta z\right) - T_{S,y,m}^{(k)}\left(\omega, z-\frac{1}{2}\Delta z\right) \right)^2 \right)$$

and the mean-square difference may be averaged over both SOP and wavelengths as, $$\langle \Delta T(z,\omega)^2 \rangle_{SOP,\omega} = \left\{ \left( T_{L,x}\left(\omega, z+\frac{1}{2}\Delta z\right) - T_{S,x}\left(\omega, z-\frac{1}{2}\Delta z\right) \right)^2 + \left( T_{L,x}\left(\omega, z+\frac{1}{2}\Delta z\right) - T_{S,x}\left(\omega, z-\frac{1}{2}\Delta z\right) \right)^2 \right\}_{SOP,\omega} \quad (5')$$

$$= \frac{1}{M \cdot K} \sum_{k=0}^{K-1} \sum_{m=0}^{M-1} \left( \left( T_{L,x,m}^{(k)}\left(w, z+\frac{1}{2}\Delta z\right) - T_{S,x,m}^{(k)}\left(\omega, z-\frac{1}{2}\Delta z\right) \right)^2 + \left( T_{L,y,m}^{(k)}\left(\omega, z+\frac{1}{2}\Delta z\right) - T_{S,y,m}^{(k)}\left(\omega, z-\frac{1}{2}\Delta z\right) \right)^2 \right)$$

where the transmissions for a PBS based two detectors or detections are, $$T_{S,x,m}^{(k)}\left(\omega, z-\frac{1}{2}\Delta z\right) = \frac{\sum_k P_{S,x,m}^{(k)}\left(\omega, z-\frac{1}{2}\Delta z\right)}{\sum_k P_{S,x,m}^{(k)}\left(\omega, z-\frac{1}{2}\Delta z\right) + \sum_k P_{S,y,m}^{(k)}\left(\omega, z-\frac{1}{2}\Delta z\right)} \quad (6a)$$

$$T_{S,y,m}^{(k)}\left(\omega, z-\frac{1}{2}\Delta z\right) = \frac{\sum_k P_{S,y,m}^{(k)}\left(\omega, z-\frac{1}{2}\Delta z\right)}{\sum_k P_{S,x,m}^{(k)}\left(\omega, z-\frac{1}{2}\Delta z\right) + \sum_k P_{S,y,m}^{(k)}\left(\omega, z-\frac{1}{2}\Delta z\right)} \quad (6b)$$

$$T_{L,x,m}^{(k)}\left(\omega, z+\frac{1}{2}\Delta z\right) = \frac{\sum_k P_{L,x,m}^{(k)}\left(\omega, z-\frac{1}{2}\Delta z\right)}{\sum_k P_{L,x,m}^{(k)}\left(\omega, z+\frac{1}{2}\Delta z\right) + \sum_k P_{L,y,m}^{(k)}\left(\omega, z+\frac{1}{2}\Delta z\right)} \quad (7a)$$

$$T_{L,y,m}^{(k)}\left(\omega, z+\frac{1}{2}\Delta z\right) = \frac{\sum_k P_{L,y,m}^{(k)}\left(\omega, z+\frac{1}{2}\Delta z\right)}{\sum_k P_{L,x,m}^{(k)}\left(\omega, z+\frac{1}{2}\Delta z\right) + \sum_k P_{L,y,m}^{(k)}\left(\omega, z+\frac{1}{2}\Delta z\right)} \quad (7b)$$

The equation (4) could be valid for the uncorrelated I-SOP and O-SOP, for example by two uncorrelated polarization controllers or scramblers, and then $\alpha_s=3\sqrt{2}$ is a theoretical constant. For the set-up configuration where one polarization or scrambler is used, then $\alpha_s=\sqrt{15}$. $\Delta T(z, \omega)$ is a transmission difference between the two analyzed transmissions (i.e. normalized powers) measured at $z_S$ and $z_L$, respectively, and its mean-square transmission difference ($\Delta T(z, \omega)^2$) for the transmission difference $\Delta T(z, \omega)$ between the two analyzed transmissions (i.e. normalized powers) measured at $z_S$ and $z_L$, respectively, can be computed as a function of distance z, where $z=(z_S+z_L)/2$ and $\Delta z=(z_L-z_S)$, $$\langle \Delta T(z,\omega)^2 \rangle_{SOP} = \frac{\left\{ \left( T_{L,x}^{(k)}\left(\omega, z+\frac{1}{2}\Delta z\right) - T_{S,x}^{(k)}\left(\omega, z-\frac{1}{2}\Delta z\right) \right)^2 + \left( T_{L,x}^{(k)}\left(\omega, z+\frac{1}{2}\Delta z\right) - T_{S,x}^{(k)}\left(\omega, z-\frac{1}{2}\Delta z\right) \right)^2 \right\}_{SOP}}{2} \quad (8)$$

$$= \frac{1}{2M} \sum_{m=0}^{M-1} \left( \left( T_{L,x,m}^{(k)}\left(w, z+\frac{1}{2}\Delta z\right) - T_{S,x,m}^{(k)}\left(\omega, z-\frac{1}{2}\Delta z\right) \right)^2 + \left( T_{L,y,m}^{(k)}\left(\omega, z+\frac{1}{2}\Delta z\right) - T_{S,y,m}^{(k)}\left(\omega, z-\frac{1}{2}\Delta z\right) \right)^2 \right)$$

and, for a short wavelength range, the mean-square difference may be averaged over both SOP and wavelengths as, $$\langle \Delta T(z,\omega)^2 \rangle_{SOP,\omega} = \frac{\left\{ \left( T_{L,x}^{(k)}\left(\omega, z+\frac{1}{2}\Delta z\right) - T_{S,x}^{(k)}\left(\omega, z-\frac{1}{2}\Delta z\right) \right)^2 + \left( T_{L,x}^{(k)}\left(\omega, z+\frac{1}{2}\Delta z\right) - T_{S,x}^{(k)}\left(\omega, z-\frac{1}{2}\Delta z\right) \right)^2 \right\}_{SOP,\omega}}{2} \quad (8')$$

$$= \frac{1}{2M \cdot K} \sum_{k=0}^{K-1} \sum_{m=0}^{M-1} \left( \left( T_{L,x,m}^{(k)}\left(w, z+\frac{1}{2}\Delta z\right) - T_{S,x,m}^{(k)}\left(\omega, z-\frac{1}{2}\Delta z\right) \right)^2 + \left( T_{L,y,m}^{(k)}\left(\omega, z+\frac{1}{2}\Delta z\right) - T_{S,y,m}^{(k)}\left(\omega, z-\frac{1}{2}\Delta z\right) \right)^2 \right)$$

-continued

The transmissions for a polarizer based one detector embodiments may be obtained as, $$T_{S,m}^{(k)}\left(\omega, z - \frac{1}{2}\Delta z\right) = \beta_0 \cdot \frac{P_{S,m}^{(k)}\left(\omega, z - \frac{1}{2}\Delta z\right)}{\left\langle P_{S,m}\left(\omega, z - \frac{1}{2}\Delta z\right)\right\rangle_{SOP}} \quad (9a)$$

$$T_{L,m}^{(k)}\left(\omega, z - \frac{1}{2}\Delta z\right) = \beta_0 \cdot \frac{P_{L,m}^{(k)}\left(\omega, z + \frac{1}{2}\Delta z\right)}{\left\langle P_{L,m}\left(\omega, z + \frac{1}{2}\Delta z\right)\right\rangle_{SOP}} \quad (9b)$$

where the reference mean-value $\beta_o$ is a theoretical constant that is dependent on measurement input and output polarization set-up configurations, i.e. either two uncorrelated polarization controllers or scramblers or one correlated polarization controller or scrambler.

For the set-up configuration using two uncorrelated polarization controllers or scramblers, for example as FIG. 1D, $$\beta_0 = 2 \quad (10a)$$

and for the set-up configuration using only uncorrelated polarization controllers or scramblers, for example as FIGS. 1B and 1C, where x polarization component is detected, $$\beta_0 = \frac{3}{2} \quad (10b)$$

when where y polarization component is detected, $$\beta_0 = 3 \quad (10c)$$

Indeed for the practical application one polarization controller may be used, the theoretical constant $\beta_o$ in equation (10b) or (10c) may be used.

In the equations (9a) and (9b) the average powers are defined, $$\left\langle P_S\left(\omega, z - \frac{1}{2}\Delta z\right)\right\rangle_{SOP} = \frac{1}{K} \cdot \sum_{k=1}^{K} p_S^{(k)}\left(\omega, z - \frac{1}{2}\Delta z\right) \quad (11a)$$

$$\left\langle P_L\left(\omega, z + \frac{1}{2}\Delta z\right)\right\rangle_{SOP} = \frac{1}{K} \cdot \sum_{k=1}^{K} p_L^{(k)}\left(\omega, z + \frac{1}{2}\Delta z\right) \quad (11b)$$

Its mean-square transmission difference $\langle \Delta T(z, \omega)^2 \rangle$ for the transmission difference $\Delta T(z, \omega)$ between the two analyzed transmissions (i.e. normalized powers) measured at $z_S$ and $z_L$, respectively, can be computed as a function of distance z, where $z = (z_S + z_L)/2$ and $\Delta z = (z_L - z_S)$, $$\langle \Delta T(z, \omega)^2 \rangle_{SOP} = \left\langle \left(T_{L,m}^{(k)}\left(\omega, z + \frac{1}{2}\Delta z\right) - T_{S,m}^{(k)}\left(\omega, z - \frac{1}{2}\Delta z\right)\right)^2 \right\rangle_{SOP}$$

$$= \frac{1}{M} \sum_{m=0}^{M-1} \left(T_{L,m}^{(k)}\left(\omega, z + \frac{1}{2}\Delta z\right) - T_{S,m}^{(k)}\left(\omega, z - \frac{1}{2}\Delta z\right)\right)^2 \quad (12)$$

and, for a short wavelength range, the average of many different central wavelengths can be used, the mean-square difference may be averaged over both SOP and wavelengths as, $$\langle \Delta T(z, \omega)^2 \rangle_{SOP,\omega} = \left\langle \left(T_{L,m}^{(k)}\left(\omega, z + \frac{1}{2}\Delta z\right) - T_{S,m}^{(k)}\left(\omega, z - \frac{1}{2}\Delta z\right)\right)^2 \right\rangle_{SOP,\omega}$$

$$= \frac{1}{M \cdot K} \sum_{k=0}^{K-1} \sum_{m=0}^{M-1} \left(T_{L,m}^{(k)}\left(\omega, z + \frac{1}{2}\Delta z\right) - T_{S,m}^{(k)}\left(\omega, z - \frac{1}{2}\Delta z\right)\right)^2 \quad (12')$$

Furthermore, for the rms local birefringence measurement, the average of many different central wavelengths, especially for a short wavelength range can be used for each individual acquisition, i.e., in equation (1) averaging could also be carried out over both many I/O-SOPs and wavelengths to obtain the rms local birefringence, $\overline{\Delta}(z)$, over the prescribed wavelength range as, $$\langle \Delta \beta(z) \rangle_{RT} = \alpha_s \cdot \frac{\sqrt{\langle \Delta T^2(z, \omega) \rangle_{SOP,\omega}}}{\Delta z} \quad (13)$$

where $\langle \rangle_{SOP,\omega}$ as in equations (12') and (13) represents the average over the K I/O-SOPs for M different central wavelengths each with a predefined wavelength range. For the set-up configuration when a common (same) state of polarization controller or scrambler is used as both input and output light SOPs' controlling, the theoretical constant $\alpha_s$ in equations (4) and (13) $\alpha_s$ can be expressed as, $$\alpha_s = \sqrt{15} \quad (14a)$$

For a configuration when two polarization controllers or scramblers that produces uncorrelated I-SOP and O-SOP, then the theoretical constant $\alpha_s$ is, $$\alpha_s = 3\sqrt{2} \quad (14b)$$

It should be noted that equations (4) and (13) are the simple differential formula which are valid for a sufficiently small distance step $\Delta z$ ($\Delta z = z_L - z_S$) between the closely-spaced distances. However, for a large distance step other differential formula may be used, for example, arc sin formula as, $$\Delta \beta(z, \omega)_{RT} = \frac{\arcsin\left(\alpha_s \cdot \sqrt{\langle \Delta T^2(z, \omega) \rangle_{SOP}}\right)}{\Delta z} \quad (15)$$

and $$\langle \Delta \beta(z)_{RT} \rangle = \frac{\arcsin\left(\alpha_s \cdot \sqrt{\langle \Delta T^2(z, \omega) \rangle_{SOP,\omega}}\right)}{\Delta z} \quad (16)$$

The large distance step means $\Delta \beta(z,\omega)_{RT} \cdot \Delta z < 0.5$ or $\langle \Delta \beta(z,\omega)_{RT} \rangle \cdot \Delta z < 0.5$.

The local birefringence value or averaged local birefringence (RMS or mean) value over an wavelength range that is extracted from above equations (4), (13), (15) and (16) is valid for the single-end measurement for both configurations when a common (same) state of polarization controller (scrambler), and when two uncorrelated (different) state of polarization controllers (scramblers), then a different theoretical constant $\alpha_s$ must be applied.

It should also be noted that the local birefringence value or averaged local birefringence value over a wavelength range that is extracted from above equations (4), (13), (15) and (16) is not the one-way (forward) birefringence value from the FUT, for example, for the single-end measurement configuration it is a roundtrip value for the FUT. Thus, a roundtrip factor (e.g. $\eta \approx 0.61$) is required to multiply on a measured roundtrip local birefringence for equations (4), (13), (15) and (16) in order to provide one-way (forward) distributed local birefringence of the test fiber.

It should be noted that equations (4) and (15) produce a fiber birefringence value at a given (fixed) wavelength or a given laser spectral wavelength range, e.g. for OFDR it has a swept wavelength range $\Delta \lambda$ at a center wavelength $\lambda_c$ or for OTDR it is referred as a pulsed laser spectral width with a center wavelength $\lambda_c$, or defined as the average wavelength for a particular prescribed wavelength range that is used in the measurement and equations (13) and (16) gives an averaged fiber birefringence over an optical prescribed wavelength/frequency range, where the fiber birefringence may be varied with the optical wavelength/frequency.

For the typical fiber with the weak bend or stress induced birefringence the weak mode coupling may be expected for the birefringence in the single short bend length/distance, for example, a half or quarter turn bend, e.g. with a radius of 5-20 mm, that presents a bend fiber length of few cm.

Above equations described for the single-end distributed fiber birefringence measurement can apply for measuring single-end fiber local birefringence as a function of distance z by analyzing the Rayleigh backscattering lights for each location (z) along FUT length—a distributed bend or stress measurement. Thus, it is necessary to use a high spatial resolved reflectometery, for example to apply a wide tunable frequency range for the OFDR, e.g. 1-10 nm. It should also be noted in order properly to measure the distributed bend or stress induced fiber birefringence a high spatial resolved polarization sensitive reflectometery, for example POFDR, etc., is recommended, especially for accurately measuring the bend radius, bend or stress length and especially for measuring fiber bend events one after another within a short distance. However, other type high spatial-resolved OTDR may be also possible, such as photon-counting OTDR or an improved high spatial resolved commercial available OTDR instrument.

For the typically FTTH fiber installation situation it may be expected that the fiber bend or stress events may be separated by over few to thousands mm although some events may be located very closely, for example few mm, thus a well designed commercial available OTDR with a short OTDR pulse, for example ~0.1 ns to 10 ns, may also be used for the above fiber bend induced birefringence analysis although a poor performance may be expected.

The different $\Delta T(z, \omega)$ values obtained with different I/O-SOPs may be different between whole OFDR traces as a function of z, instead of just one single number. Also note $T(v,z)$ is a normalized and equalized trace as a function of fiber length z.

It should be noted that a very narrow tunable laser frequency range of the OFDR would give a poor spatial resolution. A wide tunable and high coherence laser sources can be used, e.g. tunable external cavity laser, tunable narrow linewidth fiber laser, tunable narrow linewidth semiconductor laser, etc., for the OFDR or a very short pulse for the OTDR so as to have a sufficient spatial resolution in the field. However, when a very wide wavelength light source may be used, a "depolarization" effect may be occurred because of possible fiber PMD. Indeed for a very short fiber, such effect may be negligible, however, a "depolarization" may also come from if a FUT length is long or even from other sources, for example the light polarization fluctuation due to fiber moving, et al. It should be noted that such "depolarization" effect may be only related to the light polarization, but it may also be related to any "noises" and such "noises" could/might degrade the signal's polarization, and such "noise" could be from any sources, for example, the laser phase noises mixed with these beating signals at their same beating frequencies for an POFDR. Here we take account of the finding that when the tested light "polarization" may be varied due to any such "depolarization" effect the mean-square differences $<\Delta T(z, \omega)^2>_{SOP}$ or $<\Delta T(z, \omega)^2>_{SOP,\omega}$ are "scaled down" by a factor that can be computed independently from the same raw data and such factor could be a relative variance of the traces and as a function of z.

It is worthy to be noted that in order to further reduce the 'variation' or 'fluctuation' or any 'noises', e.g. from a laser phase, on the measured optical parameter, the relative variance of the OFDR or OTDR traces may be calculated by an average over both the I/O-SOP and wavelengths.

Furthermore the averages indicated in equation (16) can be carried out over both I/O-SOPs and wavelengths and for the averages over many central wavelengths is particular important for the randomly birefringence mode coupling. However, no wavelength averages may be required for the weak birefringence mode coupling (as equations (4) and (15)) and indeed this could be some situations for the field FTTH fiber bend or stress induced weak birefringence cases where the local fiber birefringence may be induced from only a quarter or a half turn bend. But averaging over an enough wavelength range is critical to reduce the coherence noise as well to have an enough spatial resolution. It was observed that a 1 to 2 nm continuously tunable wavelength range to have a spatial resolution of 1 mm is sufficiently for the instrument design requirement regarding its cost, performance, etc. for the field test and measurement application, while other design parameters may also be possible, for example to use several discrete narrow tunable central wavelengths with a continuous narrow tunable wavelength range, as shown for the data matrix (A), (B) and (C) where K>1. Note if K could be set 1 if a swept wavelength range is wide.

Moreover, when the forward fiber birefringence value is to be displayed instead of the roundtrip birefringence value so as to estimate the fiber quality or lifetime or pass/fail situation, the result is multiplied by the above-specified roundtrip factor which for the both weak birefringence mode coupling case and randomly birefringence mode coupling case can be written as, $$\eta = 0.5 \tag{17a}$$

or $$\eta \approx 0.61 \tag{17b}$$

It is worthy to be noted that a linear component of the forward (one way) local birefringence could be calculated by using $\eta=0.5$ for two independent I-PC and O-PC. An overall local birefringence could be calculated by using $\eta \approx 0.61$ or $\eta = \sqrt{3/8}$ for applying either two independent or dependent I-PC and O-PC.

Thus, the forward distributed local birefringence can be as, $$\Delta\beta(z,\omega) = \eta \cdot \Delta\beta(z,\omega)_{RT} \tag{18}$$

and $$<\Delta\beta(z)> = \eta \cdot <\Delta\beta(z)_{RT}> \tag{19}$$

As mentioned above for the most practical fiber bend or stress induced birefringence situations in the field, for example FTTH, the weak birefringence mode coupling in a short fiber bend distance/length may be possible so the equation (15) can be written as, $$\Delta\beta(z)_{RT} = \frac{1}{\Delta z} \cdot \arcsin\left(\alpha_s \cdot \sqrt{\langle \Delta T^2(z,\omega) \rangle_{SOP}}\right) \quad (20)$$

and the forward distributed local birefringence can be as, $$\Delta\beta(z) = \eta \cdot \Delta\beta(z)_{RT} \quad (21)$$

It is worthy to be understood that above MS or RMS computation has significantly advantages over the mean value computation. This is because the MS or RMS computation could reduce the detection noises to the second order because the mean-square transmission difference $<\Delta T(z,\omega)^2>$ computation will remove the linear term of transmission difference multiplying noise after averaging many I/O-SOPs. Indeed such MS or RMS computation could significantly improve the instrument performance because it may be much tolerate the noises, e.g. detection electronic noise, polarization noise from fiber moving, et al.

It should also be noted and emphasise here that above said MS or RMS computation for the POTDR measurements may use repeated data measurements, as shown steps 10.9a and 10.9b (FIG. 10B) for the OTDR data acquisition or steps 10.9a and 10.9a' (FIG. 10A), and in such repeated data signal processing these noises, e.g. from detection, polarization, laser phase, et al, could be significantly reduced. It should be noted that such repeated data computation could be applied for any MS or RMS calculation so that the noise term could be no longer squared in the MS or RMS computation to remove or significantly reduce those randomly uncorrelated noises, especially for the mean-square transmission difference computations as for Equations (5), (5') and (8').

The following sections describe the technology in U.S. Provisional Patent Application No. 61/833,441 entitled "DISTRIBUTED FIBER BEND AND STRESS MEASUREMENT FOR DETERMINING OPTICAL FIBER RELIABILITY BY MULTI-WAVELENGTH OPTICAL REFLETOMETRY" and filed on Jun. 10, 2013. FIGS. 11-14 are referenced and the reference numbers or labels therein are independent from the reference numbers or labels in other figures of this document.

An optical fiber tends to be subject to bending, forces or stresses in applications. For example, fibers used for an optical network or fiber communication link, such as International Telecommunication Union recommended ITU-T G.652 single-mode optical fiber and cable, would suffer a fiber bend or stress loss which may adversely affect the performance or reliability of the fiber. Such fiber bending or stress could be measured by a commercial multiple-wavelength optical time domain reflectometer (OTDR), e.g. at 1310 nm or 1550 nm, to distinguish a bend loss from other losses, e.g. broken or connection loss, by use of the measured bend or stress induced loss difference information at different wavelengths. Such measurement is based on a bigger mode field diameter at a longer wavelength, thus for the most installed telecom optical fiber a bend or stress induced loss is higher at a longer wavelength, for example a bend loss at 1550 nm is bigger than that at 1310 nm The disclosed technology below includes, among others, methods apparatus for distributed measuring at least one fiber bend or stress related characteristics along an optical path of fiber under test (FUT) uses both a light input unit and a light output unit connected to the FUT at one single end. The disclosed technology provides, for example, methods and devices for measuring distributed bend- or stress-dependent characteristics of optical paths and can be applicable to the distributed measurement of bend parameters, for example, bend or stress radius, bend or stress length, bend or stress strength, fiber reliability and or quality, etc., and or fiber loss or attenuation difference between at least two wavelengths at a particular fiber distance, i.e. position or length, of an optical path which comprises mostly optical waveguide, such as an optical fiber or cable link, for example, for an optical fiber used for the optical network such as fiber to the home (FTTH) or any access optical network (FTTx) or multi-dwelling unit (MDU).

One aspect of the disclosed technology is the light input unit injects at least two different wavelengths, the short-wavelength ($\lambda_S$) and long-wavelength ($\lambda_L$), into the FUT. The input light at different wavelengths may be injected into the FUT in different ways, for example, sequential injection of one wavelength at a time by one after another or simultaneously injecting the different wavelengths. The output light unit extracts corresponding light from the FUT, analyzes and detects the extracted output light power, and processes the corresponding electrical signal to obtain transmitted optical power at each distance along the length of the FUT. A processing unit is provided to process the signals from the output light unit and computes at least one power difference in a measured power parameter corresponding to each of two distances from at least two different wavelengths, for example short-wavelength ($\lambda_S$) and long-wavelength ($\lambda_L$), respectively, the measured power difference parameter at a pair of distances being proportional to local fiber loss or attenuation parameter. The processing unit calculates the at least one bend or stress related FUT characteristics, for example, bend or stress radius, bend or stress strength, etc., as at least one predetermined function of the fiber loss (or loss difference) parameter value, and determines the measurement of the at least one bend or stress related FUT parameter, for example, a fiber bend or stress length. The processing unit further computes at least one bend or stress related fiber characteristics, for example, a mechanical reliability and or or an expected lifetime and or a failure rate statistics from macro-bend or stressed for the optical networks, for example, optical fiber or cable for the home (FTTH) or multi-dwelling unit (MDU) scenarios, as at least one predetermined function of the at least one bend or stress related FUT parameter, for example, macro-bend or stress radius or bend or stress strength along an optical fiber or cable path. The disclosed technology also provides methods for an instrument calibration or reference procedure of the fiber bend or stress information, for example, fiber bend or stress coefficient, for unknown fiber type by adding at least one known bend information, for example, the fiber bend or stress radius or strength, on an optical fiber or cable under test. Such a instrument calibration or reference procedure for the FUT can be used to acutely measure and characterize any fiber macro-bend or stress related bend characteristics on the FUT.

Another aspect of the disclosed technology includes an identification of fiber type along an optical FUT path from measured at least one macro-bend related information, for example, bend induced fiber loss, bend induced fiber birefringence, and others, by adding additional known macro-bend, for example, bend radius, on a FUT by using both a light input unit and a light output unit connected to the FUT at one single end.

Some commercial fibers used for access optical networks (FTTx) or multi-dwelling unit (MDU), e.g., recently developed new bend insensitive optical fiber such as the International Telecommunication Union's recommendation G.657 (Characteristics of a bending-loss insensitive single-mode optical fibre and cable for the access network) can be subject to significantly macro-bend without exhibiting any noticable bend loss, and, therefore, it would be difficult for various currently commercial available OTDR systems to measure this type of fiber bend using various existing techniques. This is in part because there is nearly no or negligible macro-bend induced loss, for example, in the optical spectrum at 1310 nm or 1550 nm, but the fiber may still be subject a macro-bending or stress or significantly macro-bending or stress from a poor fiber installation that may result a poor fiber reliability so as to short a fiber lifetime or even failure for networks. In practical fiber deployment, strongly macro-banded or stressed fiber could adversely affect the installed fiber quality and reliability, or could reduce a lifetime for the fiber. In various applications, it is desirable to measure such fiber macro-bend characteristics to estimate the fiber properties to provide an assessment on the fiber reliability or estimate on a fiber lifetime or a fiber failure statistics for a fiber network, e.g. for FTTH, FTTx, MDU, etc., and or for a quality analysis and a lifetime estimation. The disclosed technology can be used to advantageously identify a bend-caused loss and a bend characteristics and thus provides the capability beyond some existing OTDR methods.

In properly characterizing fiber macro-bands or stresses, it is important to estimate the fiber local bend or stress prosperities, e.g. bend radius, bend or stress length, bend or stress strength, etc., for a communications optical fiber cable link, e.g. using G.652 or G.657 fiber, so that it could be possible to accurately estimate an installed fiber reliability or quality or lifetime. In particular, due to r widely deployment of bend insensitive optical fiber for the optical network, for example, the FTTH access network, such bend insensitive optical fiber tends to exhibit no or negligible bend loss at the common used communication wavelengths (e.g., 1310 nm and 1550 nm). In such deployment, the deployed fiber may still be highly bended and such macro-bend may cause a problem for the fiber quality or even shorting the fiber life time. Therefore, testing and measuring the fiber bend properties can be important for current optical networks such as the FTTH access network when the bend insensitive optical fiber, for example G.657, is installed.

The disclosed technology in this document can be implemented to meet those and other needs for characterizing bend- or stress-related fiber characteristics as a function of distance along a fiber link, e.g., a link from a single-end of the FUT, that can be used for the field test and measurement for the optical networks, for example, FTTH, FTTx, MDU, etc.

For example, one test method to measure fiber bend or stress is to measure a bend induced birefringence, where the birefringence can be induced by the fiber bend or stress during the installation and is proportional to $1/R^2$, where R is the bend radius, so that it is possible to determine bend properties. Highly bent fiber would reduce the fiber lifetime or even to cause a fiber broken. This issue is particularly problematic for the highly bent installed optical fiber at home for the FTTH application. Thus, it is desirable to be able to obtain the local bend or stress characteristics or it is best to find local bend or stress properties at each fiber distances, for example, bend radius, bend or stress length, bend or stress strength, etc., along the optical fiber or cable.

Depending on the application, it is often desirable to measure the bend or stress induced fiber loss at specified wavelengths for an estimation of bend- or stress-related properties at a given distance. However, in many practical cases, it is not possible to measure the fiber loss at a given precision position by commercial available OTDR. This is because there may be no or negligible loss for the bend insensitive fiber, for example, for wavelengths at 1310 nm and 1550 nm, or due to a poor spatial resolution from an OTDR, for example a commercial OTDR has a limited spatial resolution of as large as 50 cm for designed wavelengths but a typically bend or stress length may be of a few mm to few cm, and hence it is not possible to obtain a reliable determination of the bend properties. The fiber loss or attenuation is varied as a function of the wavelength and the macro-bend loss should be higher at the longer wavelength. Hence, measurements at different wavelengths provide useful information.

It should also be noted distributed PMD can be measured by the fixed analyzer or equivalently wavelength scanning method which tends to take long measurement times and suffer reliability problem of fiber polarization fluctuation during the testing. An early successful commercial test and measurement instrument (FTB-5600, EXFO Inc.) for the field distributed PMD measurement was using random-scrambling technique, where many uncorrelated measurements are performed for many "closely-spaced optical frequency pairs" over a large wavelength to estimate a distributed cumulative PMD along the fiber so as to significantly reduce the measurement sensitivity to moving of the test fiber. However, it can be difficult for such a measurement technique to provide distributed bend or stress or bend or stress induced birefringence information, and as well such method is limited to have a long spatial resolution of greater than 5 m.

The disclosed technology can be used for, in some implementations, characterizing high spatial resolved wavelength-dependent loss and or bend- or stress-dependent characteristics as a function of distance along a fiber link from a single-end of the FUT that could also distinguish fiber type between a traditional optical fiber, e.g. a SMF-28, a bend insensitive optical fiber, etc.

The disclosed technology can be implemented in ways that can eliminate, or at least mitigate, the disadvantages or limitations discussed above. The disclosed methods or devices can be used to provide more effective or alternative fiber characterization.

In one aspect of the disclosed technology, there is provided a method of estimating at least one bend- or stress-related characteristics of an optical path by measuring wavelength-dependent-losses at at least two different wavelengths using light input means and light output means connected to the optical path at adjacent end, the light input means comprising light source means for supplying at least partially coherent light and light incident means for injecting said light into the FUT, and output light means comprising means for extracting corresponding light from the FUT, detection means for detecting the output power of extracted light corresponding to the at least two wavelengths to provide transmitted optical power difference at each distance of an optical path in each pair of distances, wherein the short-distance ($z_S$) and long-distance ($z_L$) said distances in each said group of distances being closely-spaced and analyzing means for analyzing said each optical power differences at each distances of an optical path in said each distance pair for each said at least two different wavelengths; and wherein the source, detection and analyzing means are at the same end of the FUT and the light source comprises either temporal pulses (or tunable CW narrow linewidth coherent lights); and wherein the said optical power difference parameter for said each at least two different wavelengths is different between the respective said at least two wavelengths, the method including the steps of:

i. Computing an optical power difference in a measured power parameter corresponding to each distance in said each pair of distances for each of the said at least two wavelengths at least one wavelength is a long wavelength, for example beyond 1600 nm, said measured power parameter being proportional to the power of the said analyzed and subsequently detected light, and wherein the said optical power difference is a fiber loss or fiber attenuation;

ii. Computing at least one different optical power difference (loss) between said at least two different wavelengths as a function of fiber distance, and distinguishing the macro-bend induced fiber loss from other losses;

iii. Calculating the value of bend- or stress-related FUT characteristic, for example bend radius, bend or stress strength, as at least one predetermined function of a said fiber loss or attenuation value at at least one corresponding optical wavelength at a longer wavelength or a fiber bend loss or attenuation difference between two different wavelengths, said predetermined function being dependent upon the small fiber distance or length difference between the distances corresponding to the closely-spaced fiber positions or locations;

iv. Computing the bend or stress parameter may also include a bend or stress length that is measured from the said different optical power difference (loss) according to the bend induced wavelength-dependent loss parameter at the at least one wavelength, from the longest wavelength, from the measured fiber loss or attenuation parameter, for example by using a high spatial resolved OTDR; and v. Computing and outputting the value of the at least one bend or stress related fiber characteristic, for example, a mechanical reliability or an expect lifetime or a failure rate statistics for bended or stressed fiber to the home (FTTH) or multi-dwelling unit (MDU) scenarios, as at least one predetermined function of the one bend- or stress-related FUT characteristic along an optical fiber path.

In implementations, for measurements of wavelength-dependent fiber loss at a specified distance z for each said group comprises distance pairs having substantially said prescribed central distance, and the said bend-related FUT characteristic is computed from a wavelength dependent loss value, $\Delta L_{\lambda_j-dB}(z,\lambda)$ at the at least one wavelength that may be measured at L or UL band of the telecommunication bands or even beyond, i.e. longer than L or U band wavelength or even greater than 1675 nm, for a bend distance $\Delta z$.

The bend parameter may be computed by the bend or stress induced loss $\Delta L_{\lambda_j-dB}(z,\lambda)$ at a given wavelength for a bend distance $\Delta z$. The bend or stress parameter may be a bend radius or bend or stress strength that is computed from the bend or stress induced wavelength-dependent loss parameter, $\Delta L_{\lambda_j-dB}(z,\lambda)$, at a given wavelength, $\lambda$, from a long wavelength, and the predetermined function according to the following formula, $$R(z) = R_{th} - \frac{\Delta L_{\lambda_j-dB}(z, \lambda)}{\eta(\lambda) \cdot \Delta z}$$

where the R(z) is the bend radius, the $R_{th}$ is defined as a "threshold" bend radius where for this "threshold" bend radius there is no any or negligible bend or stress induced attenuation or loss on the optical fiber, and the $\eta(\lambda)$ is the fiber type related bend or stress coefficient or simple as a fitting coefficient. Note that $R_{th}$ and $\eta(\lambda)$ could either from theoretical numerical simulations or from experimental calibrations, for example for a given optical fiber the $R_{th}$ and $\eta(\lambda)$ can be obtained from at least two bend induced loss measurements for two different bend radius. The $\Delta L_{\lambda_j-dB}(z,\lambda)$ is a bend or stress induced loss without any non bend- or stress-related losses and depends on the optical wavelength, $\lambda$, and fiber properties, e.g. fiber cladding radius, refraction index, etc., $\Delta z$ is the bend distance or a portion of bend or stress length.

The bend radius or bend or stress strength may be computed from the bend induced loss parameter, $\Delta L_{\lambda_j-dB}(z,\lambda)$, from the longest wavelength according to the predetermined function.

The bend radius or bend or stress strength may be computed from the bend induced loss parameters, $\Delta L_{\lambda_j-dB}(z,\lambda)$, from at least one or advantageously more wavelengths according to the predetermined function so that an improved instrument performance may be achieved.

The measurement can be performed by a high resolution OTDR, for example using a very short light pulse and a wide bandwidth detection OTDR, or photon-counting OTDR, or tunable CW narrow linewidth coherent lights based optical frequency domain reflectometer (OFDR).

In implementations, for measurement of at least one bend or stress related fiber characteristics, for example, a mechanical reliability or an expect lifetime or a failure rate statistics for bending of fiber, is calculated as one predetermined function of the at least one bend or stress related FUT characteristics along an optical fiber path.

The bend radius or bend or stress strength may also be computed from the bend or stress induced loss parameter, $\Delta L_{\lambda_j-dB}(z,\lambda)$, from only one wavelength loss measurement according to the predetermined function assuming the loss parameter measured from the said one wavelength may be bend or stress induced fiber loss or attenuation or may mainly or major come from the fiber macro-bend or stress. Accordingly, a low-cost simple instrument can be realized by only using one wavelength laser to measure the bend or stress induced loss and such wavelength could be at any wavelength within telecom bands but advantageously in some implementations the wavelength can be a long wavelength, for example >1625 nm or even >1675 nm OFDR or OTDR instrument. Indeed it could be a test and measurement situation if the loss induced from bend or stress could be identified without using the second wavelength loss information, for example it is known there is no any other loss except for the bend or stress induced loss.

In implementations, measurements based on one optical wavelength or at least two optical wavelengths may be used. For example, in one implementation of measurements using two wavelengths, the measurements at the first wavelength can be used to obtain the main measurements for the loss measurement according to the predetermined function while the measured loss parameter from the second wavelength may be mainly used to identify the loss type, for example bend or stress induced fiber loss or attenuation although two wavelength fiber loss or attenuation information could improve the measurement reliability so as to improve the instrument performance.

The bend or stress induced fiber loss or attenuation could be extracted from a fiber total loss subtracting the non-bend or non-stress related loss and such non-bend or non-stress related loss could be obtained from any means, for example a reference measurement for the FUT without any bend or stress, or a fiber loss from a location that is close to the bend or stress position or even far away from the bend or stress location as long as a relationship between the measured fiber loss and the non-bend or non-stress loss may be known. The bend or stress induced loss parameter(s), $\Delta L_{\lambda_j-dB}(z,\lambda)$, from the said wavelength(s) is the measured total loss to subtract these non-bend or non-stress related loss(es).

The bend or stress induced fiber loss or attenuation parameter for the predetermined function to compute the bend or stress parameter, for example, the bend radius or bend or stress strength, could be partially bend or stress induced fiber loss or attenuation from the given bend or stress distance, $\Delta z$, for example $\Delta z$ is the difference between the short-distance ($z_S$) and long-distance ($z_L$), i.e. $\Delta z = |z_L - z_S|$.

It should be noted that a bend radius may not be a radius and may be any bend or stress related strength parameter.

The disclosed technology can be implemented to provide a method to obtain the $R_{th}$ and $\eta(\lambda)$ coefficients either from theoretical numerical simulations or from experimental testing, for example for a given optical fiber the $R_{th}$ and $\eta(\lambda)$ can be obtained from at least two bend induced loss measurements from at least one wavelength for at least two different bend radius and then the $R_{th}$ and $\eta(\lambda)$ could be extracted according to the said formula $$R(z) = R_{th} - \frac{\Delta L_{\lambda_j-dB}(z,\lambda)}{\eta(\lambda) \cdot \Delta z};$$

or the $R_{th}$ and $\eta(\lambda)$ can be obtained from at least two bend induced loss measurements for two different wavelengths for at least one bend radius and then the $R_{th}$ and $\eta(\lambda)$ could be extracted according to the said formula $$R(z) = R_{th} - \frac{\Delta L_{\lambda_j-dB}(z,\lambda)}{\eta(\lambda) \cdot \Delta z}.$$

A second aspect of the method is to provide an identification of fiber type along an optical FUT path from measured at least one macro-bend or stress related information, for example bend induced wavelength-dependent fiber loss, and or bend induced fiber birefringence, etc., by adding additional known macro-bend, for example a bend radius, on a FUT by using both a light input unit and a light output unit connected to the FUT at one single end.

In a third aspect of the disclosed technology, a measurement instrumentation is provided for measuring at least one wavelength-dependent-loss bend- or stress-related characteristics of an optical path to include input light means and output light means connected to the optical path at adjacent end, the light input means comprising light source means for supplying at least partially coherent light and light incident means for injecting said light into the FUT, and output light means comprising means for extracting corresponding light from the FUT, detection means for detecting the output power of extracted light corresponding to the at least two wavelengths to provide transmitted optical power difference at each distance of an optical path in each distance pair, analyzing means for analyzing said each optical power difference at each distance of an optical path in said each distance pair for each said at least two different wavelengths, and processing means for processing the electrical signals from the output light means to determine said at least one wavelength-dependent-loss bend- or stress-related characteristic. The processing means performs the following processing:

i. Computing an optical power difference in a measured power parameter corresponding to each distance in said each pair of distances for each of the said at least two wavelengths at least one wavelength is a long wavelength, for example beyond 1600 nm, said measured power parameter being proportional to the power of the said analyzed and subsequently detected light, and wherein the said optical power difference is a fiber loss or fiber attenuation;

ii. Computing at least one different optical power difference (loss) between said at least two different wavelengths as a function of fiber distance, and distinguishing the macro-bend induced fiber loss from other losses;

iii. Calculating the value of bend- or stress-related FUT characteristic, for example bend radius, bend or stress strength, as at least one predetermined function of a said fiber loss or attenuation value at at least one corresponding optical wavelength at a longer wavelength or a fiber bend loss or attenuation difference between two different wavelengths, said predetermined function being dependent upon the said small fiber distance or length difference between the distances corresponding to the said closely-spaced fiber positions or locations;

iv. Computing the said bend or stress parameter may also include a bend or stress length that is measured from the said different optical power difference (loss) according to the said bend induced wavelength-dependent loss parameter at said at least one wavelength, e.g., from the longest wavelength, from the said measured fiber loss or attenuation parameter, for example by using a high spatial resolved OTDR; and v. Computing and outputting the value of said at least one bend (macro-bend) or stress related fiber characteristics, for example, a mechanical reliability and or an expect lifetime and or a failure rate statistics for bended or stressed fiber of fiber to the home (FTTH) or multi-dwelling unit (MDU) scenarios, as at least one predetermined function of said one bend-related FUT characteristic along an optical fiber path.

The measurement instrumentation also provides a method to obtain the said $R_{th}$ and $\eta(\lambda)$ coefficients either from experimental testing, for example for a given optical fiber the $R_{th}$ and $\eta(\lambda)$ can be obtained from at least two bend induced loss measurements from at least one wavelength for at least two different bend radius and then the $R_{th}$ and $\eta(\lambda)$ could be extracted according to the said formula $$R(z) = R_{th} - \frac{\Delta L_{\lambda_j-dB}(z,\lambda)}{\eta(\lambda) \cdot \Delta z};$$

or the $R_{th}$ and $\eta(\lambda)$ can be obtained from at least two bend induced loss measurements for two different wavelengths for at least one bend radius and then the $R_{th}$ and $\eta(\lambda)$ could be extracted according to the formula below:

$$R(z) = R_{th} - \frac{\Delta L_{\lambda_j-dB}(z,\lambda)}{\eta(\lambda) \cdot \Delta z}.$$

FIGS. 11-14 show examples of a high spatial resolution OTDR devices or systems based on the disclosed technology, which can be advantageously used for various measurements including, e.g., single-ended measurements of the optical fiber bend or stress for the FTTx test, measurement and monitoring applications.

The examples include, among other components, (i) an optical source controller, (ii) an analyzer and detection unit, (iii) an analogue and digital signal processing unit, together with one single control unit, where all of the components of the measuring instrument are at the single (same) end of the FUT. Different examples may be implemented with various differences in configurations according to the different fiber bend measurement methods such as a fiber long wavelength loss measurement based fiber bend determination method. For example to select a wavelength in L or U bands or even >1675 nm that can have a measurable fiber loss that is induced from a fiber macro-bend while probably there may be now any or have negligible loss at telecomm wavelengths, for example at 1310 nm, 1490 nm and 1550 nm.

For the multi-wavelength high spatial-resolved optical time domain reflectometer (OTDR) as illustrated in an embodiment of FIG. 1 includes different pulsed light sources at different wavelengths, e.g. 22-B1, 22-B2, . . . 22-BN. Each light source may be a laser such as a DFB laser, a Fabry-Perot diode laser or other laser to enable selecting different central wavelength lasers for the OTDR acquisition, for example, 1550 nm, 1675 nm, or a wavelength longer than 1700 nm. A power splitter means or device 29 such as an optical coupler is provided to combine light of different wavelengths to the FUT 100. An optical circulator or coupler 32 is provided as a backreflection extractor between the optical splitter or coupler device 29 and the FUT 100 to direct the back reflection of the light from the FUT 100 to an optical detector 62A. A signal condition circuit (e.g., sampling and averaging unit) 92 is coupled to receive the optical detector output from the optical detector 62A, a data processor means or unit 94 is to receive the output from the sampling and averaging unit 92 and a display is coupled to the data processor 94 to display information to a user. Those components are controlled by a control unit 90. The sampling and averaging unit 92 performs signal sampling and averaging that is synchronized with the light pulsed source 22-B1, or 22B2, . . . , or 22-BN via control 90. The light pulsed source 22-B1, . . . 22-BN is launched into a fiber-under-test (FUT) 100 from a connector 40, which also receives corresponding backreflected light from the FUT 100 that are caused by Rayleigh scattering and, in some cases, discrete (Fresnel) reflections via the connector 40 in the reverse direction.

In addition to controlling the sampling in unit 92, the control unit 90 controls or selects the wavelength of the laser sources 22-B1, . . . 22-BN. More specifically, for each setting k of the laser central wavelengths, the control unit 90 causes the backreflected power to be measured at at least one pair of distances and $z_S^{(k)}$ and $z_L^{(k)}$, respectively, that are closely-spaced relative to each other. The center distance of the distance pair is defined as the average of two actual distances, i.e., $z_C = (z_S^{(k)} + z_L^{(k)})/2$. The labels S and L refer to "short" and "long" with respect to the center distance $z_C$. A power difference in one pair of distances is a fiber loss (i.e. attenuation). The same computation may be performed for different OTDR trace at at least another one wavelength. A loss difference is then known at at least two different wavelengths, for example between 1550 nm and 1650 nm or 1675 nm (a wavelength beyond 1675 nm).

Other different embodiments as shown in FIGS. 2 and 3 are also possible, where in FIG. 2 a multi-wavelength pulsed laser source 22-B, for example from a widely tunable laser, could be used to select different wavelengths for the OTDR acquisition, while in FIG. 3 a multi-wavelength high spatial-resolved photon-counting OTDR would be used for achieving a high spatial resolution where a counter 92A is used.

Due to the single-mode fiber has different mode field diameter (MDF) for different wavelengths and a mode field diameter increases via wavelength increases, for example a MFD at 1550 nm is bigger that of 1310 nm and a MFD at 1650 nm is bigger than that of at 1550 nm and 1310 nm and also a macro-bend loss is proportional to 1/MFD, and then there is a difference for the bend induced losses between different wavelengths, i.e. loss at a longer is higher than that of at short wavelength. Generally the other loss, e.g. splice loss, connection loss, has less sensitive to the wavelength, thus the bend induced loss can distinguished from other losses after its loss can be measured at at least at two different wavelengths, e.g. at 1550 nm and 1650 nm or 1625 nm and 1675 nm, etc. Such losses can be measured by an OTDR as embodiments of FIGS. 1 and 2, photon-counting OTDR as embodiment of FIG. 3, or OFDR as shown in embodiment FIG. 14, etc.

After knowing the loss that is induced from macro-bending or stressing, a bend radius or a bend or stress strength can be estimated (see below section) and a bend or stress length may also be measured from an OTDR trace, in particular from a high spatial resolved OTDR or OFDR trace.

In some implementations, for an OTDR or OFDR design at least a one laser wavelength may be designed in the bend sensitive wavelength, e.g. a wavelength longer that 1625 nm or even beyond 1700 nm with properly photodetector. Such OTDR or OFDR design can have a sensitive detection for the bend induced loss although there may be no or negligible bend induced loss at a short wavelength, for example <1600 nm, so as to estimate the bend radius, or bend length, etc. This is particular important for testing the new developed and installed bend insensitive optical fiber which may have a negligible losses at short communication wavelengths at 1310 nm, 1490 nm and 1550 nm from fiber macro-bend, but it may be possible to have some measurable bend loss if its loss is measured at a long wavelength, e.g. beyond 1600 nm in the L band or UL band, or even >1650 nm or 1700 nm and such wavelength laser (e.g. DFB) and photodetector are commercially available.

For optical fiber loss (attenuation) based fiber macro-bend determination method in a long wavelength, e.g. >in the C, or L, or U bands, or >1675-1725 nm, the input light controller will comprise a such light source, for example a narrow linewidth or moderately broadband light source either pulses or CW lights, that is injected into the FUT. The input light source is narrow or moderately broadband, or tunable, either a pulsed for the OTDR based embodiments or a CW tunable narrow linewidth laser source for the OFDR based embodiments. Thus, for a fiber loss based fiber bend estimation method the input light controller will comprise at least two lasers with two different wavelengths, in which at least one wavelength laser can have a measurable macro-bend induced fiber loss or attenuation. In some implementations, a long wavelength laser, e.g. DFB at wavelength ≥1650 nm, could be used for the bend induced loss measurement. Indeed this is particularly important for the bend characteristics estimation for the bend insensitive optical fibers. The laser can be any laser source that are injected into the FUT 100. The analyzer and detection unit may comprise an photodetector, e.g. APD. The analogue and digital signal processing unit may comprise a control, a data acquisition unit, a sampling and averaging unit and a data processor unit, analog-to-digital conversion being carried out in the sampling and averaging unit.

For the single-end fiber bend or stress measurement method a distributed fiber loss (i.e. attenuation) can be extracted by analyzing backreflected light power from Rayleigh backscattering so that the fiber bend characteristic can be extracted and predicated. For the fiber loss based fiber bend measurement method it is important to resolve the wavelength dependent fiber loss (attenuation) difference the fiber loss measurement may be performed at the bend loss sensitive wavelengths, for example in L or U band or beyond 1675 nm. To use the single-end measurement method to measure distributed fiber bend properties, however, OFDR or OTDR traces as a function of fiber length must be analyzed, a widely tunable narrow linewidth laser (CW) may be used for the OFDR to obtain high spatial-resolved OFDR traces, for example having a tunable range 0.01 nm to 100 nm and a linewidth of 100 Hz to 1000 GHz, or to use a short OTDR pulse for the OTDR, for example 0.01 ns to 1000 ns, in order to obtain OTDR traces with a high spatial resolution.

Examples of the main the fiber bend measurement methods and instrument configurations for single-end distributed fiber bend measurement, and modifications, alternatives and substitutions thereto, will now be described with reference to FIGS. 11 to 14.

Examples of the fiber macro-bend measurement methods can use a wavelength resolved fiber loss or attenuation to estimate or predict the fiber bend radius or bend strength. In particularly losses at at least two different wavelengths are measured where there is a measurable loss at at least one wavelength.

In the designed embodiments a macro-bend or stress can be known and distinguished from other OTDR or OFDR events, e.g. losses from connection, broken, etc., after the loss measurement is performed at at least two different wavelengths, i.e. to use a wavelength resolved fiber loss or attenuation measurement where any fiber loss difference can be used to distinguish the bend loss from other losses, and a fiber loss or attenuation at a longer wavelength can be used for estimation or prediction of the fiber bend characteristics, such as radius or bend strength, etc. Advantageously it should be appreciated that such wavelength-dependent-loss based fiber bend analysis can be applied to use a long wavelength loss, e.g. at >1625 nm or even beyond 1675 nm, etc, to calculate the fiber bend radius or bend strength, in which a loss measurement in other wavelengths, e.g. at 1310 nm, 1550 nm, is negligible. Indeed it is true for the bend insensitive optical fiber that have nearly 'zero' attenuation from a related small bend radius at 1310 nm or 1550 nm but it could have some measurable bend induced loss at wavelength 1650 nm.

From an estimation of the fiber bend properties, the bend strength, bend radius, bend length, fiber reliability/quality and or fiber lifetime can be predicated as a function of the distance z along the FUT 100.

It will be appreciated that the usual conversions will be applied to convert time delay to distance according to refractive index of the FUT 100.

After knowing a loss from a fiber bend, for example at a long wavelength, it should be appreciated to be understood that a fiber bend characteristics, e.g. bend radius, bend strength, etc., can be estimated or computed by assuming to know the bend loss at a test wavelength and a fiber type, e.g. G.652 or G.657, etc. A bend length can be further estimated from a measured high spatial resolution OTDR or OFDR trace, for example to find a bend begin location, or a bend region, or bend length, etc. . . . . Indeed such bend measurement requires a high spatial resolution reflectometry, for example to use a very short OTDR pulse with a wide electronic bandwidth as illustrated in FIGS. 1 and 2, or a high spatial-resolved optical frequency domain reflectometer (OFDR) as illustrated in FIG. 4, or a photon-counting OTDR as illustrated in FIG. 3, etc.

Figure 14:
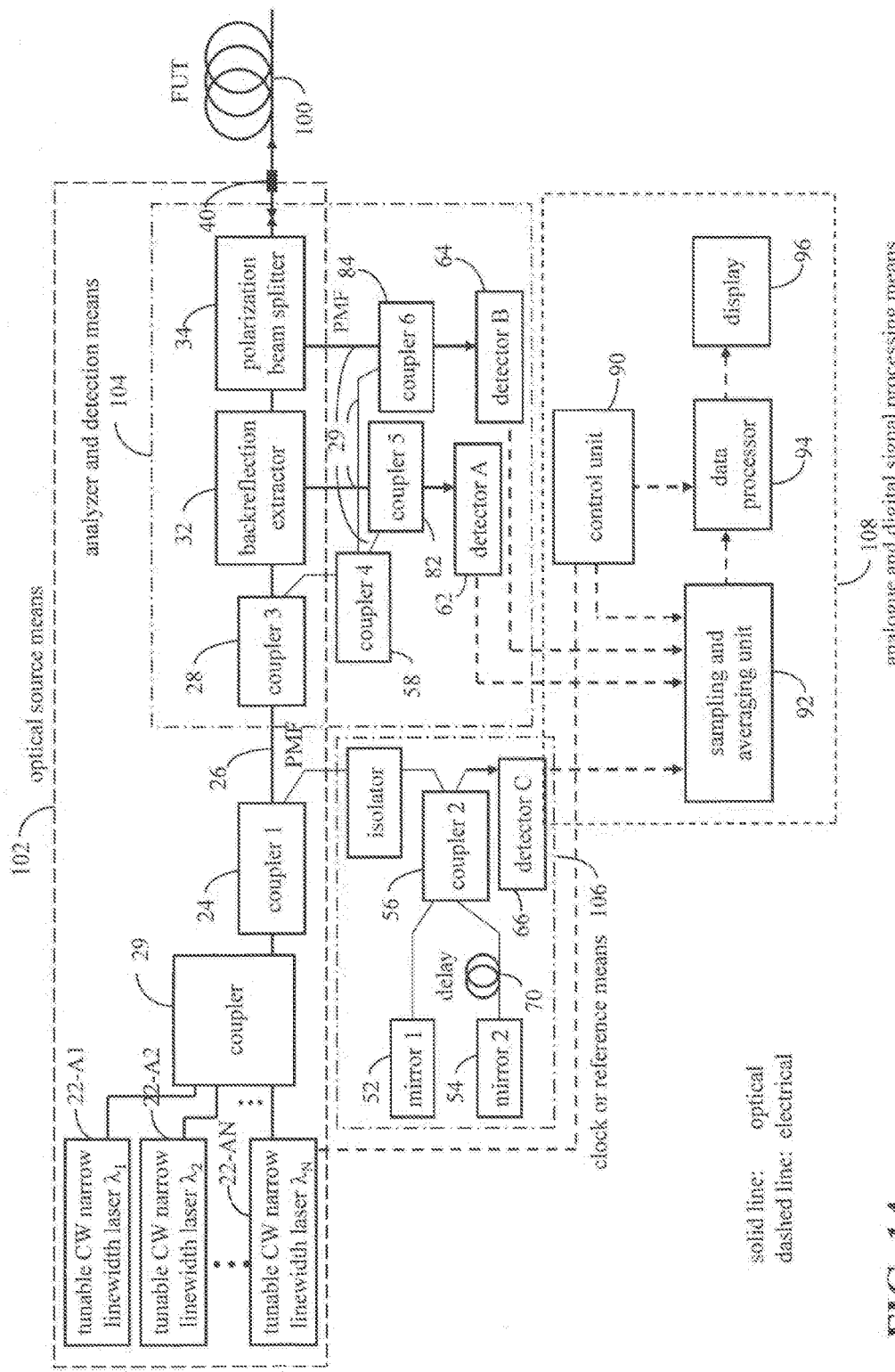
FIG. 14 is an example of a high spatial resolution multi-wavelength OFDR embodying an aspect of the disclosed technology.

The high spatial-resolved optical frequency domain reflectometer (OFDR) illustrated in FIG. 14 comprises highly coherent tunable CW narrow light sources 22-B1, 22-B2, . . . and 22-BN and each light source has a very narrow linewidth, e.g. to have a coherent length of tens to thousands meters, and can also select different central wavelengths, for example 1550 nm, 1675 nm, or >1700 nm etc., power splitter means 24 (coupler 1), sampling and averaging unit 92 and data processor means 94, all controlled by a control unit 90, and detection means comprising first and second detectors A and B, 62 and 64, respectively, and a clock means 106 consisting of a fiber based Michelson interferometer having a light beam splitter and combiner 56 (coupler 2), a delay 70, reflectors means of mirrors 52 and 54 and a detection means detector C 66. Each tunable CW narrow light source (22-B1, 22-B2, . . . , or 22-BN) is coupled to a polarization maintaining fiber (PMF) 26 for producing light source for launching into a fiber-under-test (FUT) 100 from connector 40, which also receives corresponding backreflected light from the FUT 100 via a connector 40.

The input light controller means 102 and analyzer and detection means 104 comprise a backreflected light extractor, specifically a polarization-maintaining circulator 32 in FIG. 4 or polarization-maintaining coupler, a polarization beam splitter (PBS) 34. The circulator 32 is coupled to the input of PBS 34 by a second PM fiber (polarization-maintaining fiber) so that the optical path from each tunable CW narrow light source (22-B1, 22-B2, . . . , or 22-BN) to the PBS 34 is polarization-maintaining. A single-mode fiber may be used to couple the PBS 34 to the I/O-SOP controller 36.

The alignment of PMF 26 is fixed in the factory in such a manner that substantially all of the optical power from each tunable CW narrow light source (22-B1, 22-B2, . . . , or 22-BN) is maintained in one of the two axes of the fiber 29 and conventionally at the "slow" axis. Since the circulator 32 is polarization-maintaining, this alignment is maintained until the point between PBS 32. During attachment of each end of the PMFs to the components concerned, the azimuthal orientation of the PMF is adjusted to ensure maximum transmission of the optical lights towards the FUT 100.

Backreflected light caused by Rayleigh scattering and, in some cases, discrete (Fresnel) reflections, from the FUT 100 enters the instrument via the connection port 40 in the reverse direction.

In addition to controlling the sampling in unit 92, the control unit 90 controls or selects the wavelength of the different laser wavelengths from laser sources 22-B1, 22-B2, . . . , and 22-BN. More specifically, for each setting k of the laser central wavelengths, the control unit 90 causes the backreflected power to be measured at at least one pair of distances $z_S^{(k)}$ and $z_L^{(k)}$, respectively, that are closely-spaced relative to each other. The center distance of the distance pair is defined as the average of two actual distances, i.e., $z_C = (z_S^{(k)} + z_L^{(k)})/2$. The labels S and L refer to "short" and "long" with respect to the center distance $z_C$. A power difference in one pair of distances is a fiber loss (i.e. attenuation). The same computation may be performed for different OTDR or OFDR traces at at least another one wavelength. A loss difference is then known at at least two different wavelengths, for example between 1550 nm and 1650 nm or 1675 nm (a wavelength beyond 1675 nm).

It should be appreciated for the embodiments with the OFDR as in FIG. 4 that measure the beating signals between the local oscillation light, e.g. from the beam splitter 28 (coupler 3), and the reflected light signals from the FUT 100 in the time domain and then the measured signals are transferred into the frequency by A fast Fourier transform (FFT), the first step of the data processing is to perform the FFT for the acquired data from the detector A and B, 62A and 64A, respectively, and then it may require a calibration or reference procedure to obtain an OFDR trace that is a function of the distance. However, if for the OTDR this described procedure is not required, i.e. directly to obtain the OTDR curve as a function of the time and then of the distance of the test fiber (FUT) after considering the light speed at the given FUT, i.e. ROI. For the OFDR in order to remove or reduce the laser frequency sweeping nonlinearity, there may be a clock or reference means 106 that consists of a fiber based Michelson interferometer with a delay 1 70, Faraday rotation mirrors 52 and 54, and detector C 66. The clock or reference means may provide signals from the interferometer for sampling the measurement signals by sampling and averaging unit 92 or alternatively providing signal for re-sampling of the measurement signals from the FUT 100 as illustrated in FIG. 14.

It should be appreciated that, where the group may comprise more than one closely-spaced pair of distances, the center distance as defined above in fact differs for each pair in the group.

Figure 11:
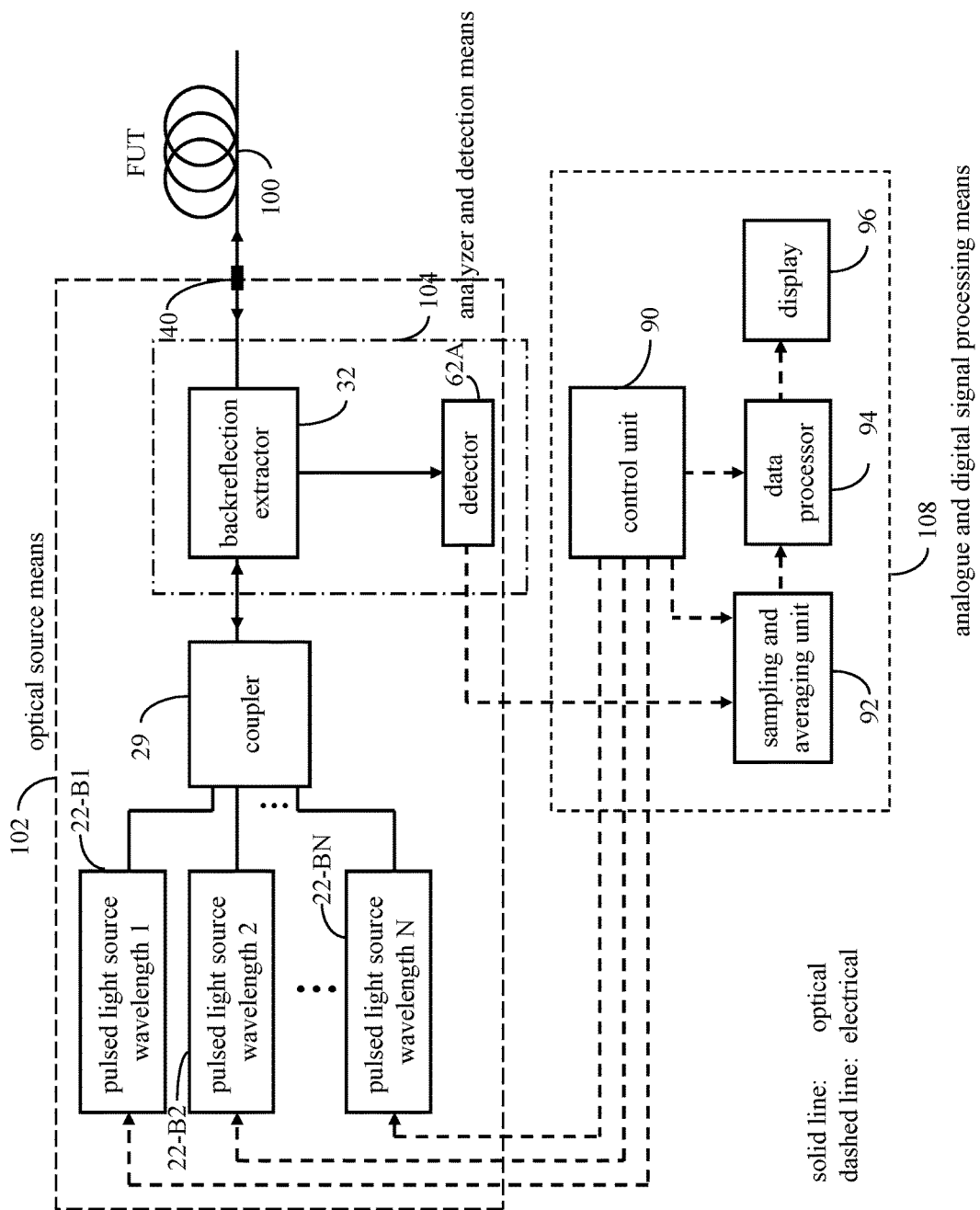
FIG. 11 is an example of a schematic diagram of a high spatial resolution multi-wavelength OTDR embodying an aspect of the disclosed technology.
Figure 12:
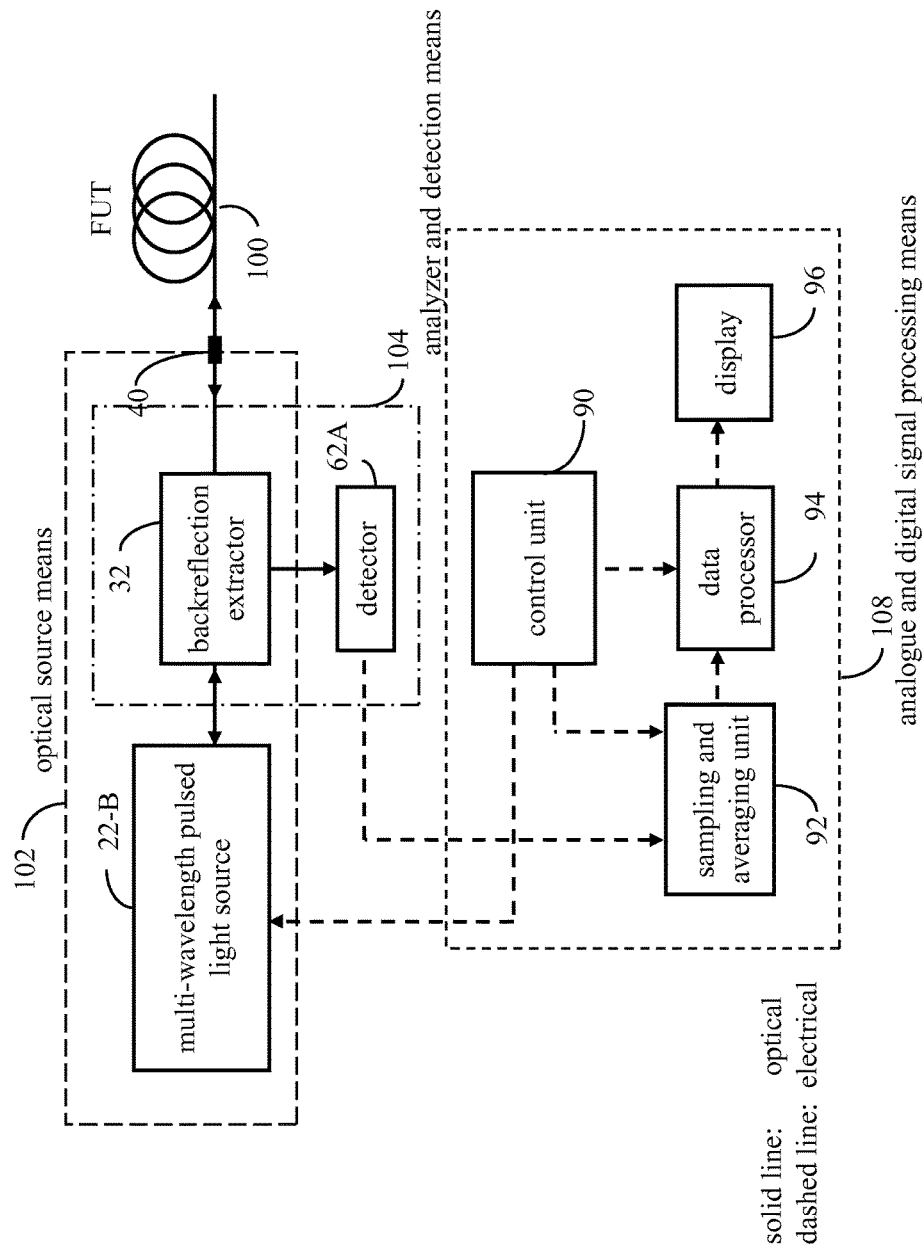
FIG. 12 is an example of a high spatial resolution multi-wavelength OTDR embodying an aspect of the disclosed technology.
Figure 13:
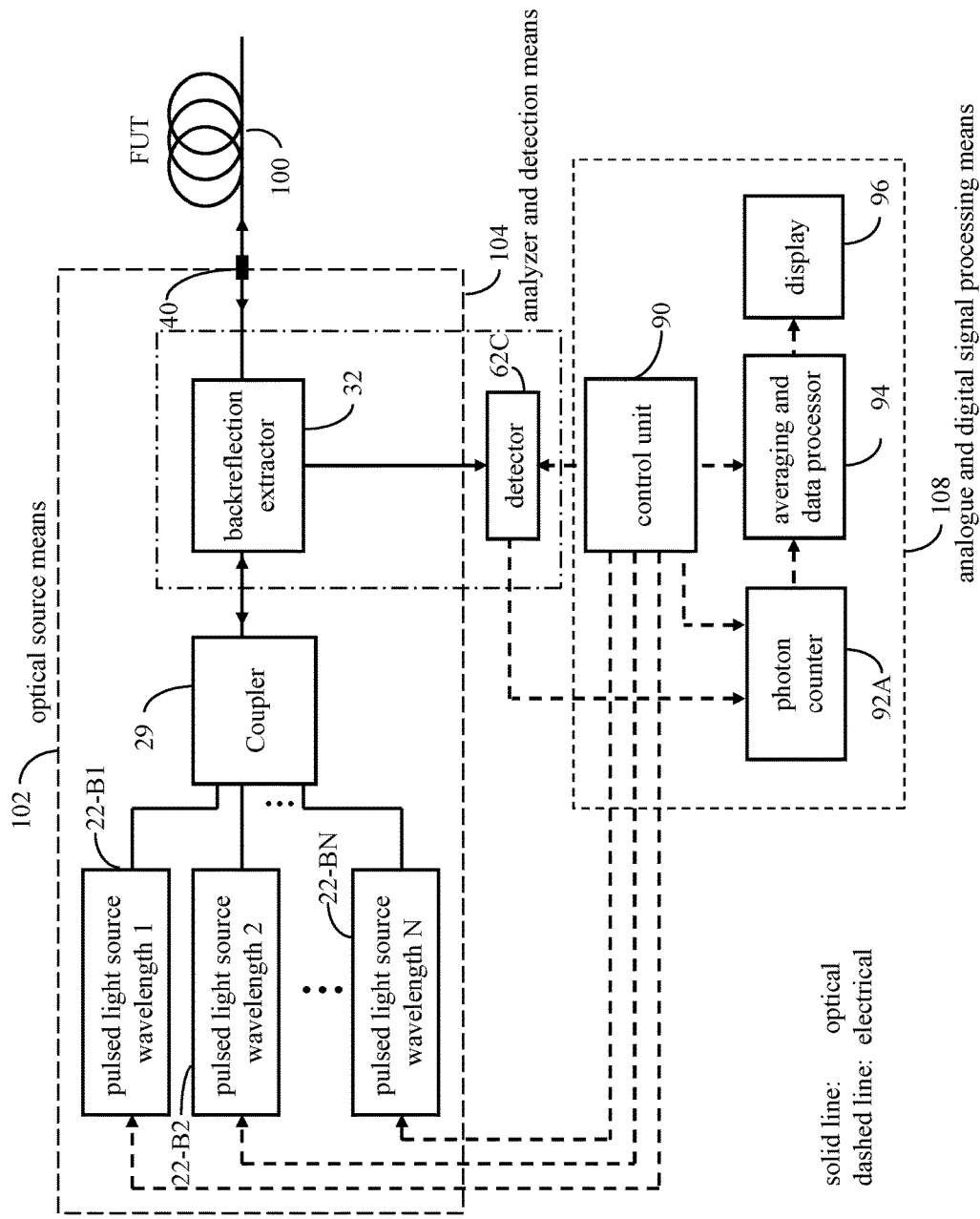
FIG. 13 is an example of a high spatial resolution multi-wavelength photon counting OTDR embodying an aspect of the disclosed technology.

Different from the high spatial-resolved optical time domain reflectometer (OTDR) as illustrated in FIGS. 1, 11, 12 and 13, the OTDR in FIG. 14 includes two optical detectors 62 and 64 to receive optical signals from the backreflection extractor 32 and a polarization beam splitter 34, respectively. The OTDRs as illustrated in FIGS. 11, 12 and 13 may use a narrow light pulse width for each of the pulsed light sources at different wavelengths, for example 0.1 ns to 100 ns and a high detection bandwidth for the detector 62A or 62C, and a high sampling rate for the ADC. In FIG. 14, tunable CW narrow linewidth lasers 22-A1, 22-A2, ..., and 22-AN at different laser wavelengths are used to output laser into to the optical coupler 29. In implementations, the relative low sampling rate ADC may be used if the time shifting sampling technique, for example for the 1 ns OTDR light pulse the ADC may have a sampling rate of 100 MSPS (under sampling) with an operation of 10 time shifting with a step of 1 ns, may be applied in the embodiments for the sake of the low-cost instrument design. In FIGS. 11, 12, 13 and 14, analogue and digital signal processing block 108 includes control unit 90, sampling and averaging unit 92, data processor 94 and a display 96 that displays the outputs from the data processor 94.

Before the operation of the multi-wavelength OTDR or OFDR based wavelength-dependent-loss measurement for the bend analysis is described in more detail, and with a view to facilitating an understanding of such operation.

Various other modifications to the above-described embodiments may be made. For instance, the tunable laser sources 22-A1, 22-A2, ..., and 22-AN in FIG. 14 could be replaced by some other means, for example, widely tunable lasers, discrete wavelength lasers, etc.

Measurements can be performed to one pair of fiber distances or additional distances. In some implementations, it may be advantageous to acquire an entire OFDR or OTDR trace for the FUT 100 with sufficiently spatial and sampling resolutions, and then to select the different distance steps for the signal (data) processing regarding to the bend radius, bend length, and other parameters.

The following describes one example of a method of operation of the OTDR based wavelength-dependent-loss measurement for the distributed measurement of fiber bend or stress prosperities as a function of FUT length.

The user first causes the system to initialize the OTDR, specifically initializing the pulsed light source 22-B in FIG. 12 or pulsed sources 22-B1, 22-B2, ..., and 22-BN in FIG. 13, the OTDR detection and processing section, acquisition for the N (N≥2) high spatial-resolved OTDR traces at N different wavelengths where at least one wavelength OTDR trace would be sensitive to the bend induced fiber loss or attenuation. In particular such wavelength is set at a long wavelength region, for example from 1600 nm or beyond 1675 nm. It should be appreciated to be understood that the longer wavelength is, the more sensitive it is to the fiber bend induced loss so as to obtain a more sensitive bend measurement. Otherwise, if there is no any bend induced loss at any wavelength, it is impossible to characterize the bend properties, such as bend radius, bend strength, bend length, etc. For most commercial OTDR, an InGaAs APD may be used. However, advantageously a Ge photodetector may be used and it is more sensitive to detect the light beyond 1650 nm. Other laser and detector may also be possible to be used, for example to use a laser wavelength >1700 nm pulsed DFB and a relevant photodetector that can detect the light beyond wavelength 1700 nm. Indeed such laser and photodetector are commercially available.

The instrument then calculates the fiber loss or attenuation at the same fiber location for different wavelengths, where at least one loss must be extracted from one wavelength, and then further compute their differences or at least one such said difference. If there may be a loss difference between any two OTDR measurements, then a bend on the FUT may be determined and any loss from any wavelength can be used to estimate the bend properties, but a higher loss at a longer wavelength may be used to determine these macro-bend characteristics. If there is only one measured loss at a longest or longer wavelength but there is no any other losses at other wavelengths, one could also determine a bend characteristics of the test fiber.

The instrument will further perform a computation of the fiber bend radius or strength according to the measured fiber loss or attenuation and the fiber wavelength dependent bend coefficient, for example by using a factory calibrated wavelength dependent bend coefficient for a known fiber type. Note it is an advantage to have more than one measured fiber losses so as to have an accurately bend characterization.

Therefore the bend radius or bend strength as well a bend length will be estimated, respectively.

The last step will compute fiber bend characteristics as a function of distance (z) along the FUT, for example fiber quality, fiber reliability, lifetime and failure statistics.

It should be appreciated to be understood that above steps might also be used for the photon counting OTDR operation after an OTDR trace is acquired.

It should also be noted that for an OFDR operation the acquisition is firstly obtaining an time domain signal and then to obtain a spatial domain OFDR trace (similar as OTDR trace) after a FFT operation, and then above steps could be used.

Data Structure, Calibration and Computation

Spatial Domain Data Structure—After the OTDR data acquisition or after a FFT operation of the OFDR data acquisition for at least two lasers with different wavelengths, a new matrix data structure (D1) is obtained that comprises K groups OTDR traces as a function of distance (z), each consisting of N points corresponding to N values of distance $z_n$ for K different laser central wavelengths, where n=1 . . . N, for totally K different wavelength lasers:

| $\lambda_1$ | $P_1(z_1)$ | ... ... | $P_1(z_n)$ | ... ... | $P_1(z_N)$ | (D1) |
|---|---|---|---|---|---|---|
| ... | ... | ... ... | ... | ... ... | ... | |
| $\lambda_k$ | $P_k(z_1)$ | ... ... | $P_k(z_n)$ | ... ... | $P_k(z_N)$ | |
| ... | ... | ... ... | ... | ... ... | ... | |
| $\lambda_K$ | $P_K(z_1)$ | ... ... | $P_K(z_n)$ | ... ... | $P_K(z_N)$ | |

Fiber Coefficient Measurement/Calibration for Known Fibers—For the currently optical network fiber link installation, mostly the fiber types might be known, for example for the FTTH access network standard optical fiber of G.652, G.657(.A, B, etc.). It is necessary to measure the "threshold" bend radius or a fitting coefficient $R_{th}$ and the fiber type related bend or stress coefficient or a fitting coefficient $\eta(\lambda)$ and then users can select a properly fiber "threshold" bend radius $R_{th}$ and the fiber type related bend or stress coefficient $\eta(\lambda)$ or even to input the fitting coefficients for them regarding the FUT fiber type so that the fiber bend characteristics could be accurately calculated. This fiber bend coefficient measurement or calibration could be done/calibrated at the factory or by user.

In the field if user may not know the fiber type, it may also be possible to identify the fiber type by performing a fiber bend induced loss measurement for at least one wavelength, for example to bend the fiber to have at least one and, in some cases, two known radius, e.g. of 10 mm, and then such fiber bend fitting coefficients can be measured and calibrated.

Signal Processing of Distributed Bend or Stress Measurement Based on Wavelength-Dependent-Loss Analysis Method—As described above that the single-mode fiber, e.g. G.652, G.657, has different mode field diameter (MDF) for different wavelengths and a mode field diameter increases via wavelength increases so as to have an increased bend induced loss, for example a MFD at 1550 nm is bigger that of 1310 nm and a MFD at 1650 nm is bigger than that of at 1550 nm and 1310 nm, therefore a macro-bend loss is larger in the longer wavelength than that of a short wavelength because a bend loss is proportional to the MFD. Thus there is a difference for the band losses between different wavelengths. Also the bend induced loss can distinguished from other losses if bend losses can be measured at at least for two different wavelengths, e.g. at 1550 nm and 1650 nm or 1625 nm and 1675 nm (even beyond 1700 nm for an improved bend sensitive test and measurement), etc. This is because other losses have less or negligible wavelength dependence. Such losses can be measured by an OTDR or PC-OTDR or OFDR, as shown in embodiments FIGS. 11-14. Since most bend radius and length is small in the FTTH fiber installation, e.g. several mm and sew cm, a high spatial resolved reflectometry, for example a modified short pulse and wide detection bandwidth commercial OTDR, or a high spatial-resolved OFDR and PC-OTDR, should be used. Based on knowing the loss from macro-bending at a given wavelength for the measurement, a bend radius or bend strength can be estimated (see below section) by knowing a fiber type and using a factory (or user) calibrated wavelength dependent bend coefficient $\eta(\lambda)$ that is a constant dependent on the optical wavelength, $\lambda$, and fiber properties, e.g. fiber cladding radius, refraction index, etc., and also a bend length can be measured from a measured OTDR or OFDR trace.

After the measurement of backreflected light power (e.g. Rayleigh Back Scattering) or fiber macro-bend loss (attenuation) at different wavelengths by an OTDR or OFDR, a loss between two different fiber distance $z_S$ and $z_L$ can be obtained. If there may be a fiber bend then such losses may come fiber bend and can be distinguished from other losses as described above, i.e. bend losses are different at different wavelengths. The fiber bend loss can be expressed as, $$\Delta L_{\lambda_i-dB}(z, \lambda) = 5 \cdot \log_{10}\left(\frac{P\left(z - \frac{1}{2}\Delta z, \lambda\right)}{P\left(z + \frac{1}{2}\Delta z, \lambda\right)}\right) \quad (1)$$

or it may be written as, $$\Delta L_{\lambda_i-dB}(z, \lambda) = \left|5 \cdot \log_{10}\left(\frac{P\left(z - \frac{1}{2}\Delta z, \lambda\right)}{P\left(z + \frac{1}{2}\Delta z, \lambda\right)}\right)\right| \quad (1')$$

where $P(z,\lambda)$ is the measured backreflected light power at a distance z and at a wavelength $\lambda$, and i(i=1 . . . I, I>1) is an index for the laser wavelength number.

In some implementations, for the measurement of the wavelength-dependent loss at a specified distance z for each said group comprises distance pairs having substantially said prescribed center distance, and the said bend- or stress-related FUT characteristic is the wavelength-dependent loss values, $\Delta L_{\lambda_j-dB}(z,\lambda)$, at at least two different wavelengths, at the said at least one wavelength-dependent loss value is measured at L or UL band of the telecommunication bands or even at the further longer wavelengths.

After the calculation of the bend or stress induced wavelength-dependent loss parameter $\Delta L_{\lambda_j-dB}(z,\lambda)$ as in Eq. (1) or (1'), the bend radius or bend or stress strength can be computed from the bend induced wavelength-dependent loss parameter, $\Delta L_{\lambda_j-dB}(z,\lambda)$, according to a predetermined function as the following formula [xxx], formula, $$R(z) = R_{th} - \frac{\Delta L_{\lambda_j-dB}(z, \lambda)}{\eta(\lambda) \cdot \Delta z} \quad (2)$$

where the R(z) is the bend radius, the $R_{th}$ is defined as a "threshold" bend radius where for this "threshold" bend radius there is no any or negligible bend or stress induced attenuation or loss on the optical fiber, and the $\eta(\lambda)$ is the fiber type related bend or stress coefficient or simple as a fitting coefficient. Note that $R_{th}$ and $\eta(\lambda)$ could either from theoretical numerical simulations or from experimental calibrations, for example for a given optical fiber the $R_{th}$ and $\eta(\lambda)$ can be obtained from at least two bend induced loss measurements for two different bend radius. The $\Delta L_{\lambda_j-dB}(z, \lambda)$ is a bend or stress induced loss without any non bend- or stress-related losses and depends on the optical wavelength, $\lambda$, and fiber properties, e.g. fiber cladding radius, refraction index, etc., Δz is the bend distance or a portion of bend or stress length. $\Delta L_{\lambda_j-dB}(z,\lambda)$ is a bend or stress induced loss at a given wavelength for a bend distance Δz. The bend or stress parameter may be a bend or stress radius R(z) or a bend or stress strength that is computed from the bend or stress induced wavelength-dependent loss parameter, $\Delta L_{\lambda_j-dB}(z,\lambda)$, at a said given wavelength, λ, e.g., from a long wavelength, for example a bend or stress radius R(z) could be computed from said predetermined function according to the equation (2).

It should be noted that the $\Delta L_{\lambda_j-dB}(z,\lambda)$ does not include the non-bend or -stress related loss that may usually be dependent on the wavelength, for example dependent on the $1/\lambda^4$.

It is appreciated that equation (2) is not the only formula but it could other formulas that may come from theoretical analysis, simulations and experiments.

It should also be noted that the $\eta(\lambda)$ could be obtained from a factory calibration from known fiber type, or a user field reference measurement in the field by introducing a known bend radius (diameter) on the test fiber (i.e. FUT) or other source or method, for example by knowing fiber characteristics, e.g. standard fibers G.652, G.655, G.657, etc.

The bend radius may be computed from the said bend induced wavelength-dependent loss parameter, $\Delta L_{\lambda_j-dB}(z,\lambda)$, from the longest wavelength according to the said predetermined function.

The said $R_{th}$ and $\eta(\lambda)$ coefficients could be extracted from either experimental testing or theoretical analysis or simuations, for example for a given optical fiber the $R_{th}$ and $\eta(\lambda)$ can be obtained from at least two bend induced loss measurements from at least one wavelength for at least two different bend radius and then the $R_{th}$ and $\eta(\lambda)$ could be extracted according to the equation (2); or the said $R_{th}$ and $\eta(\lambda)$ can be obtained from at least two bend induced loss measurements for two different wavelengths for at least one bend radius and then the $R_{th}$ and $\eta(\lambda)$ could be extracted according to according to the equation (2).

The bend parameter may be a bend length that is measured from the different optical power difference (i.e. fiber loss) according to the said bend induced wavelength-dependent loss parameter, $\Delta L_{\lambda_j-dB}(z,\lambda)$, at at least one wavelength, e.g., from the longest wavelength.

In some cases, at least one bend or stress related fiber characteristics, for example a mechanical reliability and or an expect lifetime or a failure rate statistics for bending of a fiber, is calculated as one predetermined function of said the at least one bend related FUT characteristics along an optical fiber path.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Only a few implementations and examples are described and other implementations, enhancements and variations can be made based on what is described and illustrated in this patent document.

What is claimed is:

1. A polarization-sensitive optical frequency domain reflectometer device for measuring a distributed fiber bend or stress based on optical polarization sensing, comprising:
    a light source that produces probe light that is at least partially coherent;
    an optical unit that includes different optical ports positioned relative to the probe light from the light source and relatively to a fiber link under test, couples the probe light from the light source into the fiber link under test in an input state of polarization (I-SOP), and receives reflected probe light from the fiber link under test in an output state of polarization (O-SOP) to produce first and second optical signals in two different optical polarizations from the reflected probe light;
    an optical coupler that couples a portion of the probe light as an optical local oscillator light;
    an optical detection unit that includes different receiving ports, the optical detection unit coupled to receive the optical local oscillator light and the first and second optical signals and configured to mix the optical local oscillator light with the first and second optical signals to perform coherent detection of the first and second optical signals; and
    a signal processor that processes information from the coherent detection of the first and second optical signals to compute a difference in measurements of an optical parameter in reflected probe light from two different locations in the fiber under test and compute a polarization-dependent property of a fiber bend or stress from the computed difference at different positions along a fiber path in the fiber link under test to provide an assessment of the fiber bend or stress in the fiber link under test.

2. An optical time domain reflectometer (OTDR) device, comprising:
    a light source that produces probe light at different optical wavelengths;
    a light routing device that includes different ports that are positioned relative to the light source and a fiber link under test, directs the probe light from the light source to the fiber link under tests, and receives reflected probe light from the fiber link under test;
    an optical detector coupled to receive the reflected probe light from the light routing device to produce detector signals; and
    a signal processor that processes information from the detector signals to perform:
        computing a first optical power difference in reflected optical signals from two different locations in the fiber link under test at each of two or more different optical wavelengths;
        computing a second optical power difference in reflected optical signals from each of the two different locations in the fiber link under test at the two different optical wavelengths;
        using information on the first and second optical power differences to obtain optical loss caused by a fiber bend or stress present in the fiber link under test; and
        using the optical loss caused by a fiber bend or stress present in the fiber link under test to determine a parameter of the fiber bend or stress.

3. The device as in claim 2, wherein the light source includes a tunable light source that tunes to the different optical wavelengths.

4. The device as in claim 2, further comprising a sampling and averaging unit that processes the detector signals to produce output signals to be processed by the signal processor.

5. The device as in claim 2, further comprising a control unit that is coupled to the light source to control generation of the probe light at the different optical wavelengths and is further coupled to the signal processor.

6. The device as in claim 2, wherein the parameter of the fiber bend or stress includes a fiber bend length.

7. The device as in claim 2, wherein the parameter of the fiber bend or stress includes a fiber bend radius.

8. The device as in claim 2, wherein the parameter of the fiber bend or stress includes a fiber type of the fiber under test.

9. The device as in claim 2, wherein the light source includes different light sources at different wavelengths.

10. The device as in claim 9, wherein the light routing device includes an optical coupler.

11. The device as in claim 9, wherein the light routing device includes an optical backreflection extractor.

12. A method for using optical time domain reflectometer (OTDR) to measure a fiber link under test, comprising:
    operating a light source to produce probe light at different optical wavelengths;
    directing the probe light into a fiber link under test;
    directing reflected probe light from the fiber link under test into an optical detector to produce detector signals;
    processing information from the detector signals to determine a fiber bend or stress present in the fiber link under test, wherein the processing includes:
        computing a first optical power difference in reflected optical signals from two different locations in the fiber link under test at each of two or more different optical wavelengths;
        computing a second optical power difference in reflected optical signals from each of the two different locations in the fiber link under test at the two different optical wavelengths;
        using information on the first and second optical power differences to obtain optical loss caused by a fiber bend or stress present in the fiber link under test; and
        using the optical loss caused by a fiber bend or stress present in the fiber link under test to determine a parameter of the fiber bend or stress.

13. The method as in claim 12, wherein the parameter of the fiber bend or stress includes a fiber bend length.

14. The method as in claim 12, wherein the parameter of the fiber bend or stress includes a fiber bend radius.

15. The method as in claim 12, wherein the parameter of the fiber bend or stress includes a fiber type of the fiber under test.

* * * * *